US007636917B2

(12) United States Patent
Darling et al.

(10) Patent No.: US 7,636,917 B2
(45) Date of Patent: Dec. 22, 2009

(54) NETWORK LOAD BALANCING WITH HOST STATUS INFORMATION

(75) Inventors: Christopher L. Darling, Sammamish, WA (US); Joseph M. Joy, Redmond, WA (US); Sunita Shrivastava, Redmond, WA (US); Chittur Subbaraman, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 1182 days.

(21) Appl. No.: 10/610,519

(22) Filed: Jun. 30, 2003

(65) Prior Publication Data

US 2004/0268358 A1 Dec. 30, 2004

(51) Int. Cl.
*G06F 9/46* (2006.01)
(52) U.S. Cl. .................... 718/105; 709/223; 709/227
(58) Field of Classification Search ................ 718/105; 710/15; 709/223, 224, 226, 227, 230; 370/252, 370/386; 726/1, 12; 713/168
See application file for complete search history.

(56) References Cited

U.S. PATENT DOCUMENTS

| 4,200,770 | A | 4/1980 | Hellman et al. |
|---|---|---|---|
| 4,218,582 | A | 8/1980 | Hellman et al. |
| 4,405,829 | A | 9/1983 | Rivest et al. |
| 4,424,414 | A | 1/1984 | Hellman et al. |
| 5,031,089 | A | 7/1991 | Liu et al. |
| 5,115,505 | A | 5/1992 | Bishop et al. |
| 5,220,621 | A | 6/1993 | Saitoh |
| 5,371,852 | A | 12/1994 | Attanasio et al. |
| 5,430,810 | A | 7/1995 | Saeki |
| 5,490,276 | A | 2/1996 | Doli, Jr. et al. |
| 5,499,357 | A | 3/1996 | Sonty et al. |
| 5,504,921 | A | 4/1996 | Dev et al. |
| 5,539,883 | A | 7/1996 | Allon et al. |

(Continued)

FOREIGN PATENT DOCUMENTS

CN 1368694 9/2002

(Continued)

OTHER PUBLICATIONS

Hagyoung Kim et al. Content-Adaptive Request Distribution Strategy for Internet Server Cluster. W. Chang (ED.): Asia 2002, LNCs 2402, pp. 85-94, Aug. 2002. copyright Springer-Verlag Berlin Heidelberg 2002.

(Continued)

*Primary Examiner*—Van H Nguyen
(74) *Attorney, Agent, or Firm*—Lee & Hayes, PLLC

(57) ABSTRACT

In a first exemplary media implementation, one or more processor-accessible media include processor-executable instructions that, when executed, direct a system to perform actions that include: accumulating host status information at multiple hosts; and sending the accumulated host status information from the multiple hosts. In a second exemplary media implementation, one or more processor-accessible media include processor-executable instructions that, when executed, direct a system to perform actions that include: receiving host status information from multiple hosts; and making load balancing decisions responsive to the received host status information. In a third exemplary media implementation, one or more processor-accessible media include processor-executable instructions that, when executed, direct a system to perform actions that include: determining health and load information on a per application basis; and selecting an application from among multiple applications responsive to the health and load information.

51 Claims, 40 Drawing Sheets

U.S. PATENT DOCUMENTS

| | | | |
|---|---|---|---|
| 5,557,774 A | 9/1996 | Shimabukuro et al. | |
| 5,579,482 A | 11/1996 | Einkauf et al. | |
| 5,668,995 A | 9/1997 | Bhat | |
| 5,686,940 A | 11/1997 | Kuga | |
| 5,724,508 A | 3/1998 | Harple, Jr. et al. | |
| 5,748,958 A | 5/1998 | Badovinatz et al. | |
| 5,758,351 A | 5/1998 | Gibson et al. | |
| 5,768,271 A | 6/1998 | Seid et al. | |
| 5,774,660 A | 6/1998 | Brendel et al. | |
| 5,774,668 A | 6/1998 | Choquier et al. | |
| 5,774,689 A | 6/1998 | Curtis et al. | |
| 5,784,463 A | 7/1998 | Chen et al. | |
| 5,790,895 A | 8/1998 | Krontz et al. | |
| 5,801,970 A | 9/1998 | Rowland et al. | |
| 5,818,937 A | 10/1998 | Watson et al. | |
| 5,822,531 A | 10/1998 | Gorczyca et al. | |
| 5,826,015 A | 10/1998 | Schmidt | |
| 5,845,124 A | 12/1998 | Berman | |
| 5,845,277 A | 12/1998 | Pfeil et al. | |
| 5,850,399 A | 12/1998 | Ganmukhi et al. | |
| 5,867,706 A * | 2/1999 | Martin et al. | 718/105 |
| 5,878,220 A | 3/1999 | Olkin et al. | |
| 5,895,499 A | 4/1999 | Chu | |
| 5,905,728 A | 5/1999 | Han et al. | |
| 5,917,730 A | 6/1999 | Rittie et al. | |
| 5,918,017 A | 6/1999 | Attanasio et al. | |
| 5,930,798 A | 7/1999 | Lawler et al. | |
| 5,938,732 A | 8/1999 | Lim et al. | |
| 5,951,694 A | 9/1999 | Choquier et al. | |
| 5,958,009 A | 9/1999 | Friedrich et al. | |
| 5,960,371 A | 9/1999 | Saito et al. | |
| 5,968,126 A | 10/1999 | Ekstrom et al. | |
| 6,035,405 A | 3/2000 | Gage et al. | |
| 6,041,054 A | 3/2000 | Westberg | |
| 6,047,323 A | 4/2000 | Krause | |
| 6,047,325 A | 4/2000 | Jain et al. | |
| 6,049,528 A | 4/2000 | Hendel et al. | |
| 6,052,469 A | 4/2000 | Johnson et al. | |
| 6,059,842 A | 5/2000 | Dumarot et al. | |
| 6,065,058 A | 5/2000 | Hailpern et al. | |
| 6,067,580 A | 5/2000 | Aman et al. | |
| 6,075,776 A | 6/2000 | Tanimoto et al. | |
| 6,076,108 A | 6/2000 | Courts et al. | |
| 6,081,826 A * | 6/2000 | Masuoka et al. | 718/100 |
| 6,085,238 A | 7/2000 | Yuasa et al. | |
| 6,086,618 A | 7/2000 | Al-Hilali et al. | |
| 6,098,093 A | 8/2000 | Bayeh et al. | |
| 6,108,702 A | 8/2000 | Wood | |
| 6,112,243 A | 8/2000 | Downs et al. | |
| 6,115,393 A | 9/2000 | Engel et al. | |
| 6,118,785 A | 9/2000 | Araujo et al. | |
| 6,125,442 A | 9/2000 | Maves et al. | |
| 6,125,447 A | 9/2000 | Gong | |
| 6,147,995 A | 11/2000 | Dobbins et al. | |
| 6,151,688 A | 11/2000 | Wipfel et al. | |
| 6,167,052 A | 12/2000 | McNeill et al. | |
| 6,167,383 A | 12/2000 | Henson | |
| 6,167,515 A | 12/2000 | Lin | |
| 6,178,529 B1 | 1/2001 | Short et al. | |
| 6,182,275 B1 | 1/2001 | Beelitz et al. | |
| 6,185,308 B1 | 2/2001 | Ando et al. | |
| 6,192,401 B1 | 2/2001 | Modiri et al. | |
| 6,195,091 B1 | 2/2001 | Harple et al. | |
| 6,195,355 B1 | 2/2001 | Demizu | |
| 6,208,345 B1 | 3/2001 | Sheard et al. | |
| 6,208,649 B1 | 3/2001 | Kloth | |
| 6,209,099 B1 | 3/2001 | Saunders | |
| 6,212,559 B1 | 4/2001 | Bixler et al. | |
| 6,226,788 B1 | 5/2001 | Schoening et al. | |
| 6,230,312 B1 | 5/2001 | Hunt | |
| 6,233,610 B1 | 5/2001 | Hayball et al. | |
| 6,236,365 B1 | 5/2001 | LeBlanc et al. | |
| 6,236,901 B1 | 5/2001 | Goss | |
| 6,253,230 B1 | 6/2001 | Couland et al. | |
| 6,256,773 B1 | 7/2001 | Bowman-Amuah | |
| 6,263,089 B1 | 7/2001 | Otsuka et al. | |
| 6,266,707 B1 | 7/2001 | Boden et al. | |
| 6,269,076 B1 | 7/2001 | Shamir et al. | |
| 6,269,079 B1 | 7/2001 | Marin et al. | |
| 6,272,522 B1 | 8/2001 | Lin et al. | |
| 6,272,523 B1 | 8/2001 | Factor | |
| 6,305,015 B1 | 10/2001 | Akriche et al. | |
| 6,311,144 B1 | 10/2001 | Abu El Ata | |
| 6,311,270 B1 | 10/2001 | Challener et al. | |
| 6,327,622 B1 | 12/2001 | Jindal et al. | |
| 6,330,602 B1 | 12/2001 | Law et al. | |
| 6,330,605 B1 | 12/2001 | Christensen et al. | |
| 6,336,138 B1 | 1/2002 | Caswell et al. | |
| 6,336,171 B1 | 1/2002 | Coskrey, IV | |
| 6,338,112 B1 | 1/2002 | Wipfel et al. | |
| 6,341,356 B1 | 1/2002 | Johnson et al. | |
| 6,351,685 B1 * | 2/2002 | Dimitri et al. | 700/214 |
| 6,353,861 B1 | 3/2002 | Dolin, Jr. et al. | |
| 6,353,898 B1 | 3/2002 | Wipfel et al. | |
| 6,360,265 B1 | 3/2002 | Falck et al. | |
| 6,366,578 B1 | 4/2002 | Johnson | |
| 6,367,010 B1 | 4/2002 | Venkatram et al. | |
| 6,370,573 B1 | 4/2002 | Bowman-Amuah | |
| 6,370,584 B1 | 4/2002 | Bestavros et al. | |
| 6,377,996 B1 | 4/2002 | Lumelsky et al. | |
| 6,389,464 B1 | 5/2002 | Krishnamurthy et al. | |
| 6,393,386 B1 | 5/2002 | Zager et al. | |
| 6,393,456 B1 | 5/2002 | Ambler et al. | |
| 6,393,485 B1 | 5/2002 | Chao et al. | |
| 6,408,390 B1 | 6/2002 | Saito | |
| 6,424,718 B1 | 7/2002 | Holloway | |
| 6,424,992 B2 | 7/2002 | Devarakonda et al. | |
| 6,427,163 B1 | 7/2002 | Arendt et al. | |
| 6,427,171 B1 | 7/2002 | Craft et al. | |
| 6,438,100 B1 | 8/2002 | Halpern et al. | |
| 6,442,557 B1 | 8/2002 | Buteau et al. | |
| 6,449,650 B1 | 9/2002 | Westfall et al. | |
| 6,457,048 B2 | 9/2002 | Sondur et al. | |
| 6,463,536 B2 | 10/2002 | Saito | |
| 6,466,985 B1 | 10/2002 | Goyal et al. | |
| 6,470,025 B1 | 10/2002 | Wilson et al. | |
| 6,470,464 B2 | 10/2002 | Bertram et al. | |
| 6,473,791 B1 | 10/2002 | Al-Ghosein et al. | |
| 6,480,955 B1 | 11/2002 | DeKoning et al. | |
| 6,484,261 B1 | 11/2002 | Wiegel | |
| 6,502,131 B1 | 12/2002 | Vaid et al. | |
| 6,505,244 B1 | 1/2003 | Natarajan et al. | |
| 6,519,615 B1 | 2/2003 | Wollrath et al. | |
| 6,529,953 B1 | 3/2003 | Van Renesse | |
| 6,539,494 B1 | 3/2003 | Abramson et al. | |
| 6,542,504 B1 | 4/2003 | Mahler et al. | |
| 6,546,423 B1 | 4/2003 | Dutta et al. | |
| 6,546,553 B1 | 4/2003 | Hunt | |
| 6,549,516 B1 | 4/2003 | Albert et al. | |
| 6,549,934 B1 | 4/2003 | Peterson et al. | |
| 6,564,261 B1 | 5/2003 | Gudjonsson et al. | |
| 6,570,847 B1 * | 5/2003 | Hosein | 370/230.1 |
| 6,570,875 B1 | 5/2003 | Hegde | |
| 6,574,195 B2 | 6/2003 | Roberts | |
| 6,584,499 B1 | 6/2003 | Jantz et al. | |
| 6,587,876 B1 | 7/2003 | Mahon et al. | |
| 6,598,077 B2 | 7/2003 | Primak et al. | |
| 6,598,173 B1 | 7/2003 | Sheikh et al. | |
| 6,598,223 B1 | 7/2003 | Vrhel, Jr. et al. | |
| 6,601,101 B1 | 7/2003 | Lee et al. | |
| 6,601,233 B1 | 7/2003 | Underwood | |
| 6,606,708 B1 | 8/2003 | Devine et al. | |
| 6,609,148 B1 | 8/2003 | Salo et al. | |
| 6,609,213 B1 | 8/2003 | Nguyen et al. | |

| Patent No. | Date | Inventors |
|---|---|---|
| 6,611,522 B1 | 8/2003 | Zheng et al. |
| 6,628,671 B1 | 9/2003 | Dynarski et al. |
| 6,631,141 B1 | 10/2003 | Kumar et al. |
| 6,640,303 B1 | 10/2003 | Vu |
| 6,651,101 B1 | 11/2003 | Gai et al. |
| 6,651,240 B1 | 11/2003 | Yamamoto et al. |
| 6,654,782 B1 | 11/2003 | O'Brien et al. |
| 6,654,796 B1 | 11/2003 | Slater et al. |
| 6,665,714 B1 | 12/2003 | Blumenau et al. |
| 6,671,699 B1 | 12/2003 | Black et al. |
| 6,675,308 B1 | 1/2004 | Thomsen |
| 6,678,821 B1 | 1/2004 | Waugh et al. |
| 6,678,835 B1 | 1/2004 | Shah et al. |
| 6,681,262 B1 | 1/2004 | Rimmer |
| 6,684,335 B1 | 1/2004 | Epstein, III et al. |
| 6,691,148 B1 | 2/2004 | Zinky et al. |
| 6,691,168 B1 | 2/2004 | Bal et al. |
| 6,694,436 B1 | 2/2004 | Audebert |
| 6,701,363 B1 | 3/2004 | Chiu et al. |
| 6,717,949 B1 | 4/2004 | Boden et al. |
| 6,718,361 B1 | 4/2004 | Basani et al. |
| 6,718,379 B1 | 4/2004 | Krishna et al. |
| 6,725,253 B1 | 4/2004 | Okano et al. |
| 6,728,885 B1 | 4/2004 | Taylor et al. |
| 6,735,596 B2 | 5/2004 | Corynen |
| 6,738,736 B1 | 5/2004 | Bond |
| 6,741,266 B1 | 5/2004 | Kamiwada et al. |
| 6,742,020 B1 | 5/2004 | Dimitroff et al. |
| 6,748,447 B1 | 6/2004 | Basani et al. |
| 6,754,716 B1 | 6/2004 | Sharma et al. |
| 6,754,816 B1 | 6/2004 | Layton et al. |
| 6,757,744 B1 * | 6/2004 | Narisi et al. ............... 709/250 |
| 6,760,765 B1 | 7/2004 | Asai et al. |
| 6,760,775 B1 | 7/2004 | Anerousis et al. |
| 6,769,008 B1 | 7/2004 | Kumar et al. |
| 6,769,060 B1 | 7/2004 | Dent et al. |
| 6,772,333 B1 | 8/2004 | Brendel |
| 6,779,016 B1 | 8/2004 | Aziz et al. |
| 6,782,408 B1 | 8/2004 | Chandra et al. |
| 6,801,528 B2 | 10/2004 | Nassar |
| 6,801,937 B1 | 10/2004 | Novaes et al. |
| 6,804,783 B1 | 10/2004 | Wesinger et al. |
| 6,813,778 B1 | 11/2004 | Poli et al. |
| 6,816,897 B2 | 11/2004 | McGuire |
| 6,820,121 B1 | 11/2004 | Callis et al. |
| 6,823,299 B1 | 11/2004 | Contreras et al. |
| 6,823,373 B1 | 11/2004 | Pancha et al. |
| 6,823,382 B2 | 11/2004 | Stone |
| 6,829,639 B1 | 12/2004 | Lawson et al. |
| 6,829,770 B1 | 12/2004 | Hinson et al. |
| 6,836,750 B2 | 12/2004 | Wong et al. |
| 6,845,160 B1 | 1/2005 | Aoki |
| 6,853,841 B1 * | 2/2005 | St. Pierre ............... 455/420 |
| 6,854,069 B2 | 2/2005 | Kampe et al. |
| 6,856,591 B1 | 2/2005 | Ma et al. |
| 6,862,613 B1 | 3/2005 | Kumar et al. |
| 6,868,062 B1 | 3/2005 | Yadav et al. |
| 6,868,454 B1 | 3/2005 | Kubota et al. |
| 6,880,002 B2 | 4/2005 | Hirschfeld et al. |
| 6,886,038 B1 | 4/2005 | Tabbara et al. |
| 6,888,807 B2 | 5/2005 | Heller et al. |
| 6,895,534 B2 | 5/2005 | Wong et al. |
| 6,898,791 B1 | 5/2005 | Chandy et al. |
| 6,904,458 B1 | 6/2005 | Bishop et al. |
| 6,907,395 B1 | 6/2005 | Hunt et al. |
| 6,915,338 B1 | 7/2005 | Hunt et al. |
| 6,922,791 B2 | 7/2005 | Mashayekhi et al. |
| 6,928,482 B1 | 8/2005 | Nun et al. |
| 6,947,987 B2 | 9/2005 | Boland |
| 6,954,930 B2 | 10/2005 | Drake et al. |
| 6,957,186 B1 | 10/2005 | Guheen et al. |
| 6,963,981 B1 | 11/2005 | Bailey et al. |
| 6,968,291 B1 | 11/2005 | Desai |
| 6,968,535 B2 | 11/2005 | Stelting et al. |
| 6,968,550 B2 | 11/2005 | Branson et al. |
| 6,968,551 B2 | 11/2005 | Hediger et al. |
| 6,971,063 B1 | 11/2005 | Rappaport et al. |
| 6,971,072 B1 | 11/2005 | Stein |
| 6,973,620 B2 | 12/2005 | Gusler et al. |
| 6,973,622 B1 | 12/2005 | Rappaport et al. |
| 6,976,079 B1 | 12/2005 | Ferguson et al. |
| 6,976,269 B1 | 12/2005 | Avery, IV et al. |
| 6,983,317 B1 * | 1/2006 | Bishop et al. ............... 709/223 |
| 6,985,956 B2 | 1/2006 | Luke et al. |
| 6,990,666 B2 | 1/2006 | Hirschfeld et al. |
| 7,003,562 B2 | 2/2006 | Mayer |
| 7,003,574 B1 | 2/2006 | Bahl |
| 7,012,919 B1 | 3/2006 | So et al. |
| 7,013,462 B2 | 3/2006 | Zara et al. |
| 7,016,950 B2 | 3/2006 | Tabbara et al. |
| 7,024,451 B2 | 4/2006 | Jorgenson |
| 7,027,412 B2 | 4/2006 | Miyamoto et al. |
| 7,028,228 B1 | 4/2006 | Lovy et al. |
| 7,035,786 B1 | 4/2006 | Abu El Ata et al. |
| 7,035,930 B2 | 4/2006 | Graupner et al. |
| 7,043,407 B2 | 5/2006 | Lynch et al. |
| 7,043,545 B2 | 5/2006 | Tabbara et al. |
| 7,046,680 B1 | 5/2006 | McDysan et al. |
| 7,050,961 B1 | 5/2006 | Lee et al. |
| 7,054,943 B1 | 5/2006 | Goldszmidt et al. |
| 7,058,704 B1 | 6/2006 | Mangipudi et al. |
| 7,058,826 B2 | 6/2006 | Fung |
| 7,058,858 B2 | 6/2006 | Wong et al. |
| 7,062,718 B2 | 6/2006 | Kodosky et al. |
| 7,069,480 B1 | 6/2006 | Lovy et al. |
| 7,069,553 B2 | 6/2006 | Narayanaswamy et al. |
| 7,072,807 B2 | 7/2006 | Brown et al. |
| 7,072,822 B2 | 7/2006 | Humenansky et al. |
| 7,076,633 B2 | 7/2006 | Tormasov et al. |
| 7,080,143 B2 | 7/2006 | Hunt et al. |
| 7,082,464 B2 | 7/2006 | Hasan et al. |
| 7,089,281 B1 | 8/2006 | Kazemi et al. |
| 7,089,293 B2 | 8/2006 | Grosner et al. |
| 7,089,530 B1 | 8/2006 | Dardinski et al. |
| 7,093,005 B2 | 8/2006 | Patterson |
| 7,093,288 B1 | 8/2006 | Hydrie et al. |
| 7,096,258 B2 | 8/2006 | Hunt et al. |
| 7,099,936 B2 | 8/2006 | Chase et al. |
| 7,103,185 B1 | 9/2006 | Srivastava et al. |
| 7,103,874 B2 | 9/2006 | McCollum et al. |
| 7,113,900 B1 | 9/2006 | Hunt et al. |
| 7,117,158 B2 | 10/2006 | Weldon et al. |
| 7,117,261 B2 | 10/2006 | Kryskow, Jr. et al. |
| 7,120,154 B2 | 10/2006 | Bavant et al. |
| 7,124,289 B1 | 10/2006 | Suorsa |
| 7,127,625 B2 | 10/2006 | Farkas et al. |
| 7,131,123 B2 | 10/2006 | Suorsa et al. |
| 7,134,011 B2 | 11/2006 | Fung |
| 7,134,122 B1 | 11/2006 | Sero et al. |
| 7,139,930 B2 | 11/2006 | Mashayekhi et al. |
| 7,139,999 B2 | 11/2006 | Bowman-Amuah |
| 7,143,420 B2 | 11/2006 | Radhakrishnan |
| 7,146,353 B2 | 12/2006 | Garg et al. |
| 7,150,015 B2 | 12/2006 | Pace et al. |
| 7,152,109 B2 | 12/2006 | Suorsa et al. |
| 7,152,157 B2 | 12/2006 | Murphy et al. |
| 7,155,380 B2 | 12/2006 | Hunt et al. |
| 7,155,490 B1 | 12/2006 | Malmer et al. |
| 7,162,427 B1 | 1/2007 | Myrick et al. |
| 7,162,509 B2 | 1/2007 | Brown et al. |
| 7,174,379 B2 | 2/2007 | Agarwal et al. |
| 7,181,731 B2 | 2/2007 | Pace et al. |
| 7,188,335 B1 | 3/2007 | Darr et al. |
| 7,191,344 B2 | 3/2007 | Lin et al. |
| 7,191,429 B2 | 3/2007 | Brassard et al. |
| 7,194,439 B2 | 3/2007 | Kassan et al. |

| Patent/Publication | Date | Inventor |
|---|---|---|
| 7,194,616 B2 | 3/2007 | Axnix et al. |
| 7,197,418 B2 | 3/2007 | Fuller, III et al. |
| 7,200,530 B2 | 4/2007 | Brown et al. |
| 7,200,655 B2 | 4/2007 | Hunt et al. |
| 7,203,911 B2 | 4/2007 | Williams |
| 7,213,231 B1 | 5/2007 | Bandhole et al. |
| 7,222,147 B1 | 5/2007 | Black et al. |
| 7,225,441 B2 | 5/2007 | Kozuch et al. |
| 7,231,410 B1 | 6/2007 | Walsh et al. |
| 7,254,634 B1 | 8/2007 | Davis et al. |
| 7,257,584 B2 | 8/2007 | Hirschfeld et al. |
| 7,275,156 B2 | 9/2007 | Balfanz et al. |
| 7,278,273 B1 | 10/2007 | Whitted et al. |
| 7,281,154 B2 | 10/2007 | Mashayekhi et al. |
| 7,302,608 B1 | 11/2007 | Acharya et al. |
| 7,305,549 B2 | 12/2007 | Hunt et al. |
| 7,305,561 B2 | 12/2007 | Hunt et al. |
| 7,313,573 B2 | 12/2007 | Leung et al. |
| 7,315,801 B1 | 1/2008 | Dowd et al. |
| 7,333,000 B2 | 2/2008 | Vassallo |
| 7,349,891 B2 | 3/2008 | Charron et al. |
| 7,350,068 B2 | 3/2008 | Anderson et al. |
| 7,350,186 B2 | 3/2008 | Coleman et al. |
| 7,366,755 B1 | 4/2008 | Cuomo et al. |
| 7,367,028 B2 | 4/2008 | Kodosky et al. |
| 7,370,103 B2 | 5/2008 | Hunt et al. |
| 7,379,982 B2 | 5/2008 | Tabbara |
| 7,386,721 B1 | 6/2008 | Vilhuber et al. |
| 7,395,320 B2 | 7/2008 | Hunt et al. |
| 7,403,901 B1 | 7/2008 | Carley et al. |
| 7,404,175 B2 | 7/2008 | Lee et al. |
| 7,406,517 B2 | 7/2008 | Hunt et al. |
| 7,406,692 B2 | 7/2008 | Halpern et al. |
| 7,409,420 B2 | 8/2008 | Pullara et al. |
| 7,461,249 B1 | 12/2008 | Pearson et al. |
| 7,464,147 B1 | 12/2008 | Fakhouri et al. |
| 2001/0014158 A1 | 8/2001 | Baltzley |
| 2001/0016909 A1 | 8/2001 | Gehrmann |
| 2001/0019554 A1 | 9/2001 | Nomura et al. |
| 2001/0020228 A1 | 9/2001 | Cantu et al. |
| 2001/0039586 A1 | 11/2001 | Primak et al. |
| 2001/0047400 A1* | 11/2001 | Coates et al. ............... 709/219 |
| 2001/0051937 A1 | 12/2001 | Ross et al. |
| 2002/0009079 A1 | 1/2002 | Jungck et al. |
| 2002/0022952 A1 | 2/2002 | Zager et al. |
| 2002/0038421 A1 | 3/2002 | Hamada |
| 2002/0040402 A1 | 4/2002 | Levy-Abegnoli et al. |
| 2002/0049573 A1 | 4/2002 | El Ata |
| 2002/0057684 A1 | 5/2002 | Miyamoto et al. |
| 2002/0069267 A1 | 6/2002 | Thiele |
| 2002/0069369 A1 | 6/2002 | Tremain |
| 2002/0075844 A1 | 6/2002 | Hagen |
| 2002/0082820 A1 | 6/2002 | Ferguson et al. |
| 2002/0087264 A1 | 7/2002 | Hills et al. |
| 2002/0090089 A1 | 7/2002 | Branigan et al. |
| 2002/0099785 A1 | 7/2002 | Teeple |
| 2002/0120761 A1 | 8/2002 | Berg |
| 2002/0131601 A1 | 9/2002 | Ninomiya et al. |
| 2002/0138551 A1* | 9/2002 | Erickson ..................... 709/203 |
| 2002/0152086 A1 | 10/2002 | Smith et al. |
| 2002/0156900 A1 | 10/2002 | Marquette et al. |
| 2002/0161839 A1 | 10/2002 | Colasurdo et al. |
| 2002/0171690 A1 | 11/2002 | Fox et al. |
| 2002/0194342 A1 | 12/2002 | Lu et al. |
| 2002/0194345 A1 | 12/2002 | Lu et al. |
| 2002/0194369 A1 | 12/2002 | Rawlings et al. |
| 2002/0198995 A1 | 12/2002 | Liu et al. |
| 2003/0008712 A1 | 1/2003 | Poulin |
| 2003/0009559 A1 | 1/2003 | Ikeda |
| 2003/0014644 A1 | 1/2003 | Burns et al. |
| 2003/0028642 A1 | 2/2003 | Agarwal et al. |
| 2003/0028770 A1 | 2/2003 | Litwin, Jr. et al. |
| 2003/0041142 A1 | 2/2003 | Zhang et al. |
| 2003/0041159 A1* | 2/2003 | Tinsley et al. ............... 709/231 |
| 2003/0046615 A1 | 3/2003 | Stone |
| 2003/0051049 A1 | 3/2003 | Noy et al. |
| 2003/0056063 A1 | 3/2003 | Hochmuth et al. |
| 2003/0065743 A1 | 4/2003 | Jenny et al. |
| 2003/0069369 A1 | 4/2003 | Belenkaya et al. |
| 2003/0074395 A1 | 4/2003 | Eshghi et al. |
| 2003/0101284 A1 | 5/2003 | Cabrera et al. |
| 2003/0105963 A1 | 6/2003 | Slick et al. |
| 2003/0120763 A1 | 6/2003 | Voilpano |
| 2003/0126464 A1* | 7/2003 | McDaniel et al. ........... 713/201 |
| 2003/0130833 A1 | 7/2003 | Brownell et al. |
| 2003/0138105 A1 | 7/2003 | Challener et al. |
| 2003/0165140 A1 | 9/2003 | Tang et al. |
| 2003/0204734 A1 | 10/2003 | Wheeler |
| 2003/0206548 A1 | 11/2003 | Bannai et al. |
| 2003/0214908 A1 | 11/2003 | Kumar et al. |
| 2003/0217263 A1 | 11/2003 | Sakai |
| 2003/0225563 A1 | 12/2003 | Gonos |
| 2004/0002878 A1 | 1/2004 | Maria Hinton |
| 2004/0049365 A1 | 3/2004 | Keller et al. |
| 2004/0054791 A1 | 3/2004 | Chakraborty et al. |
| 2004/0068631 A1 | 4/2004 | Ukeda et al. |
| 2004/0073443 A1 | 4/2004 | Gabrick et al. |
| 2004/0073795 A1 | 4/2004 | Jablon |
| 2004/0078787 A1 | 4/2004 | Borek et al. |
| 2004/0111315 A1 | 6/2004 | Sharma et al. |
| 2004/0117438 A1 | 6/2004 | Considine et al. |
| 2004/0117476 A1 | 6/2004 | Steele et al. |
| 2004/0160386 A1 | 8/2004 | Michelitsch et al. |
| 2004/0161111 A1 | 8/2004 | Sherman |
| 2004/0193388 A1 | 9/2004 | Outhred et al. |
| 2004/0199572 A1 | 10/2004 | Hunt et al. |
| 2004/0205179 A1 | 10/2004 | Hunt et al. |
| 2004/0208292 A1 | 10/2004 | Winterbottom |
| 2004/0226010 A1 | 11/2004 | Suorsa |
| 2004/0261079 A1* | 12/2004 | Sen ........................... 719/310 |
| 2004/0264481 A1 | 12/2004 | Darling et al. |
| 2004/0267920 A1 | 12/2004 | Hydrie et al. |
| 2004/0268357 A1 | 12/2004 | Joy et al. |
| 2004/0268358 A1 | 12/2004 | Darling et al. |
| 2005/0008001 A1 | 1/2005 | Williams et al. |
| 2005/0021742 A1 | 1/2005 | Yemini et al. |
| 2005/0055435 A1 | 3/2005 | Gbadegesin et al. |
| 2005/0080811 A1 | 4/2005 | Speeter et al. |
| 2005/0086502 A1 | 4/2005 | Rayes et al. |
| 2005/0091078 A1 | 4/2005 | Hunt et al. |
| 2005/0091227 A1 | 4/2005 | McCollum et al. |
| 2005/0097097 A1 | 5/2005 | Hunt et al. |
| 2005/0097146 A1 | 5/2005 | Konstantinou et al. |
| 2005/0102388 A1 | 5/2005 | Tabbara et al. |
| 2005/0125212 A1 | 6/2005 | Hunt et al. |
| 2005/0138416 A1 | 6/2005 | Qian et al. |
| 2005/0152270 A1 | 7/2005 | Gomez Paredes et al. |
| 2005/0192971 A1 | 9/2005 | Tabbara et al. |
| 2005/0193103 A1 | 9/2005 | Drabik |
| 2005/0246529 A1 | 11/2005 | Hunt et al. |
| 2005/0246771 A1 | 11/2005 | Hunt et al. |
| 2005/0251783 A1 | 11/2005 | Torone et al. |
| 2005/0257244 A1 | 11/2005 | Joly et al. |
| 2005/0268325 A1 | 12/2005 | Kuno et al. |
| 2006/0025984 A1 | 2/2006 | Papaefstathiou et al. |
| 2006/0025985 A1 | 2/2006 | Vinberg et al. |
| 2006/0031248 A1 | 2/2006 | Vinberg et al. |
| 2006/0034263 A1 | 2/2006 | Outhred et al. |
| 2006/0037002 A1 | 2/2006 | Vinberg et al. |
| 2006/0048017 A1 | 3/2006 | Anerousis et al. |
| 2006/0123040 A1 | 6/2006 | McCarthy et al. |
| 2006/0149838 A1 | 7/2006 | Hunt et al. |
| 2006/0155708 A1 | 7/2006 | Brown et al. |
| 2006/0161879 A1 | 7/2006 | Lubrecht et al. |
| 2006/0161884 A1 | 7/2006 | Lubrecht et al. |
| 2006/0235664 A1 | 10/2006 | Vinberg et al. |

| | | |
|---|---|---|
| 2006/0259609 A1 | 11/2006 | Hunt et al. |
| 2006/0259610 A1 | 11/2006 | Hunt et al. |
| 2006/0271341 A1 | 11/2006 | Brown et al. |
| 2007/0006177 A1 | 1/2007 | Aiber et al. |
| 2007/0112847 A1 | 5/2007 | Dublish et al. |
| 2007/0192769 A1 | 8/2007 | Mimura et al. |
| 2008/0059214 A1 | 3/2008 | Vinberg et al. |

FOREIGN PATENT DOCUMENTS

| | | |
|---|---|---|
| CN | 1375685 | 10/2002 |
| EP | 1 180 886 | 2/2002 |
| EP | 1 307 018 | 5/2003 |
| JP | 8297567 | 11/1996 |
| JP | 11007407 | 1/1999 |
| JP | 20051526814 | 12/2001 |
| JP | 2002084302 | 3/2002 |
| JP | 2003532784 | 11/2003 |
| JP | 2005155729 | 6/2005 |
| KR | 10-2002-0026751 | 4/2002 |
| KR | 10-2004-0008275 | 1/2004 |
| WO | WO9853410 | 11/1998 |
| WO | WO9963439 | 12/1999 |
| WO | WO 00/22526 | 4/2000 |
| WO | WO0031945 | 6/2000 |
| WO | WO0073929 | 12/2000 |
| WO | WO0230044 A2 | 4/2002 |
| WO | WO0237748 | 5/2002 |
| WO | WO02085051 | 10/2002 |
| WO | WO 03/017615 | 2/2003 |
| WO | WO03039104 | 5/2003 |

OTHER PUBLICATIONS

Ram Gopal. L. et al. Policy Based Access Router Selections And Context Transfers In Mobile IP. Network Control and Engineering for QoS; Security and Mobility (Net-Con 2002).
Philippe Levillain et al. Switch-Based Server Load Balancing For Enterprises, Alcatel Telecommunications Review; No. 4; pp. 298-302; 2002.
Ryuji Somegawa et al. The Effects fo Server Placement and server selection for Internet Services. IEICE Trans. Commun. vol. e86-b, No. 2, Feb. 2003. pp. 542-552.
Florin Sultan et al. Position Summary: Transport Layer Support for Highly-Available Network Services. Predgs. Eighth Workshop on Itot Topics in Operating Systems; p. 182; May 2001.
Rajive Bagrodia et al. A Scalable, Distributed Middleware Service Architecture to Support Mobile Internet Applications. Wireless Networks V. 9, N 4, Jul. 2003 Kluwer Academic Publishers. Manufactured in the Netherlands; pp. 311-320.
Masanori Uga et al., A High-Speed Packet Classification Using TCAM, IEICE Trans. On Communications, vol. e85-b, No. 9, Sep. 2002.
Florin Sultan et al., Migratory TCP: Connection Migration for Sservice Continuity in the Internet, Proceedings 22nd Intl. Conference on Distributed Computing Systems; Jul. 2002; pp. 469-740.
Maria Kihl et al., Admission Control Schemes Gauranteeing Customer Q0S in Commercial Web Sites., Network Control and Engineering for QoS, Security and Mobility (Net-Con 2002); Oct. 2002; pp. 305-316/.
H. Jonathan Chao, Next Generation Routers., Proceedings of the IEEE. vol. 90, No. 9, Sep. 2002.
Sundar Iyer et al., ClassiPI: An Architecture for Fast and Flexible Packet Classification, IEEE Network, Mar./Apr. 2001, vol. 15, No. 2.
Haining Wang et al, Layer-4 Service Differentiation and Resource Isolation, Proceedings of the Eighth IEEE Real-Time and Embedded Technology and Applications Symposium; Sep. 2002; 12 pages.
Noriyuki Takahashi et al. APE: Fast and Secure Active Networking Architecture for Active Packet Editing, 2002 IEEE Open Architectures and NEtwork Programming Procedures; (Open Arch 2002); pp. 104-113.
Byeong-Cheolchoi et al. A High-Speed Multi-layer Lookup for Policy Based Packet Classification Using TCAM. Proceedings of the IASTED International Conference, Communication Systems and Networks, Sep. 9-12, 2002, Malaga, Spain.
Cohen, et al; "On the Performance Of TCP Splicing For URL-Aware Redirection"; Proceedings of USITS' 99: The 2nd USENIX Symposium on Internet Technologies & Systems; Boulder, Colorado, USA, Oct. 11-14, 1999; 10 pages.
Araki, "Linux Security Diary, Use VLAN in Linux", Linux Japan, Itsutsubashi Research Co.,ltd., vol. 3, No. 11, Nov. 1, 2008, pp. 110-113 (CSDB: National Academy Paper 200300158009.
"C.O.B.A.S Centralized Out-Of-Brand Authentication System", QT Worldtel Inc., Sep. 8-9, 2003, pp. 14.
Chen, et al., "Performance Prediction of Component-based Applications", available at least as early as Jan. 10, 2007, at <<http://www.ug.it.usyd.edu.au/~iango/papers/jss_paper_draft_0503.pdf>>. pp. 1-12.
"Enhanced IP Services for Cisco Networks", retrieved on Jun. 19, 2007, at <<http://proquest.safaribooksonline.com/1578701066>>, Sep. 23, 1999, pp. 11.
Frolund, et al., "Design-Time Simulation of a Large-Scale, Distrubuted object System" ACM 1998, pp. 374-400.
Harbour, et al., "MAST An Open Environment for Modeling, Analysis, and Design of Real-Time Systems", available at least as early as Jan. 10, 2007, at <<http://citeseer.ist.psu.edu/cache/papers/cs/30959/http:zSzzSzwww.ctr.unican.eszSzpublicationsSzmgh-jlm-jjg-jcp-jmd-2002a.pdf/mast-an-open-environment.pdf>>, pp. 1-16.
Hardwidk, et al., "Modeling the Performance of E-Commerce Site", Jan. 6, 2007, at <<http://www.cs.cmu.edu/~jch/publications/hardwick01modeling.html>>, Journal of Computer Resource Management, 2002, pp. 1-11.
Howard et al., "Designing Secure Web-Based Applications for Microsoft Windows 2000", 2000.
Kounev, "A Capacity Planning Methodology for Distributed E-Commerce Applications", Jan. 2, 2001, pp. 1-13.
Liu et al., "Visualization in Network Topology Optimization", ACM, 1992, pp. 131-138.
Mahon, "OpenView PolicyXpert: Heterogeneous Configuration and Control", OpenView Policy-Based Network Management, Feb. 1999, 4 pages.
Miyamoto, et al., "VLAN Management System on Large-scale Network," Journal of Information Processing Society of Japan, vol. 41, No. 12, pp. 3234-3244, the Information Processing Society of Japan, Dec. 15, 2000. (CSDB: National Academy Paper 200200108005).
Nestor, "Security Modeling Using Hierarchical State Machines", IEEE 1991, pp. 110-119.
Norton, "Simalytic Hybrid Modeling Planning the Capacity of Client/Server Applications", available at least as early as Jan. 10, 2007, at <<http://citeseer.ist.psu.edu/cache/papers/cs/12830/http:zSzzSzwww.simalytic.comzSzRESUMEzSz.zSzIMACS97x.pdf/simalytic-hybrid-modeling-planning.pdf>>, Colorado Technical University, 1997, pp. 1-7.
"Pretty Good Privacy PGP for Personal Privacy, Version 5.0 For Windows 95 Windows NT", Pretty Good Privacy Inc., 1997, pp. 137.
Shi et al., "An Effective Model for Composition of Secure Systems", The Journal of Systems and Software, 1998, pp. 233-244.
Somers. "Hybrid: Unifying Centralised and Distributed Network Management using Intelligent Agents" IEEE Network Operations and Management Symposium Kyoto Apr. 15-19, 1996. pp. 34-43.
Vadim, "On Virtual Data Centers and Their Operating Environments", at <<http://www.hpl.hp.com/techreports/2001/HPL-2001-44.html>>, Mar. 8, 2001, pp. 1-20.
Wen-Chen Wang, "How a SCVP client authenticates the SCVP server", Online! Sep. 12, 2003, Retrieved from the Internet: URL:http://www.imc.org/ietf-pkix/old-archive-03/msg01323.html], p. 1.
Cardelli, L., "Type Systems," CRC Handbook of Computer Science and Engineering, 2nd Edition, Ch. 97, Wednesday, Feb. 25, 2004, 8:00pm CRC Press., http://research.microsoft.com/Users/luca/Papers/TypeSystems.pdf.
Menezes, et al., "Handbook of Applied Cryptography", CRC Press, 1996, Chapters 8 & 12, pp. 283-319 and 489-541.
Kitjongthawonkul, S., et al., "Modeling Information Systems Using Objects, Agents, and Task-Based Problem Solving Adapters," Proc.

10th Australasian Conference on Information Systems, 1999, http://www.vuw.ac.nz/acis99/Papers/PaperKitjongthawonkul-077.pdf.

Meader, P., "Build Distributed Apps a New Way," VSLive!ShowDaily, San Francisco, Mar. 25, 2004, http://www.ftponline.com/reports/vslivesf/2004/whitehorse2/.

Meader, P., "Model Apps More Effectively," VSLive!ShowDaily, San Francisco, Mar. 24, 2004, http://www.ftponline.com/reports/vslivesf/2004/whitehorse/.

Tofts, C., "HOLOS—A Simulation and Multi Mathematical Modelling Tool," Hewlett-Packard Company, 2001, http://www.hpl.hp.com/techreports/2001/HPL-2001-276.pdf.

Iwasaki, Hideki "IP Troubles Q & A—The Prevention of Network Troubles and the Risk Management", Computer & Network LAN, Japan Ohmsha, Ltd., vol. 18, No. 8, (Jul. 14, 2000), pp. 29-39.

Translated copy of the Japanese Office Action mailed on Jan. 26, 2007 for Japanese Patent Application No. 2001-326848, a counterpart foreign application of US Patent No. 6,886,038.

Translated copy of the Japanese Office Action mailed on Dec. 14, 2007 for Japanese Patent Application No. 2001-326848, a counterpart foreign application of US Patent No. 6,886,038.

"The Age Changed by Information Network and System: The Internet Releasing Enterprises and Society A? The New Century created by an E Service and a Terabit Network Service: Disapperance of Enterprise Servers, Service Components behind the Internet", Nikkei Internet Technology, Japan, Nikkei BUsiness Publications, Inc. No. 30, (Dec. 22, 1999), pp. 76-81.

Lee, et al., "Community Services: A Toolkit for Rapid Deployment of Network Services", Proceedings of the IEEE International Conference on Cluster Computing, Cluster 2002, IEEE, 2002, 4 pages.

Meli, "Measuring Change Requests to support effective project management practices", Proc of the ESCOM 2001, London, Apr. 2001, pp. 25-34.

Microsoft.com, "System Definition Model", retrived at <<http://web.archive.org/web/20040405230803/www.microsoft.com/windowsserversystem/dsi/sdm.mspx>>, Mar. 31, 2004.

PCT Intl Search Report and Written Opinion for Application No. PCT/US2006/038856, dated Feb 20, 2007, 9 pgs.

Heinl, et al., "A Comprehensive Approach to Flexibility in Workflow Management Systems", WACC 1999, ACM, 1999, pp. 79-88.

"Remote Operating System Installation", retrieved on Feb. 13, 2009 at <<http://technet.microsoft.com/en-us/library/bb742501.aspx>>, Microsoft TechNet, Sep. 9, 1999, pp. 1-28.

Burns, et al., "Allocation and Data Placement Using Virtual Contiguity," published Feb. 6, 2001, pp. 1-6.

Chunxiao, et al., Configure and move the e-Commerce Business Model by Utilizing XML, Applications of Computer Systems, No. 2, Feb. 28, 2002, pp. 8-11 (English Translation cited below in No. 3).

Chunxiao, et al, "Using XML Schema to Configure Mobile E-Commerce Transaction Model", Applications of the Computer Systems, No. 2, Feb. 28, 2002, 9 pages. (Original Chinese document cited above in No. 2).

"Core Principles of the Dynamic Systems Initiative: Leveraging System Knowledge, Captured in Software Models, to Address Challenges Across the IT Life Cycle," Windows Server System, <<http://www.microsoft.com/windowsserversystem/dsi/dsicore.mspx>>, Published Nov. 15, 2004, 3 pages.

Dekhil, et al., "Generalized Policy Model for Application and Service Management", Hewlett-Packard Laboratories, Software Technology Lab, retrieved on Jan. 15, 2009 from <<http://www.policy-workshop.org/1999/policy-99/pdf/17b-dekhil.pdf>>, Published 1999, 3 pages.

Garschhammer, et al., "Towards Generic Service Management Concepts a Service Model Based Approach," May 2001, 14 pages.

"Integrated Security Management", OpenPMF (Policy Management Framework), retrieved as early as Apr. 23, 2007 from <<http://www.objectsecurity.com/doc/openpmf-A4.pdf>>, 2 pages.

Nerurkar, "Security Analysis and Design", Dr. Dobbs Journal, Nov. 2000, pp. 50-56.

"System Definition Model," Windows Server System Home, <<http://www.microsoft.com/windowsserversystem/dsi/sdm.mspx>>, published Dec. 15, 2003, 3 pages.

Yuhui, e-Commerce Based on ERP for Enterprize by Utilizing DNA and XML, Computer Engineering, vol. 27, No. 6, Jun. 30, 2001, p. 165,166,182.

* cited by examiner

| H&L TABLE | | 1204 |
|---|---|---|
| APPLICATION IDENTIFIER (ID) 1302(A) | APPLICATION STATUS CHARACTERIZATION 1302(B) | LOAD BALANCER DIRECTIVE 1302(C) |
| VIRTUAL IP ADDR. & PORT | APPLICATION HEALTH | TARGET LOAD BALANCING STATE |
| PHYSICAL IP ADDR. & PORT | APPLICATION LOAD | |
| PROTOCOL | | CURRENT LOAD BALANCING STATE |
| PROTOCOL-SPECIFIC INFO. | APPLICATION CAPACITY | |

| SESSION TABLE | 2014 | | |
|---|---|---|---|
| SESSION IDENTIFIER | 2302(1I) | SESSION TYPE/APPLIC. | 2302(1T) |
| SESSION IDENTIFIER | 2302(2I) | SESSION TYPE/APPLIC. | 2302(2T) |
| ⋮ | ⋮ | ⋮ | ⋮ |
| SESSION IDENTIFIER | 2302(vI) | SESSION TYPE/APPLIC. | 2302(vT) |

*FIG. 23A*

| DISTRIBUTED ATOM MANAGER (DAM) TABLE (DAMT) | 2206 | | | | |
|---|---|---|---|---|---|
| KEY | 2304(1K) | DATA | 2304(1D) | METADATA | 2304(1M) |
| KEY | 2304(2K) | DATA | 2304(2D) | METADATA | 2304(2M) |
| ⋮ | ⋮ | ⋮ | ⋮ | ⋮ | ⋮ |
| KEY | 2304(wK) | DATA | 2304(wD) | METADATA | 2304(wM) |

*FIG. 23B*

NETWORK LOAD BALANCING WITH HOST STATUS INFORMATION

TECHNICAL FIELD

This disclosure relates in general to network load balancing and in particular, by way of example but not limitation, to network load balancing with host status information.

BACKGROUND

Communication, and many facets of life that involve communication, has been greatly impacted by the Internet. The Internet enables information to be communicated between two people and/or entities quickly and relatively easily. The Internet includes many network nodes that are linked together such that information may be transferred between and among them. Some network nodes may be routers that propagate a packet from one link to another, may be individual client computers, may be personal networks for different entities (e.g., intranets for businesses), and so forth.

For this personal network case, as well as others, packets arriving at an Internet node or nodes are distributed to other nodes within the personal network. Such a personal network may be formed, for example, from a set of servers that can each work on packets that arrive at the personal network. A business, a university, a government office, etc. may receive many packets in a short timeframe at its personal network. In order to respond in a timely manner and to reduce the likelihood of rejection or loss of arriving packets, the personal network may rely on multiple servers that can each work on the arriving packets simultaneously.

The arriving packets are often inquiries pertaining to certain information, such as a document, a catalog item, a web page, and so forth. The arriving packets can also pertain to an economic transaction between a customer and a merchant. Other purposes for the packets of a packet-based communication are possible. Regardless, the arriving packets are distributed among different servers of a set of servers to accommodate a rapid arrival of the packets and/or complex communication exchanges.

The distribution of arriving packets among different servers of a set of servers is often termed network load balancing. In other words, a load balancing operation may be performed on packets as they arrive at a node or nodes of the Internet when the node or nodes constitute a personal network and/or when they connect the personal network to the Internet.

Such a load balancing operation is accomplished using dedicated hardware that fronts the personal network at the node or nodes that connect the personal network to the Internet and/or that provide a presence for the personal network on the Internet. The physical hardware that performs the load balancing operation is usually duplicated in its entirety to realize redundancy and improve availability of the load balancing operation. To increase capacity for load balancing operations, more-powerful hardware that replicates the entirety of the previous load balancing hardware, and thus the operational capability thereof, is substituted for the previous load balancing hardware. Such scaling up of the load balancing operational capabilities is therefore confined to increasing the power of the hardware via substitution thereof.

To implement a load balancing operation, the hardware usually performs a round robin distribution of arriving connection requests. In other words, arriving connection requests are distributed to servers of a set of servers in a linear, repeating manner with a single connection request being distributed to each server. This round-robin load balancing distribution of connections is typically utilized irrespective of the condition of the personal network or the nature of an arriving connection request. If a load balancing operation does extend beyond a round robin distribution, these other factors are only considered to the extent that they may be inferred from network traffic and/or from a congestion level of the personal network.

Accordingly, there is a need for schemes and/or techniques that improve network load balancing and/or the options associated therewith.

SUMMARY

In a first exemplary media implementation, one or more processor-accessible media include processor-executable instructions that, when executed, direct a system to perform actions that include: accumulating host status information at multiple hosts; and sending the accumulated host status information from the multiple hosts. In a second exemplary media implementation, one or more processor-accessible media include processor-executable instructions that, when executed, direct a system to perform actions that include: receiving host status information from multiple hosts; and making load balancing decisions responsive to the received host status information. In a third exemplary media implementation, one or more processor-accessible media include processor-executable instructions that, when executed, direct a system to perform actions that include: determining health and load information on a per application basis; and selecting an application from among multiple applications responsive to the health and load information.

In a fourth exemplary media implementation, one or more processor-accessible media include processor-executable instructions that, when executed, direct a system to perform actions that include: analyzing health and/or load information for multiple application endpoints; and ascertaining a token allotment for the multiple application endpoints responsive to the analyzing.

In a fifth exemplary media implementation, one or more processor-accessible media include processor-executable instructions that, when executed, enable a system to implement a message protocol between at least one host and one or more load balancing units, the message protocol usable for communicating health and/or load information between the at least one host and the one or more load balancing units.

In an exemplary system implementation, a system includes: at least one device that is hosting one or more applications, the at least one device including a health and load table that includes multiple entries, each entry of the multiple entries associated with an application of the one or more applications; each entry of the multiple entries including: an application identifier for a particular application of the one or more applications; information characterizing at least one status of the particular application; and at least one load balancing directive regarding the particular application.

Other method, system, approach, apparatus, application programming interface (API), device, media, procedure, arrangement, etc. implementations are described herein.

BRIEF DESCRIPTION OF THE DRAWINGS

The same numbers are used throughout the drawings to reference like and/or corresponding aspects, features, and components.

FIG. 23A is an exemplary session table as illustrated in FIG. 20.

FIG. 23B is an exemplary distributed atom manager (DAM) table (DAMT) as illustrated in FIG. 22.

DETAILED DESCRIPTION

Exemplary Network Load Balancing Paradigms

This section describes exemplary paradigms for network load balancing and is used to provide foundations, environments, contexts, etc. for the descriptions in the following sections. This section primarily references FIGS. 1-3.

Figure 1:
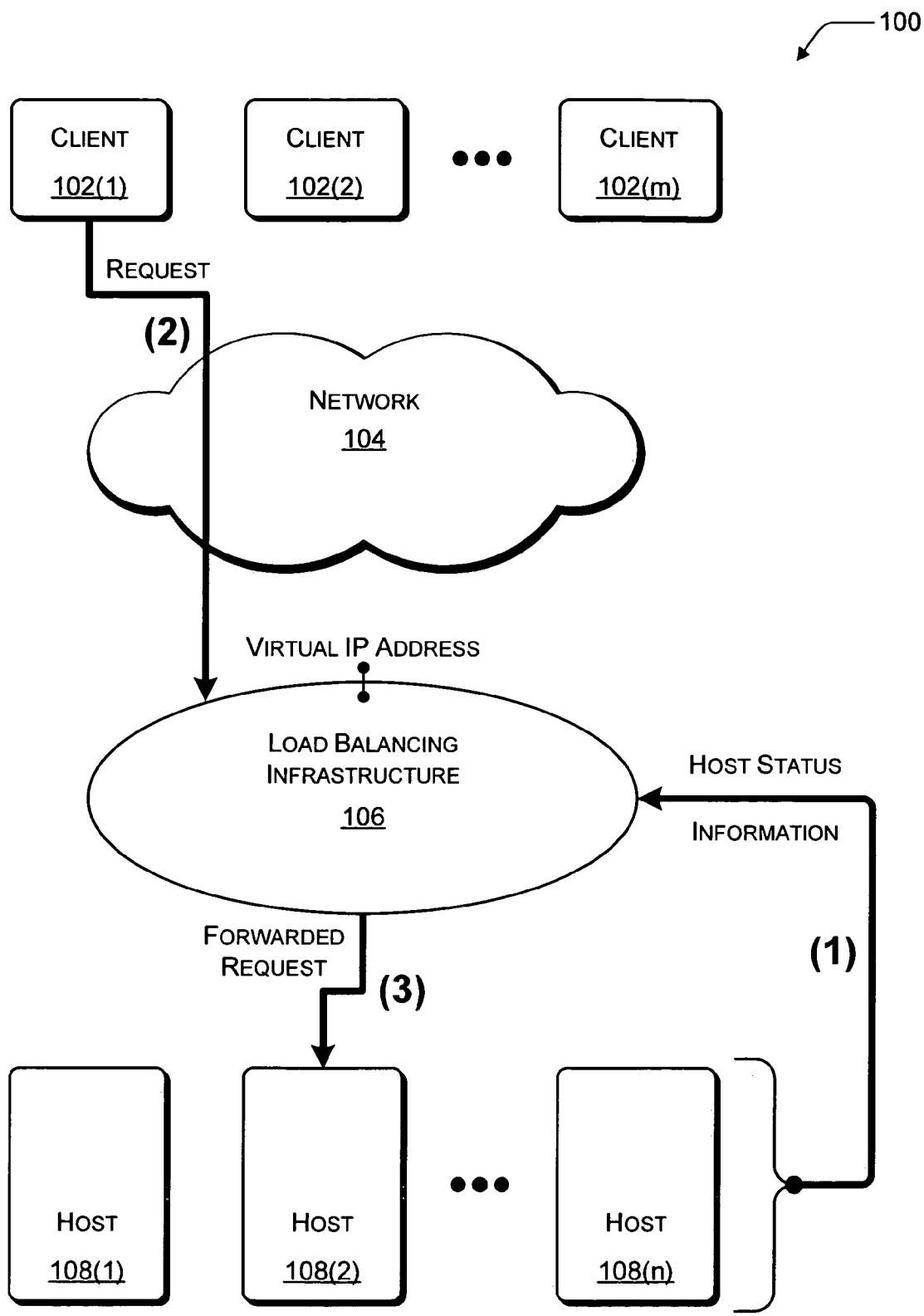
FIG. 1 is an exemplary network load balancing paradigm that illustrates a load balancing infrastructure and multiple hosts.

FIG. 1 is an exemplary network load balancing paradigm 100 that illustrates a load balancing infrastructure 106 and multiple hosts 108. Exemplary network load balancing paradigm 100 includes multiple clients 102(1), 102(2) ... 102(m) and multiple hosts 108(1), 108(2) ... 108(n), as well as network 104 and load balancing infrastructure 106.

Each of clients 102 may be any device that is capable of network communication, such as a computer, a mobile station, an entertainment appliance, another network, and so forth. Clients 102 may also relate to a person and/or entity that is operating a client device. In other words, clients 102 may comprise logical clients that are users and/or machines. Network 104 may be formed from one or more networks, such as the Internet, an intranet, a wired or wireless telephone network, and so forth. Additional examples of devices for clients 102 and network types/topologies for network 104 are described below with reference to FIG. 40 in the section entitled "Exemplary Operating Environment for Computer or Other Device".

Individual clients 102 are capable of communicating with one or more hosts 108, and vice versa, across network 104 via load balancing infrastructure 106. Hosts 108 host one or more applications for interaction/communication with clients 102, for use by clients 102, and so forth. Each host 108 may correspond to a server and/or a device, multiple servers and/or multiple devices, part of a server and/or part of a device, some combination thereof, and so forth. Particular implementations for hosts 108 are described further below in the context of different network load balancing situations. (However, back-end support for hosts 108 is generally not shown for the sake of clarity.) Furthermore, additional examples of devices for hosts 108 are also described below with reference to FIG. 40 in the section entitled "Exemplary Operating Environment for Computer or Other Device".

Load balancing infrastructure 106 is reachable or locatable through network 104 at one or more virtual internet protocol (IP) addresses. Communications from clients 102 (or other nodes) that are directed to the virtual IP address of load balancing infrastructure 106 are received there and forwarded to a host 108. Load balancing infrastructure 106 is comprised of hardware and/or software components (not explicitly shown in FIG. 1).

Although load balancing infrastructure 106 is shown as an integral ellipse, the infrastructure to effectuate load balancing may also be distributed to other aspects of exemplary network load balancing paradigm 100. For example, software component(s) of load balancing infrastructure 106 may be located at one or more of hosts 108 as is described further below. Examples of architectures for load balancing infrastructure 106 are described below with reference to FIG. 40 in the section entitled "Exemplary Operating Environment for Computer or Other Device".

As indicated at (1), one or more of hosts 108 may provide host status information from hosts 108 to load balancing infrastructure 106. This host status information may be application specific. Examples of such host status information are described further below and include health and/or load information, session information, etc. for hosts 108. A particular implementation that includes providing health and/or load information from hosts 108 to load balancing infrastructure 106 is described below in the section entitled "Exemplary Health and Load Handling".

At (2), a request is sent from client 102(1) across network 104 to load balancing infrastructure 106 at the virtual IP address thereof. The content, format, etc. of a request from a client 102 may depend on the application to which the request is directed, and the term "request" may implicitly include a response or responses from host(s) 108, depending on the context. Kinds of client requests include, but are not limited to:

1. Hyper text transfer protocol (HTTP) GET requests from a client using a browser program. Depending on the application (and more specifically, on the uniform resource locator (URL) of the requests), it may be better to service the requests by different sets of hosts, and the existence of a client "session" state on the hosts may militate that requests from specific clients be routed to specific hosts. The requests may be over a secure sockets layer (SSL) (or other encrypted) connection.
2. Virtual private network (VPN) connections (e.g., the hosts are a set of VPN servers). In this case, the "request" can be considered to be a layer-2 tunneling protocol (L2TP) or point-to-point tunneling protocol (PPTP) "connection" (the latter is a combination of a transmission control protocol (TCP) control connection and associated generic routing encapsulation (GRE) data traffic).
3. Terminal server connections (e.g., the hosts are a set of terminal servers).
4. Proprietary requests in the form of individual TCP connections (one per request) employing a proprietary application-specific protocol.
5. Simple object access protocol (SOAP) requests.
6. Real-time communication requests involving control information over a TCP connection and latency-sensitive media streaming over real-time protocol (RTP).

Thus, requests can take many diverse, application-specific forms. In certain described implementations, load balancing infrastructure 106 may make application-specific forwarding decisions.

At (3), load balancing infrastructure 106 forwards the request from 102(1) to host 108(2) (in this example). Load balancing infrastructure 106 may consider one or more of many factors when selecting a host 108 to which the request is to be forwarded, depending on which implementation(s) described herein are being employed. For example, load balancing infrastructure 106 may take into account: the application health and/or load information of each host 108, session information relating to client 102(1) as stored at a host 108, and so forth.

Figure 2:
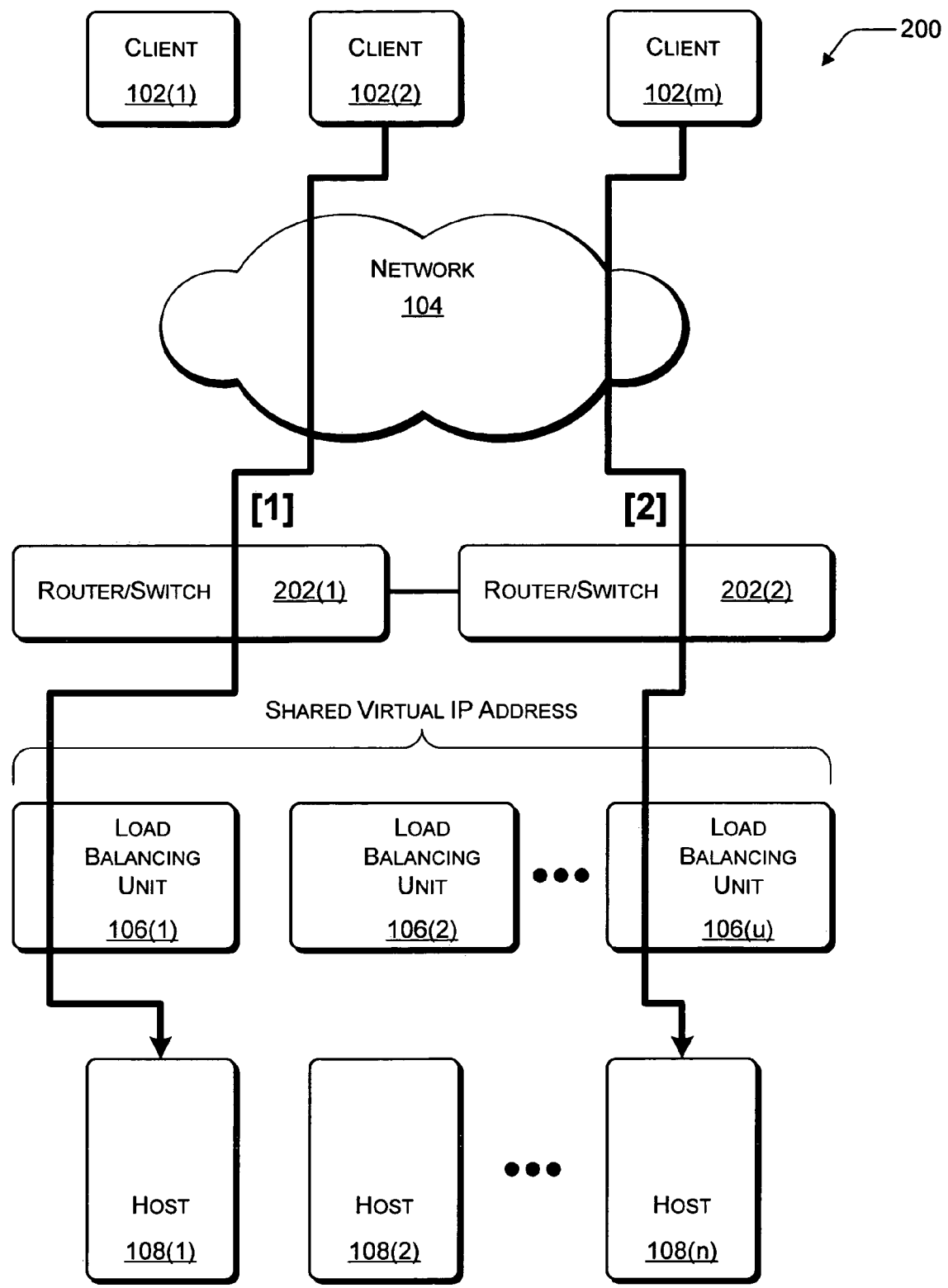
FIG. 2 is an exemplary network load balancing paradigm that illustrates multiple load balancing units and multiple hosts.

FIG. 2 is an exemplary network load balancing paradigm 200 that illustrates multiple load balancing units 106 and multiple hosts 108. Specifically, load balancing infrastructure 106 is shown as multiple load balancing units 106(1), 106(2) . . . 106(u) in exemplary network load balancing paradigm 200. Additionally, two router and/or switches 202(1) and 202(2) are illustrated.

Router/switches 202, if present, may be considered as part of or separate from load balancing infrastructure 106 (of FIG. 1). Router/switches 202 are responsible of directing overall requests and individual packets that are received from network 104 to the shared virtual IP (VIP) address(es) of load balancing units 106. If a first router/switch 202 fails, the second router/switch 202 may takeover for the first. Although two router/switches 202 are illustrated, one or more than two router/switches 202 may alternatively be employed.

Router/switches 202 may be ignorant of the load balancing infrastructure or load-balancing aware. If router/switches 202 are not load-balancing aware, one of two exemplary options may be employed: For a first option, one load balancing unit 106 is "assigned" the shared VIP address, and all network traffic is forwarded thereto. This one load balancing unit 106 then evenly redistributes the traffic across the other load balancing units 106. However, there are bottleneck and failover issues with this first option (which can be mitigated if multiple VIP addresses are shared and are split between multiple load balancing units 106). For a second option, router/switches 202 are "tricked" into directing network traffic to all load balancing units 106, which individually decide what traffic each should accept for load balancing. However, there are inefficient effort duplication and switch performance/compatibility issues with this second option.

If, on the other hand, router/switches 202 are load-balancing aware, router/switches 202 can be made to distribute incoming network traffic between/among multiple load balancing units 106 (e.g., in a round-robin fashion). It should be understood that such load-balancing-aware routers/switches 202 are capable of performing load balancing functions at a rudimentary level (e.g., in hardware). For example, load-balancing-aware routers/switches 202 can perform simple IP-address-based session affinity so that all packets from a specific source IP address are directed to a same load balancing unit 106.

Each separately-illustrated load balancing unit 106 of load balancing units 106 may represent one physical device, multiple physical devices, or part of a single physical device. For example, load balancing unit 106(1) may correspond to one server, two servers, or more. Alternatively, load balancing unit 106(1) and load balancing unit 106(2) may together correspond to a single server. An exemplary load balancing unit 106 is described further below from a functional perspective with reference to FIG. 3.

Two exemplary request paths [1] and [2] are illustrated in FIG. 2. For request path [1], client 102(2) transmits a request over network 104 that reaches router/switch 202(1). Router/switch 202(1) directs the packet(s) of the request that originated from client 102(2) to load balancing unit 106(1). Load balancing unit 106(1) then forwards the packet(s) of the request to host 108(1) in accordance with some load-balancing functionality (e.g., policy). For request path [2], client 102(m) transmits a request over network 104 that reaches router/switch 202(2). Router/switch 202(2) directs the packet(s) of the request that originated from client 102(m) to load balancing unit 106(u). Load balancing unit 106(u) then forwards the packet(s) of the request to host 108(n) in accordance with some load-balancing functionality. Exemplary load-balancing functionality is described further below with reference to FIG. 3.

Figure 3:
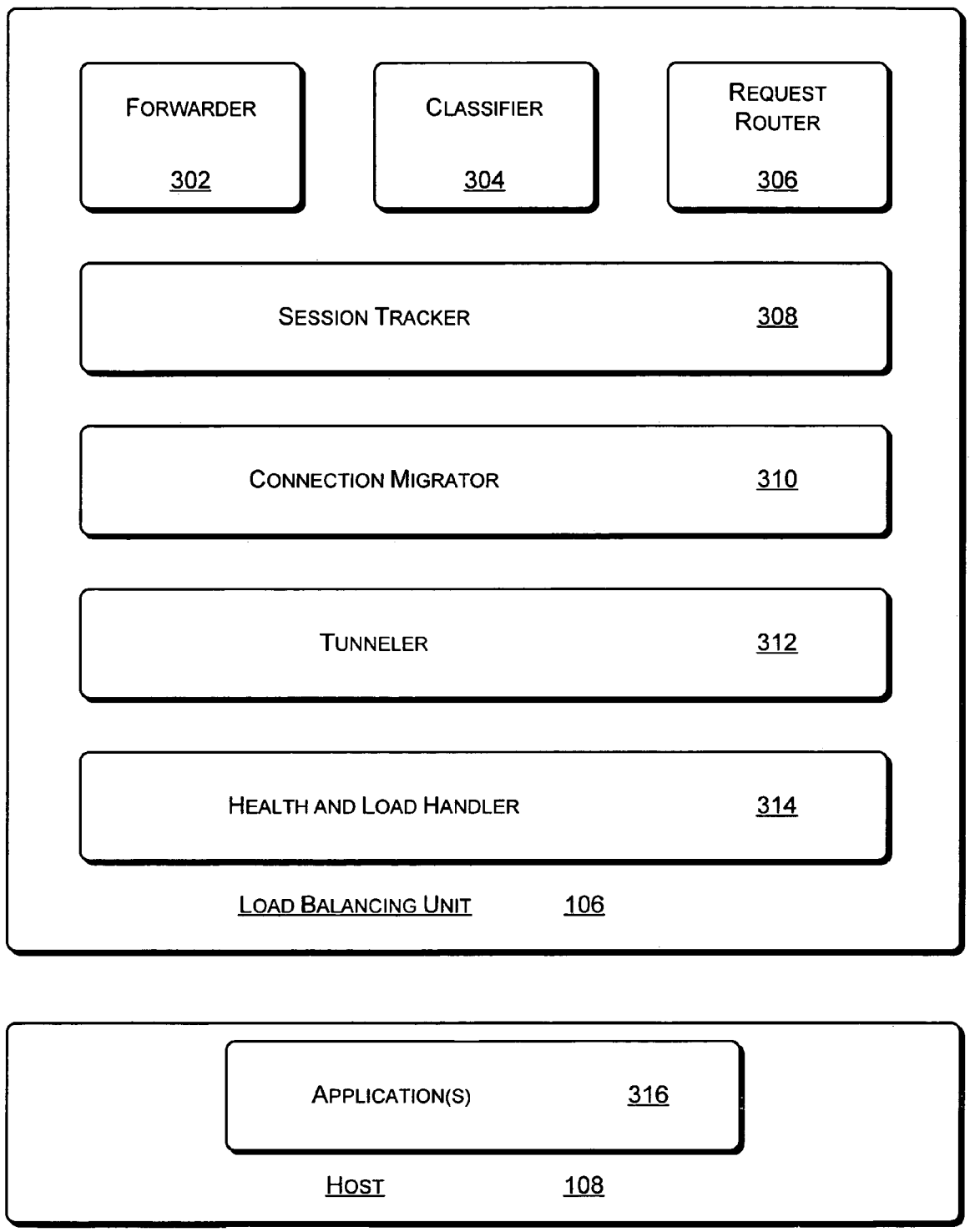
FIG. 3 illustrates an exemplary load balancing unit having separated functionality and an exemplary host.

FIG. 3 illustrates an exemplary load balancing unit 106 having separated functionality and an exemplary host 108. Load balancing unit 106 includes seven (7) functional blocks 302-314. These functional blocks of load balancing unit 106 may be realized at least partially using software. Host 108 includes one or more applications 316. In a described implementation, load balancing unit 106 includes a forwarder 302, a classifier 304, a request router 306, a session tracker 308, a connection migrator 310, a tunneler 312, and a health and load handler 314.

Health and load handler 314 is located partly at hosts 108 and partly on devices of load balancing units 106. Health and load handler 314 monitors the health and/or load (or more generally the status) of hosts 108 so that health and/or load information thereof may be used for the load-balancing functionality (e.g., when making load-balancing decisions). Exemplary implementations for health and load handler 314 are described further below, particularly in the section entitled "Exemplary Health and Load Handling".

Session tracker 308 may also be located partly at hosts 108 and partly on devices of load balancing units 106. Session tracker 308 monitors sessions that are established by clients 102 so that reconnections/continuations of previously-established sessions may be facilitated by the load-balancing functionality. For example, some applications keep application-specific client session data on the hosts (which is also a type of host status information). These applications typically expect that clients use the same host for the duration of any given session. Exemplary types of sessions include: (i) a TCP connection (which is, strictly speaking, a session); (ii) an SSL session; (iii) a secure IP (IPsec) session; (iv) an HTTP cookie-based session; and so forth.

Although session tracker 308 is illustrated as a discrete block in load balancing unit 106, session tracking functionality of session tracker 308 may actually be implemented at a global level. In other words, session affinity is supported across multiple load balancing units 106. Session tracker 308 includes a centralized database and/or a distributed database of session information in order to preserve session affinity. Exemplary implementations for session tracker 308, with an emphasis on a distributed database approach, are described further below, particularly in the section entitled "Exemplary Session Tracking".

Classifier 304 uses the data acquired and maintained by health and load handler 314 and/or session tracker 308, possibly in conjunction with other factors, to classify incoming requests. In other words, classifier 304 selects a target host 108 for each incoming request from a client 102. Forwarder 302 forwards client requests (and/or the packets thereof) in accordance with the targeted host 108 as selected by classifier 304. Forwarder 302 and classifier 304 may operate on a per-packet basis. Exemplary implementations for forwarder 302 and classifier 304 are described further below, particularly in the sections entitled "Exemplary Approach to Flexible Network Load Balancing" and "Exemplary Classifying, Forwarding, and Request Routing".

Request router 306, as contrasted with per-packet implementations of forwarder 302 and classifier 304, can act as a proxy for an application running on a host 108. For example, request router 306 may terminate TCP connections, parse (perhaps partially) each logical request from a client 102, and resubmit each logical request to the targeted host 108. Consequently, each logical request from a client 102 may be directed to a different host 108, depending on the decisions made by request router 306. Furthermore, request router 306 may perform pre-processing on a connection (e.g., SSL decryption), may choose to absorb certain requests (e.g., because request router 306 maintains a cache of responses), may arbitrarily modify requests before forwarding them to hosts 108, and so forth. Exemplary implementations for request router 306 are also described further below, particularly in the sections entitled "Exemplary Approach to Flexible Network Load Balancing" and "Exemplary Classifying, Forwarding, and Request Routing".

Connection migrator 310 enables a connection to be initially terminated at load balancing unit 106 and then migrated such that the connection is subsequently terminated at host 108. This connection migration can facilitate application-level load balancing. Connection migrator 310 is capable of migrating a connection from load balancing unit 106 to a host 108 in such a manner that that the original termination at load balancing unit 106 is transparent to a requesting client 102 and to applications 316 of the newly-terminating host 108. Tunneler 312 may utilize an encapsulation scheme for the tunneling of packets that does not introduce an overhead to each tunneled packet.

The functionality of tunneler 312 may also be used in situations that do not involve a connection migration. Furthermore, connection migrator 310 and/or tunneler 312 may additionally be used in non-load-balancing implementations. Exemplary implementations for connection migrator 310, as well as for tunneler 312, are described further below, particularly in the section entitled "Exemplary Connection Migrating with Optional Tunneling and/or Application-Level Load Balancing".

Any given implementation of a load balancing unit 106 may include one or more of the illustrated functions. Although illustrated separately, each of the functions of blocks 302-314 may actually be interrelated with, overlapping with, and/or inclusive of other functions. For example, health and/or load information of health and load handler 314 may be used by classifier 304. Also, connection migrator 310 and tunneler 312 work in conjunction with forwarder 302 and classifier 304. Certain other exemplary overlapping and interactions are described herein below.

In a described implementation, host 108 runs and provides access to one or more applications 316. Generally, applications 316 include file delivery programs, web site management/server programs, remote access programs, electronic mail programs, database access programs, and so forth. Specifically, applications 316 may include, but are not limited to, web servers such as Internet Information Server® (IIS) from Microsoft® Corporation, terminal servers such as Microsoft® Terminal Server™, and firewall and proxy products such as Internet Security and Acceleration Server™ (ISA). Although the specific application 316 examples in the preceding sentence relate to Microsoft® products, network load balancing as described herein is not limited to any particular vendor(s), application(s), or operating system(s).

Exemplary Approach to Flexible Network Load Balancing

This section illuminates how the network load balancing implementations described in this and other sections herein provide a flexible approach to network load balancing. This section primarily references FIGS. 4-9B.

As noted above, network load balancing functionality may be scaled up by replacing a first network load balancer with a second, bigger and more powerful network load balancer. The hardware capabilities of the second network load balancer replicate the entirety of the hardware capabilities of the first network load balancer, except that a greater capacity is provided. This is an inflexible approach that can be very inefficient, especially when only one network load balancing feature is limiting performance and precipitating an upgrade of a network load balancer.

Figure 4:
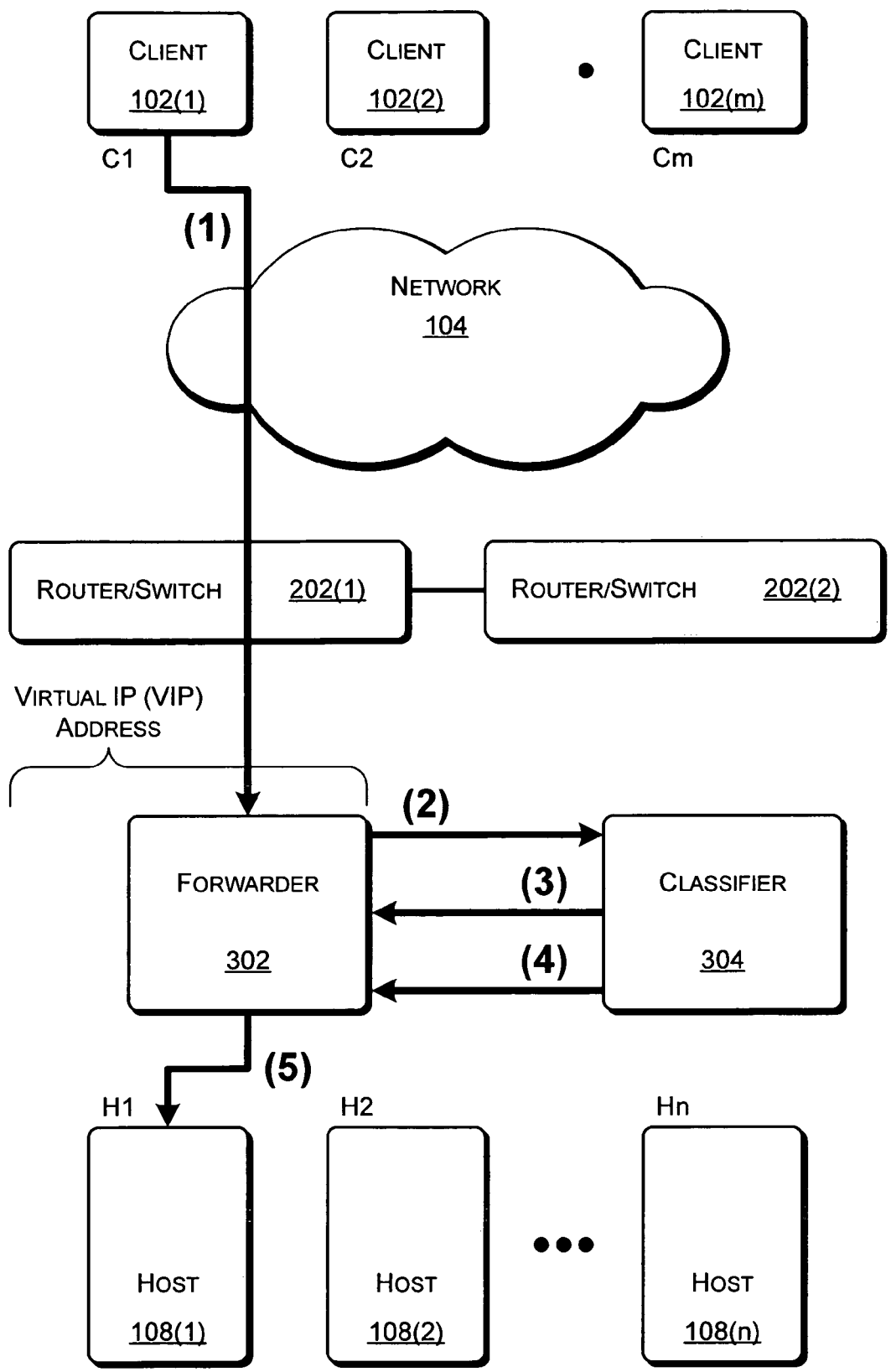
FIG. 4 illustrates exemplary network load balancing infrastructure having separated classifying and forwarding functionality.

FIG. 4 illustrates exemplary network load balancing infrastructure having separated classifying and forwarding functionality. The separated classifying functionality and forwarding functionality are represented by classifier 304 and forwarder 302, respectively. Although classifying and forwarding functions are described further below, especially in the section entitled "Exemplary Classifying, Forwarding, and Request Routing", an initial description is presented here as an example of interaction between network load balancing infrastructure functionality and hosts 108.

In a described implementation, forwarder 302 corresponds to, and is the network endpoint for, the virtual IP (VIP) address (or addresses). Forwarder 302 is a relatively low-level component that makes simplified and/or elementary policy decisions, if any, when routing packets to a further or final destination. Forwarder 302 consults a routing table to determine this destination. Classifier 304 populates the routing table based on one or more factors (e.g., host status information), which are described further in other sections herein.

Clients 102 and hosts 108 also correspond to indicated network addresses. Specifically, client 102(1) corresponds to address C1, client 102(2) corresponds to address C2 . . . client 102(m) corresponds to address Cm. Also, host 108(1) corresponds to address H1, host 108(2) corresponds to address H2 . . . host 108(n) corresponds to address Hn.

Five communication paths (1)-(5) are shown in FIG. 4. Communication path (1) is between client 102(1) and forwarder 302, and communication path (5) is between forwarder 302 and host 108(1). Communication paths (2)-(4) are between forwarder 302 and classifier 304. For simplicity in this example, the connection associated with communication paths (1)-(5) is an HTTP TCP connection. Furthermore, load balancing in this example relates to routing incoming connections to the least loaded host 108, at least without any explicit consideration of application-level load balancing.

Communication paths (1)-(5) indicate how forwarder 302 and classifier 304 load-balance a single HTTP TCP connection from client 102(1). At (1), client 102(1) initiates the TCP connection by sending a TCP SYN packet addressed to the VIP address. The routing infrastructure of network 104 routes this packet to forwarder 302 via router/switch 202(1), which is the "closest" router/switch 202 to forwarder 302.

At (2), forwarder 302 consults a routing table, which may be internal to forwarder 302 or otherwise accessible therefrom, in order to look up this connection. This connection may be identified in the routing table by the TCP/IP 4-tuple (i.e., source IP address, source TCP port, destination IP address, destination TCP port). Because this is the first packet of the connection, there is no entry in the routing table. Forwarder 302 therefore applies the "default route" action, which is to send this packet to classifier 304.

At (3), classifier 304 consults its (e.g., consolidated) cache of host status information for hosts 108(1), 108(2) . . . 108(n). Classifier 304 concludes that host 108(1) is available and the least loaded host 108 at this instant for this example. Classifier 304 also "plumbs" a route in the routing table consulted by forwarder 302 for this TCP connection. For example, classifier 304 adds a route entry or instructs forwarder 302 to add a route entry to the routing table that maps the TCP connection (e.g., identified by the TCP 4-tuple) to a specific destination host 108, which is host 108(1) in this example. More particularly, the route entry specifies the network address H1 of host 108(1).

At (4), classifier 304 sends the TCP SYN packet back to forwarder 302. Alternatively, classifier 304 may forward this initial TCP SYN packet to host 108(1) without using forwarder 302. Other options available to classifier 304 are described further below.

At (5), forwarder 302 can access a route entry for the connection represented by the SYN packet, so it forwards the packet to host 108(1) at address H1. Forwarder 302 also forwards all subsequent packets from client 102(1) for this connection directly to host 108(1). In other words, forwarder 302 can avoid further interaction with classifier 304 for this connection. One or a combination of mechanisms, which are described further below, may be used to delete the route entry when the connection ceases.

For communication path (5) in many protocol environments, forwarder 302 cannot simply send the packets from client 102(1) as-is to host 108(1) at network address H1 because these packets are addressed to the VIP address, which is hosted by forwarder 302 itself. Instead, forwarder 302 may employ one or more of the following exemplary options:

1. Forwarder 302 performs Network Address Translation (NAT) by (i) overwriting the source (client 102(1)) IP address (C1) and port number with the IP address and NAT-generated port number of forwarder 302 and (ii) overwriting the destination IP address (VIP) with the IP address (H1) of the host (108(1)).
2. Forwarder 302 performs "Half-NAT" by overwriting the destination IP address (VIP) with the IP address (H1) of the host (108(1)) so that the source (client 102(1)) IP address (C1) and port number are preserved.
3. Forwarder 302 "tunnels" the packets received from client 102(1) from forwarder 302 to host 108(1). Specifically in this example, tunneling can be effectuated by encapsulating each packet within a new IP packet that is addressed to host 108(1). Network-load-balancing-aware software on host 108(1) reconstructs the original packet as received at forwarder 302 from client 102(1). This original packet is then indicated up on a virtual interface at host 108(1) (e.g., the VIP address corresponding to forwarder 302 is bound to this virtual interface at host 108(1)). Exemplary implementations of such tunneling are described further below with reference to tunneler 312, especially for connection migration scenarios and particularly in the section entitled "Exemplary Connection Migrating with Optional Tunneling and/or Application-Level Load Balancing".

Although FIGS. 4-9B show two specific separated functions, namely classifying and forwarding, it should be understood that other functions, such as those of request router 306, session tracker 308, connection migrator 310, and health and load handler 314, may also be scaled out independently (e.g., factored out independently), as is described further below. Furthermore, it should be noted that one or more than two functions may be separated and scaled out independently at different times and/or simultaneously. Also, although TCP/IP is used for the sake of clarity in many examples in this and other sections, the network load balancing principles described herein are applicable to other transmission and/or communication protocols.

In the exemplary manner of FIG. 4, network load balancing functions (such as those shown in FIG. 3) may be separated from each other for scalability purposes. They may also be separated and duplicated into various configurations for increased availability. Exemplary configurations for scalability and/or availability are described below with reference to FIGS. 6-9B after the method of FIG. 5 is described.

Figure 5:
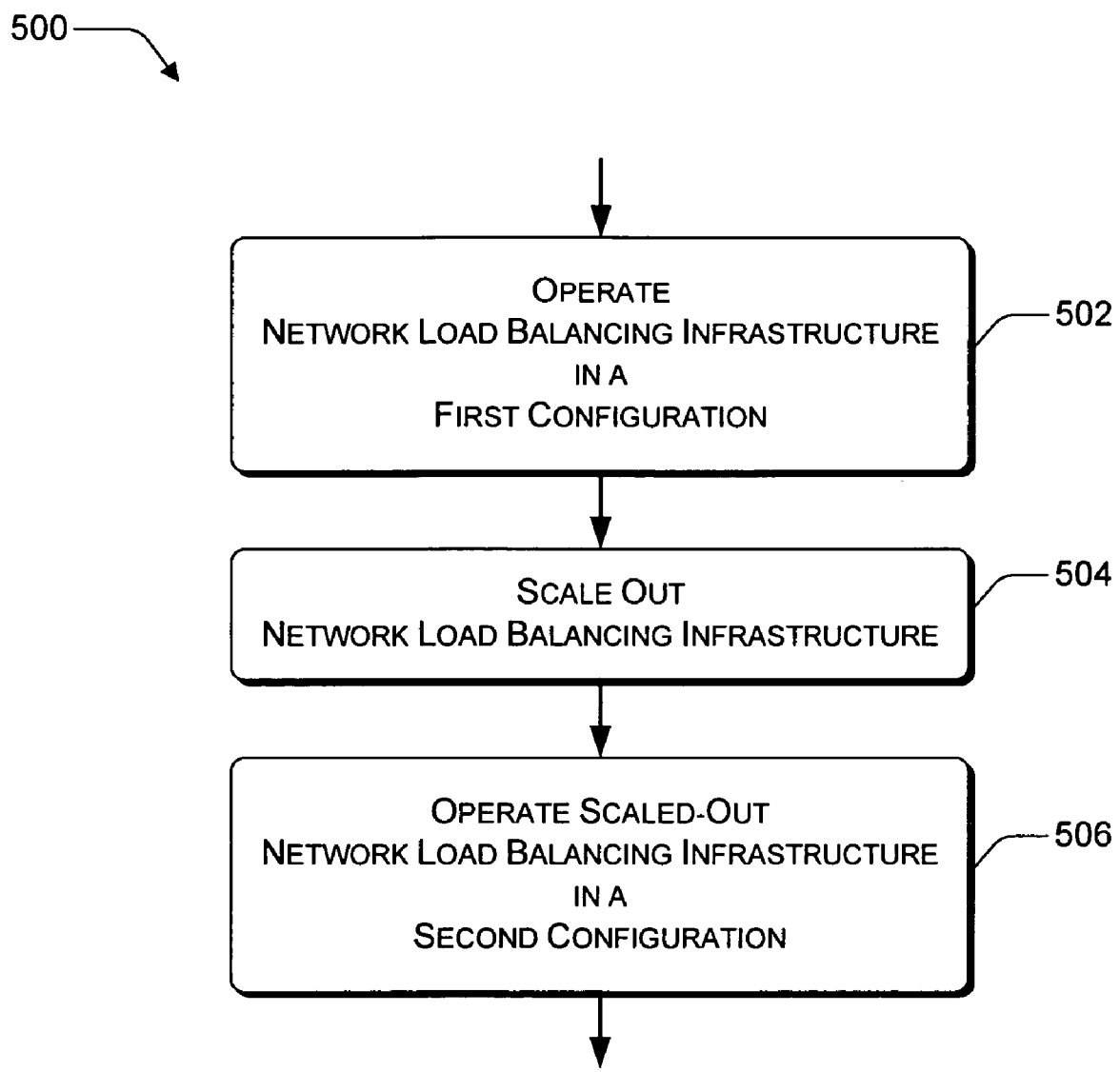
FIG. 5 is a flow diagram that illustrates an exemplary method for scaling out network load balancing infrastructure into different configurations.

FIG. 5 is a flow diagram 500 that illustrates an exemplary method for scaling out network load balancing infrastructure into different configurations. Flow diagram 500 includes three blocks 502-506. Although the actions of flow diagram 500 may be performed in other environments and with a variety of software schemes, FIGS. 1-4 and 6-9B are used in particular to illustrate certain aspects and examples of the method.

At block 502, network load balancing infrastructure is operated in a first configuration. For example, each configuration may relate to one or more of a selection, proportion, and/or interrelationship of different load balancing functionalities; a number of and/or type(s) of different devices; an organization and/or layout of different components; a distribution and/or allocation of resources; and so forth. At block 504, the network load balancing infrastructure is scaled out. For example, separated load balancing functionalities may be expanded and/or concomitantly contracted on an individual and/or independent basis. At block 506, the scaled out network load balancing infrastructure is operated in a second configuration.

As noted above, a monolithic network load balancer may be scaled up by increasing network load balancing functionality in its entirety by supplanting previous network load balancing hardware with more-powerful network load balancing hardware. In contradistinction, scaling out network load balancing infrastructure can enable network load balancing (sub-)functions to be scaled out individually and/or independently. It can also enable network load balancing functions to be scaled out together or individually between and among different numbers of devices. Device, component, and resource-oriented scaling out examples are provided below.

Figure 6:
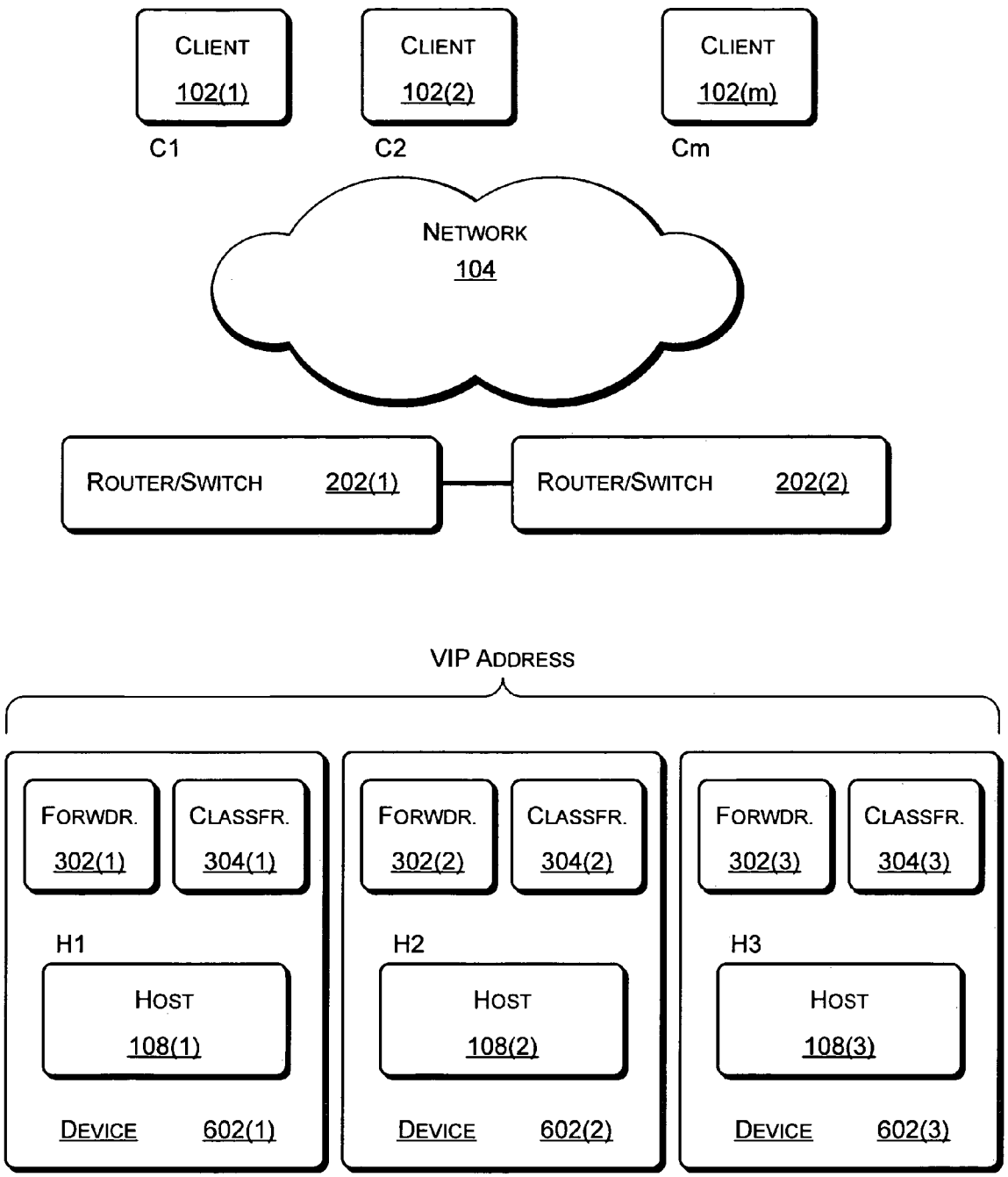
FIG. 6 illustrates a first exemplary network load balancing infrastructure configuration from a device perspective.

FIG. 6 illustrates a first exemplary network load balancing infrastructure configuration from a device perspective. In this first device-oriented network load balancing infrastructure configuration, three devices 602(1), 602(2), and 602(3) are illustrated. However, one, two, or more than three devices 602 may alternatively be employed.

As illustrated, a forwarder 302(1), a classifier 304(1), and a host 108(1) are resident at and executing on device 602(1). A forwarder 302(2), a classifier 304(2), and a host 108(2) are resident at and executing on device 602(2). Also, a forwarder 302(3), a classifier 304(3), and a host 108(3) are resident at and executing on device 602(3). Thus, in this first device-oriented network load balancing infrastructure configuration, a respective forwarder 302, classifier 304, and host 108 are sharing the resources of each respective device 602.

In operation, forwarders 302 are the network endpoints for the VIP address(es). Any classifier 304 may plumb a route for a connection to any host 108, depending on host status information. For example, classifier 304(2) may plumb a route for a new incoming connection to host 108(3). In accordance with a new route entry for this connection, forwarder 302(2) forwards subsequent packets to host 108(3).

In one alternative device-oriented network load balancing infrastructure configuration to which the illustrated first one may be scaled out, a fourth device 602(4) (not explicitly shown in FIG. 6) may be added that includes a forwarder 302(4), a classifier 304(4), and a host 108(4). If, on the other hand, sufficient classification functionality is already present with classifiers 304(1-3) but additional forwarding functionality can benefit the request handling of hosts 108, a fourth device 602(4) may be added that includes a forwarder 302(4) and optionally a host 108(4). For this scaled-out configuration, another classifier 304(1, 2, or 3) may plumb routes for forwarder 302(4) to any of hosts 108(1, 2, or 3) and host 108(4), if present.

The first device-oriented exemplary network load balancing infrastructure configuration of FIG. 6 may be especially appropriate for smaller hosting situations in which separate devices for the network load balancing infrastructure are not technically and/or economically worthwhile or viable. However, as the hosting duties expand to a greater number (and/or a greater demand on the same number) of hosts 108 or if the network load on hosts 108 is significant, the first device-oriented exemplary network load balancing infrastructure configuration may be scaled out to accommodate this expansion, as represented by a second device-oriented exemplary network load balancing infrastructure configuration of FIG. 7.

Figure 7:
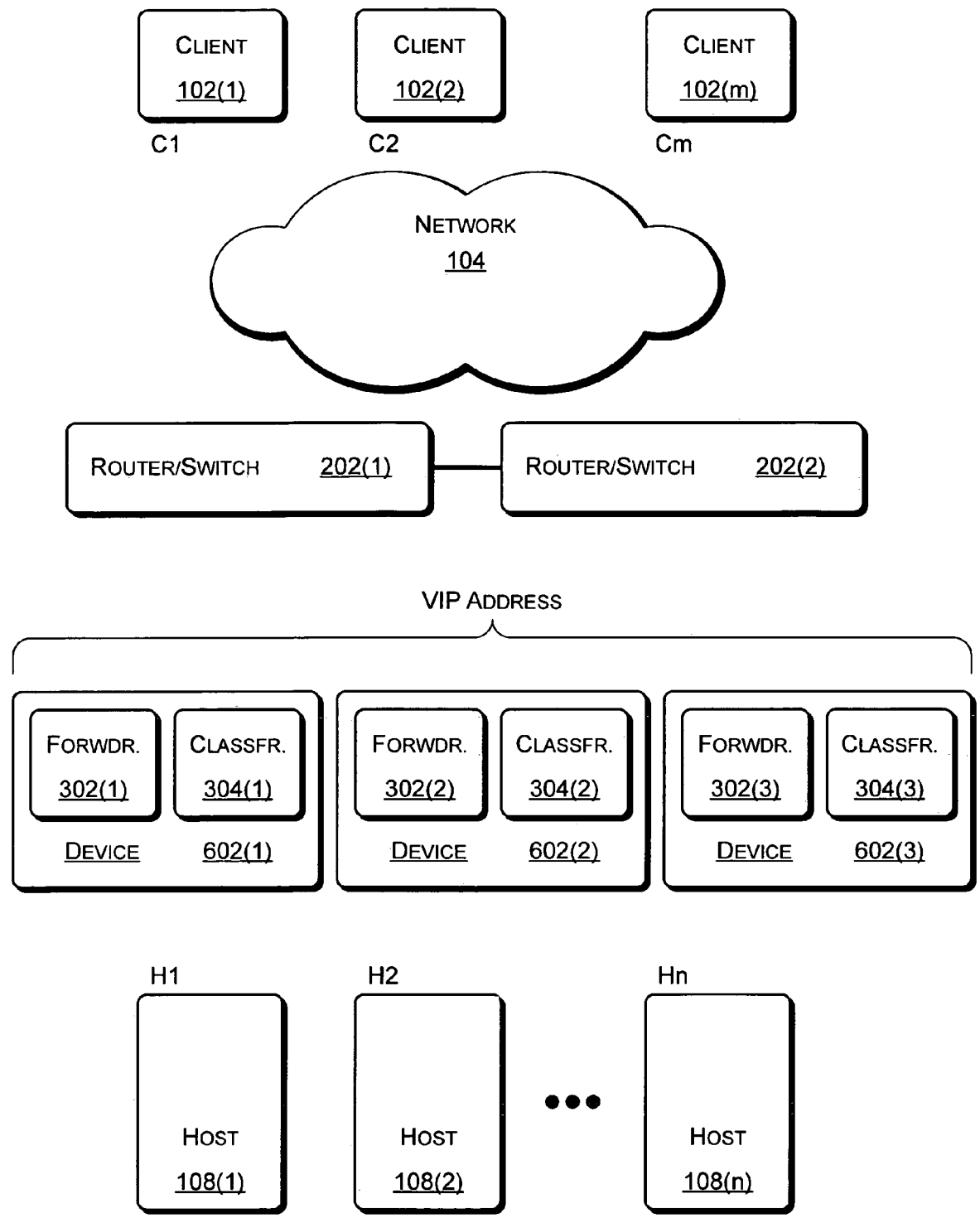
FIG. 7 illustrates a second exemplary network load balancing infrastructure configuration from a device perspective.

FIG. 7 illustrates a second exemplary network load balancing infrastructure configuration from a device perspective. In this second device-oriented network load balancing infrastructure configuration, three devices 602(1), 602(2), and 602(3) are also illustrated. Again, one, two, or more than three devices 602 may alternatively be employed.

As illustrated, forwarder 302(1) and classifier 304(1) are resident at and executing on device 602(1). Forwarder 302(2) and classifier 304(2) are resident at and executing on device 602(2). Also, forwarder 302(3) and classifier 304(3) are resident at and executing on device 602(3). Thus, in this second device-oriented network load balancing infrastructure configuration, each respective forwarder 302 and classifier 304 are not sharing the resources of each respective device 602 with a host 108. Furthermore, the network load balancing infrastructure may be servicing any number of hosts 108.

In operation, forwarders 302 are again the network endpoints for the VIP address(es). Also, any classifier 304 may plumb a route for a connection to any host 108, depending on host status information. For example, classifier 304(3) may plumb a route for a new incoming connection to host 108(2). In accordance with a new route entry for this connection, forwarder 302(3) forwards subsequent packets to host 108(2).

Hence, network load balancing infrastructure as realized in software, for example, may be scaled out by moving the network load balancing infrastructure (or part thereof) from devices that are shared with hosts 108 to devices that are not shared with hosts 108. Also, as alluded to above for FIG. 6, another device 602(4) may be added to the network load balancing infrastructure to provide additional forwarding functionality, additional classifying functionality, additional functionality of both types, and so forth.

Figure 8A:
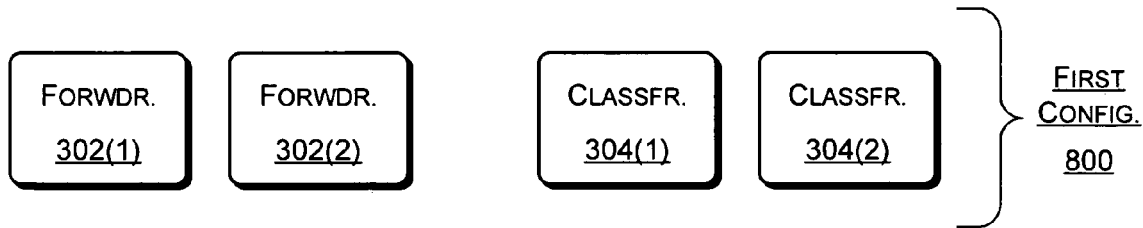
FIGS. 8A and 8B illustrate first and second exemplary network load balancing infrastructure configurations from a component perspective.
Figure 8B:
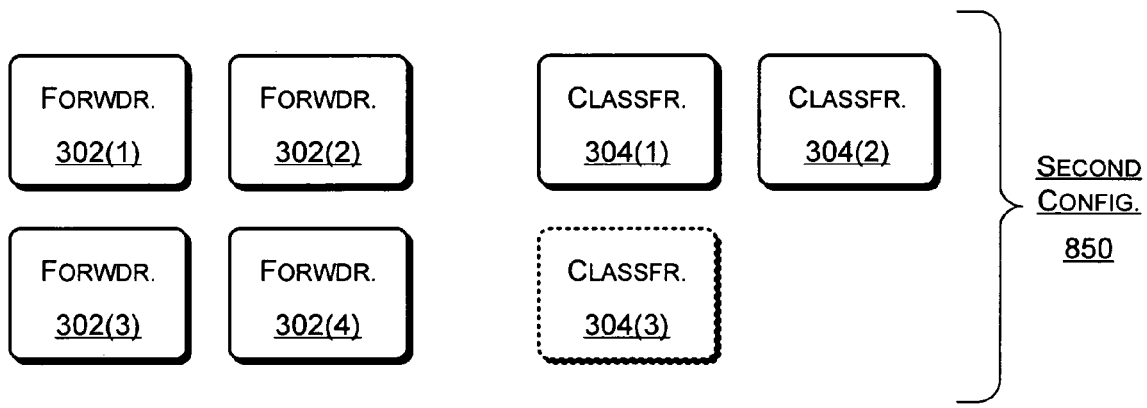

FIGS. 8A and 8B illustrate first and second exemplary network load balancing infrastructure configurations from a component perspective. As illustrated, first component-oriented exemplary network load balancing infrastructure configuration 800 includes four components. Second component-oriented exemplary network load balancing infrastructure configuration 850 includes six components. An alternative second configuration 850 includes a seventh component as indicated by the dashed-line block, which is described further below.

Specifically, first component-oriented exemplary network load balancing infrastructure configuration 800 (or first configuration 800) includes (i) two forwarders 302(1) and 302(2) and (ii) two classifiers 304(1) and 304(2). Second exemplary component-oriented network load balancing infrastructure configuration 850 (or second configuration 850) includes (i) four forwarders 302(1), 302(2), 302(3), and 302(4) and (ii) two classifiers 304(1) and 304(2). Thus, first configuration 800 is scaled out to second configuration 850 by adding two components, which are forwarding components in this example.

In a described implementation, each respective network-load-balancing-related functional component corresponds to a respective device (not explicitly shown in FIG. 8A or 8B); however, each component may alternatively correspond to part of a device or more than one device. For example, forwarders 302(1) and 302(2) may be distributed across three devices. Or forwarder 302(1) and classifier 304(1) may correspond to a first device, and forwarder 302(2) and classifier 304(2) may correspond to a second device.

Two network-load-balancing-related functional components are added to scale out first configuration 800 to second configuration 850. However, one component (or more than two) may alternatively be added to scale out the network load balancing infrastructure. Furthermore, two or more different types of functional components may be scaled out "simultaneously". For example, as illustrated by the dashed-line block, another classifying component (e.g., classifier 304(3)) may also be added when scaling out first configuration 800 to second configuration 850.

Moreover, scaling by two or more different types of functional components may be performed in similar (e.g., equivalent) or dissimilar proportions to each other. As illustrated, adding forwarder components 302(3) and 302(4) while not adding any classifier component 304 or while adding a single classifier component 304(3) represent a scaling out at dissimilar proportions. However, two classifier components 304(3) and 304(4) (the latter of which is not explicitly illustrated in FIG. 8B) may be added while the two forwarder components 302(3) and 302(4) are added for a scaling out at similar proportions. Regardless, each individual network-load-balancing-related functional component may consume a different amount of the available network load balancing infrastructure resources, as is described with reference to FIGS. 9A and 9B.

Figure 9A:
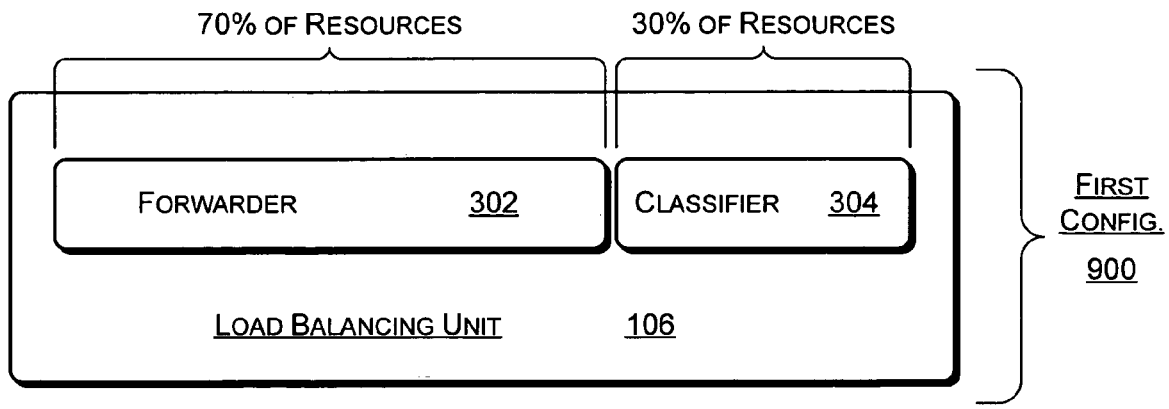
FIGS. 9A and 9B illustrate first and second exemplary network load balancing infrastructure configurations from a resource perspective.
Figure 9B:
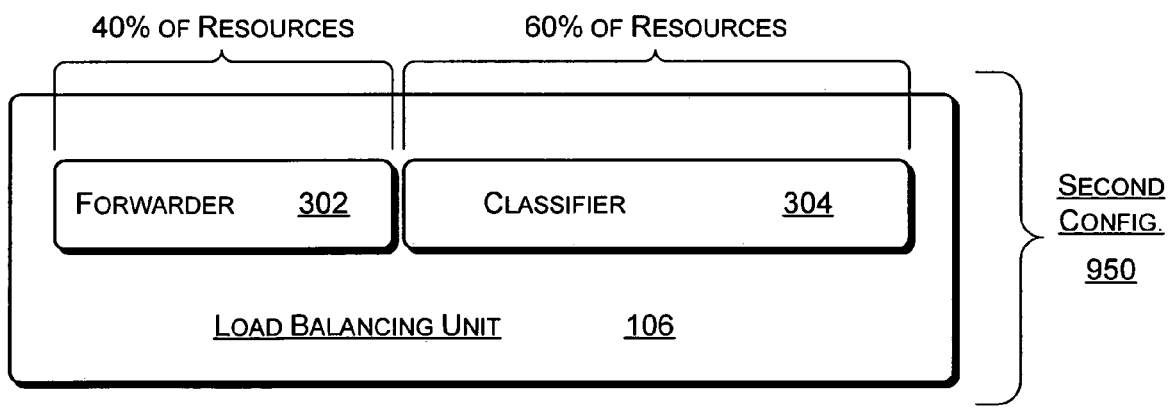

FIGS. 9A and 9B illustrate first and second exemplary network load balancing infrastructure configurations from a resource perspective. First resource-oriented exemplary network load balancing infrastructure configuration 900 (or first configuration 900) includes a first resource distribution or allocation for a load balancing unit 106. Second resource-oriented exemplary network load balancing infrastructure configuration 950 (or second configuration 950) includes a second resource distribution for load-balancing unit 106.

As illustrated, first configuration 900 includes a 70%-30% resource distribution, and second configuration 950 includes a 40%-60% resource distribution. Such resources may include total device resources (e.g., number of devices), processing resources (e.g., number of processor cycles), memory resources (e.g., portion of cache, main memory, etc.), network bandwidth and/or interface resources (e.g., bits per second and/or physical network interface cards (NICs)), and so forth.

Specifically for first configuration 900, forwarder 302 consumes 70% of the resources of load balancing unit 106 while classifier 304 consumes 30% of these resources. After reallocation during a scaling out procedure to produce second configuration 950, forwarder 302 consumes 40% of the resources of load balancing unit 106 while classifier 304 consumes 60% of these resources.

In an exemplary situation, first configuration 900 might facilitate better network load balancing performance when fewer, longer transactions are being handled by the associated hosts (not shown in FIGS. 9A and 9B) because classification functionality is utilized upon initial communication for a connection and forwarding functionality is utilized thereafter. Second configuration 950, on the other hand, might facilitate better network load balancing performance when more, shorter transactions are being handled by the associated hosts because the classification functionality is utilized for a greater percentage of the total number of packets funneled through the network load balancing infrastructure. In this situation, if request routing functionality is also being employed, then request router(s) 306 are also allocated a percentage of the total computing resources. The resource distribution among the three functionalities may be adjusted while handling connections (e.g., adjusted "on the fly") depending on current resource consumption and/or deficits.

As indicated above with reference to FIGS. 2 and 3, each load balancing unit 106 may correspond to all or a part of a total network load balancing infrastructure 106. For any given physically, logically, arbitrarily, etc. defined or stipulated load balancing unit 106, the resources thereof may be reallocated during a scale out procedure. More specifically, a resource distribution between/among different network-load-balancing-related separated functions of a load balancing unit 106 may be altered in a scale out procedure. Furthermore, more than two different functions, as well as other network-load-balancing-related functions that are not specifically illustrated in FIGS. 9A and 9B, may be allocated differing resource percentages.

The percentage of total system resources allocated to all load balancing functions may also be altered in a scale out procedure. As a general processing power example, the percentage of total processing power that is devoted to load balancing may be gradually increased as the amount of traffic that needs to be load balanced increases.

Network load balancing software may optionally perform monitoring to analyze and determine whether resources should be reallocated. For example, the network load balancing software may monitor the processor utilization of different network-load-balancing-related functions. The actual reallocation may also optionally be performed automatically by the network load balancing software in an offline or online mode.

It should be understood that a scaling out capability of network load balancing infrastructure (e.g., as realized at least partially in software) as described herein may relate to different installations and not necessarily a change to a single installation. In a resource-oriented example, network load balancing infrastructure as described herein may be configured in accordance with one resource distribution in one installation environment and may be configured in accordance with another different resource distribution in another installation environment having different operational parameters. Additionally, the capabilities, features, options, etc. described above with regard to scaling out are also applicable for "scaling in". In other words, resources devoted to network load balancing infrastructure (or sub-functions thereof) may also be reduced.

Exemplary Health and Load Handling

This section describes how host status information, such as health and/or load information, may be collected for and utilized in network load balancing. This section primarily references FIGS. 10-18 and illuminates health and load functionality such as that provided by health and load handler 314 (of FIG. 3). As described above with reference to FIG. 3, each host 108 hosts one or more applications 316. Health and load handler 314 utilizes health and/or load information that relates to applications 316 and/or hosts 108 for certain described implementations of network load balancing.

Figure 10:
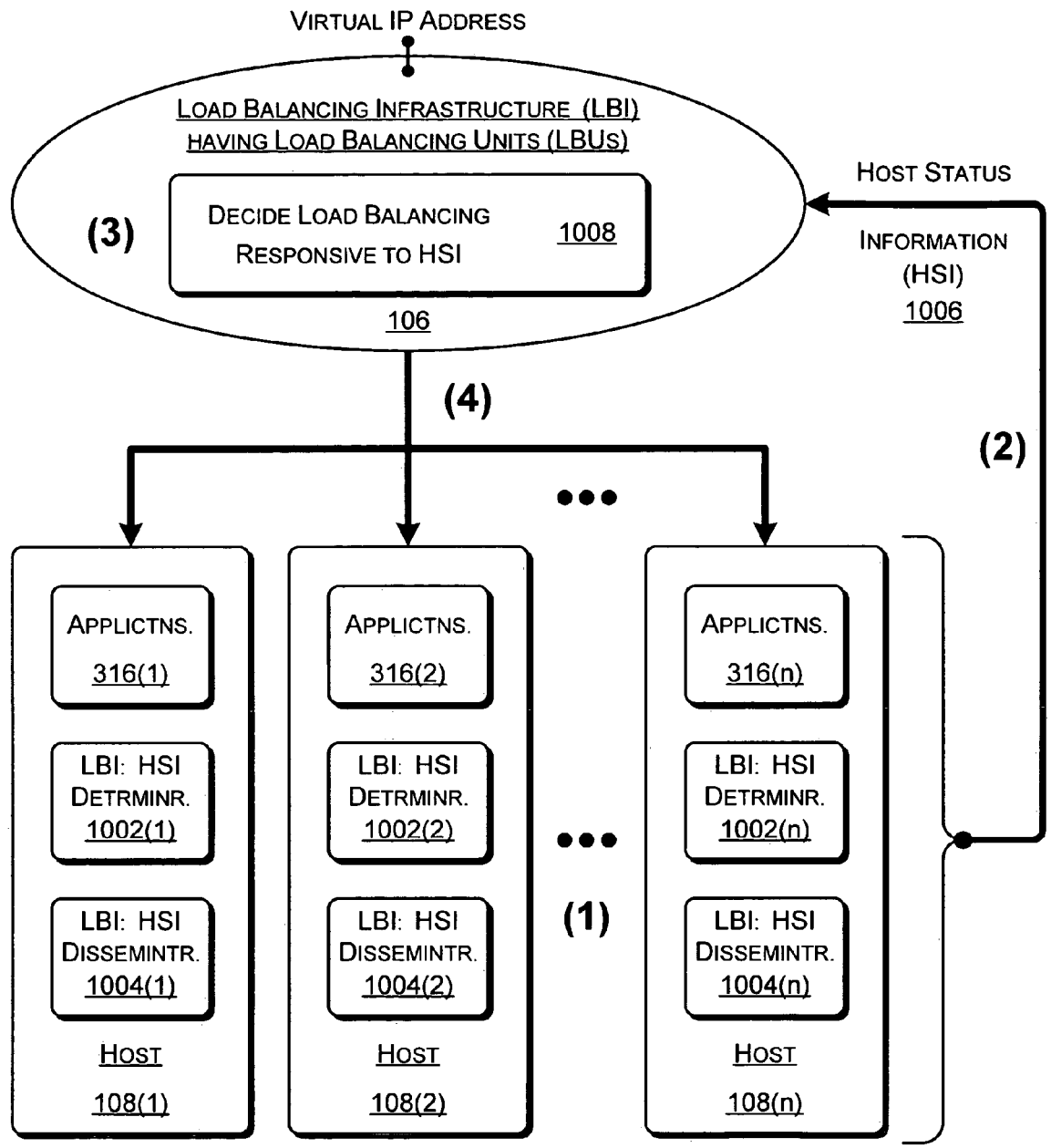
FIG. 10 illustrates an exemplary network load balancing approach that involves host status information.

FIG. 10 illustrates an exemplary network load balancing approach that involves host status information (HSI) 1006. Each host 108(1), 108(2) . . . 108(n) includes one or more applications 316(1), 316(2) . . . 316(n), respectively. These hosts 108 generally and these applications 316 specifically may change statuses from time to time.

For example, hosts 108 and applications 316 may be accepting new connections or not accepting new connections. Also, they may be quickly handling client requests or slowly handling client requests. Furthermore, they may have many resources in reserve or few unused resources. All or any part of such data, or other data, may comprise host status information 1006. Generally, host status information 1006 provides an indication of the status of some aspect of hosts 108 and/or applications 316 that are running thereon.

In a described implementation, each host 108(1), 108(2) . . . 108(n) includes a host status information (HSI) determiner 1002(1), 1002(2) . . . and 1002(n), respectively. Each host 108(1), 108(2) . . . 108(n) also includes a host status information (HSI) disseminator 1004(1), 1004(2) . . . and 1004(n), respectively. Each host status information determiner 1002 and/or host status information disseminator 1004 may be part of load balancing infrastructure (LBI) 106.

Each host status information determiner 1002 determines host status information 1006 for its respective host 108 and/or applications 316 that are running thereon. Exemplary techniques for determining such host status information 1006 are described below with reference to FIGS. 12-14, and particularly FIG. 13A. Each host status information disseminator 1004 disseminates host status information 1006 for its respective host 108 and/or applications 316 to load balancing infrastructure 106 (e.g., those portion(s) of load balancing infrastructure 106 that are not located on hosts 108). Exemplary techniques for disseminating such host status information 1006 are described below with reference to FIGS. 12-17, and particularly FIGS. 13B and 15-17.

Specifically, each host status information disseminator 1004 disseminates host status information 1006 (directly or indirectly) to each load balancing unit (LBU) 106 of load balancing infrastructure 106 that includes at least one health and load handler 314 and/or classifier 304. Load balancing infrastructure 106 refers to host status information 1006 when implementing network load balancing. For example, as indicated by logic 1008, load balancing infrastructure 106 is capable of making load balancing decisions responsive to host status information 1006.

In operation at (1), host status information determiners 1002 determine host status information 1006 for respective hosts 108 and/or applications 316. At (1) and (2), host status information disseminators 1004 disseminate host status information 1006 from hosts 108 to load balancing infrastructure 106. For example, host status information 1006 may be disseminated to individual load balancing units 106. At (3), logic 1008 makes network load balancing decisions responsive to host status information 1006. At (4), connections are forwarded to targeted hosts 108 based on these network load balancing decisions.

Figure 11:
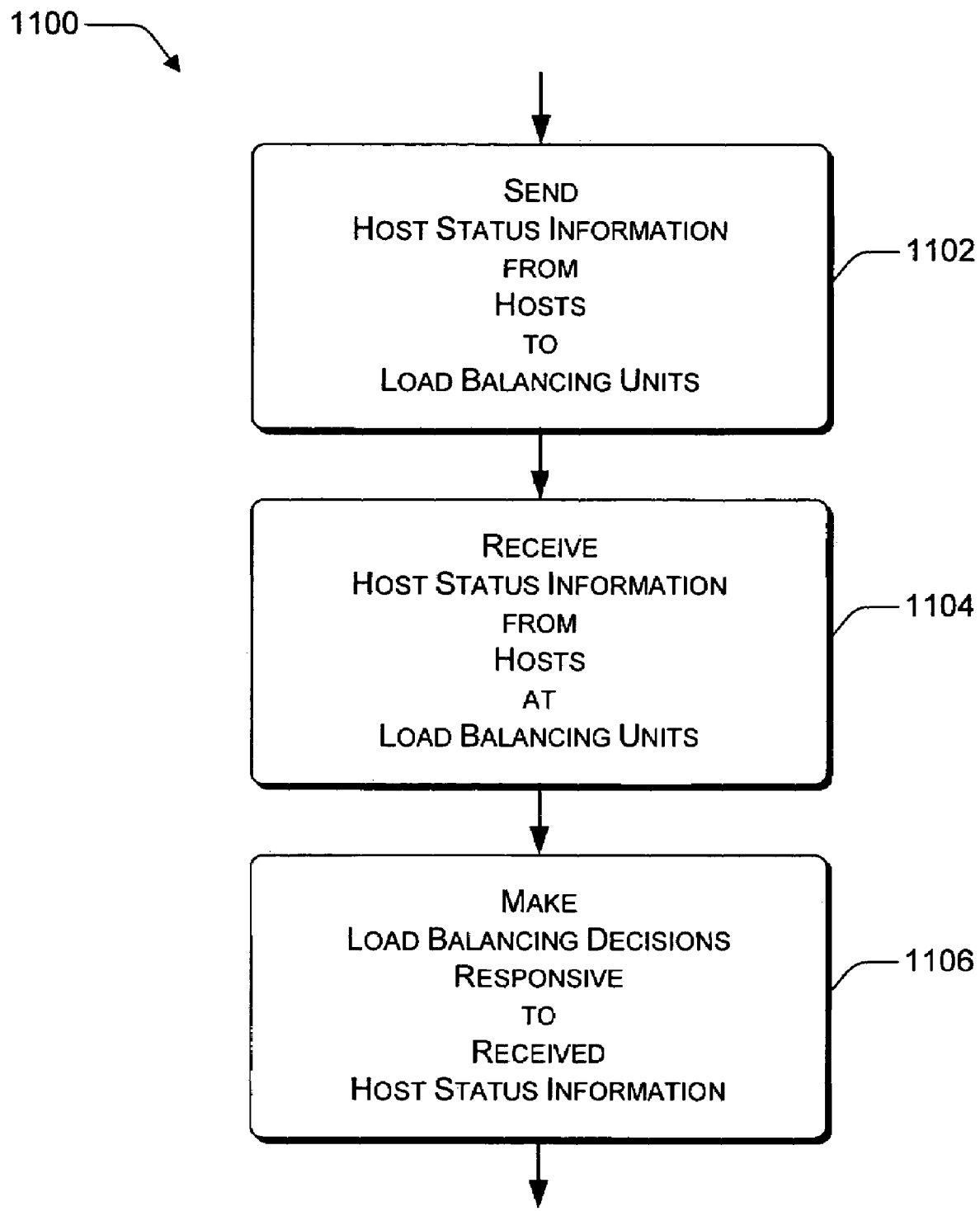
FIG. 11 is a flow diagram that illustrates an exemplary method for network load balancing that involves host status information.

FIG. 11 is a flow diagram 1100 that illustrates an exemplary method for network load balancing that involves host status information. Flow diagram 1100 includes three blocks 1102-1106. Although the actions of flow diagram 1100 may be performed in other environments and with a variety of software schemes, FIGS. 1-3 and 10 are used in particular to illustrate certain aspects and examples of the method.

At block 1102, host status information is sent from hosts to load balancing units. For example, host status information 1006 may be sent from hosts 108 to load balancing units 106. At block 1104, the host status information is received from the hosts at the load balancing units. For example, load balancing units 106 may receive host status information 1006 from hosts 108. At block 1106, load balancing decisions are made responsive to the received host status information. For example, logic 1008 at load balancing units 106 may make decisions for network load balancing responsive to host status information 1006.

Thus in FIG. 10, load balancing infrastructure 106 collects host status information 1006 from hosts 108 (and/or applications 316 thereof) and load balances incoming requests that are directed to hosts 108 responsive to host status information 1006. As described further below with reference to FIGS. 12-18, this host status information 1006 may be application-specific. As also described further below, examples of host status information 1006 include health and/or load information.

Figure 12:
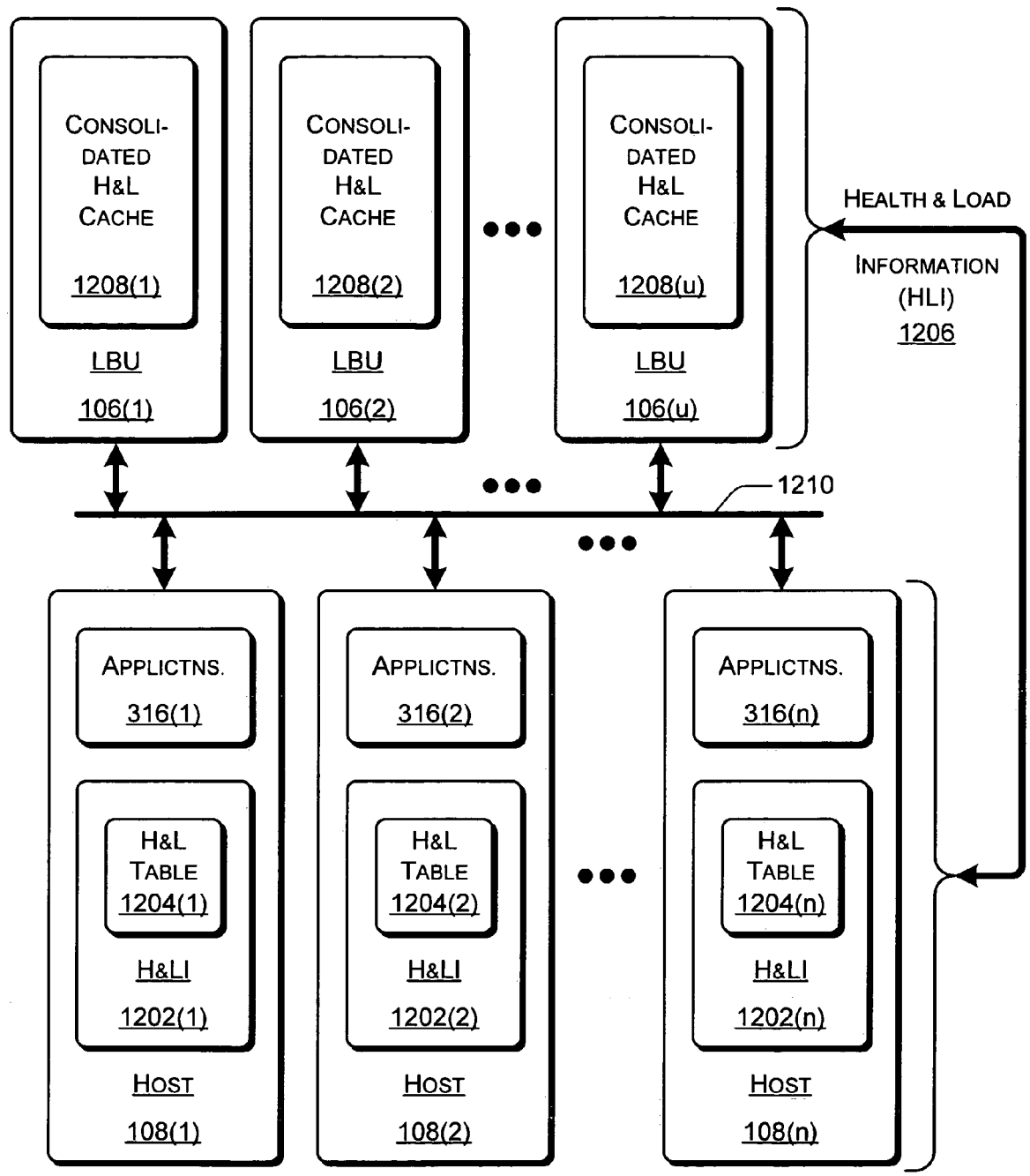
FIG. 12 illustrates an exemplary network load balancing approach that involves health and load information.

FIG. 12 illustrates an exemplary network load balancing approach that involves health and/or load information (HLI) 1206. Hosts 108(1), 108(2) . . . 108(n) are coupled to load balancing units 106(1), 106(2) . . . 106(u) via a communication linkage 1210 such as a network.

As illustrated, hosts 108 communicate health and load information 1206 to load balancing units 106 using communication linkage 1210. The bi-directional communication of health and load information 1206, as indicated by the double-pointed arrow, refers to a two-way communication from load balancing units 106 to hosts 108 that provides certain completeness, coherency, correctness, etc. such that hosts 108 and/or load balancing units 106 may fail independently of one another. Such two-way communications from load balancing units 106 to hosts 108 are described further below with particular reference to FIG. 15.

Health information reflects whether a given host and/or application is capable of handling client requests. Load information reflects the number, amount, and/or level of client requests that the given host and/or application is capable of handling at a particular moment. In other words, load can reflect directly and/or inversely an available number, amount, and/or level of total capacity of the given host and/or application. As noted above, implementations described with reference to FIGS. 12-18 focus on health and/or load information; however, those implementations are also applicable to general status information for hosts (including the applications thereof).

In a described implementation, each host 108(1), 108(2) ... 108(n) includes a respective health and load infrastructure (H&LI) component 1202(1), 1202(2) ... 1202(n). Each health and load infrastructure component 1202 may optionally be a portion of load balancing infrastructure 106 that is resident at and executing on each host 108. Health and load information 1206 may be realized in software. When functioning, each health and load infrastructure 1202(1), 1202(2) ... 1202(n) creates and maintains a respective health and load (H&L) table 1204(1), 1204(2) ... 1204(n).

These health and load tables 1204 may include application-specific entries. Health and load information 1206 that is stored in health and load tables 1204 may be independent of load balancing infrastructure 106. For example, administrators, designers, etc. may specify criteria for health and load information 1206 at configuration time. Additionally, entities external to a device that is or that has a host 108 may contribute to determining health and load information 1206 for applications 316 on the device. An exemplary health and load table 1204 is described further below with reference to FIG. 13A.

Each load balancing unit 106(1), 106(2) ... 106(u) includes a respective consolidated health and load (H&L) cache 1208(1), 1208(2) ... 1208(u). Each consolidated health and load cache 1208 includes the information from each health and load table 1204(1), 1204(2) ... 1204(n). Consequently, each load balancing unit 106 is provided with quick (e.g., cached) access to health and load information 1206 for each host 108 for which load balancing units 106 are load balancing network traffic.

In operation, health and load infrastructures 1202 push health and load information 1206 from health and load tables 1204 to consolidated health and load caches 1208. The mechanism to provide health and load information 1206 is event driven such that changes to health and load tables 1204 are provided to consolidated health and load caches 1208 in a timely, scaleable manner.

Figures 13A, 13B:
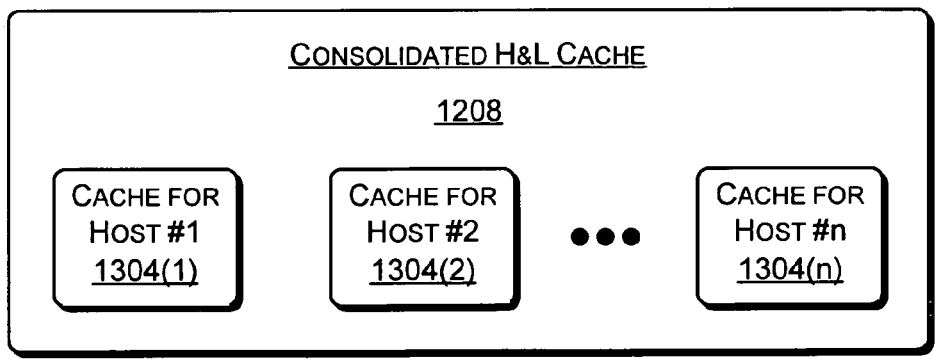
FIG. 13A is an exemplary health and load table as illustrated in FIG. 12.
FIG. 13B is an exemplary consolidated health and load cache as illustrated in FIG. 12.

FIG. 13A is an exemplary health and load table 1204 as illustrated in FIG. 12. In a described implementation, health and load table 1204 includes multiple entries 1302 that are each associated with a different application 316. Each entry 1302 may correspond to a row in health and load table 1204 that has three columns. These columns correspond to application identifier (ID) 1302(A), application status characterization 1302(B), and load balancer directive 1302(C).

Because each entry 1302 is associated with a particular application 316, a row is added as each application is spun up (e.g., by an administrator). Likewise, a row is deleted/removed each time an application is closed down. Similarly, individual fields in columns 1302(A), 1302(B), and/or 1302(C) are modified/updated when a value thereof changes. For example, when a status characterization value changes for a given application 316, a value in a field of application status characterization 1302(B) for entry 1302 of the given application 316 is updated.

The additions and deletions of entries 1302 for applications 316 may be effectuated with input from a control manager at the host 108. For example, a control manager portion of an operating system knows when an application 316 is started and stopped because it is actively involved in the starting and stopping of applications 316. Hence, a control manager may identify that it has, at least in part, started an application 316, and the control manager may establish that it has, at least in part, stopped the application 316. Health and load infrastructure 1202 may therefore be informed of the starting and stopping of applications 316 by the control manager. Hence, no such explicit communication from applications 316 has to be provided to health and load infrastructure 1202. An example of a control manager is the Service Control Manager (SCM) of the Windows® Operating System from Microsoft® Corporation.

Application identifier 1302(A) includes information that is used to uniquely identify the application 316 to which entry 1302 is associated. Application identifier 1302(A) may include one or more of the following for the associated application 316: the virtual IP address and port, the physical IP address and port, the protocol used, and any protocol-specific information. The protocol may be HTTP, IPsec, SOAP, and so forth. The protocol-specific information may be a URL pattern or string to further delineate the application associated with entry 1302. Thus, application identifier 1302(A) more particularly refers to a specific application endpoint on a particular host 108.

Other application identifiers may alternatively be employed. For example, to reduce communication bandwidth, application identifier 1302(A) may be a 32-bit number that maps to the above exemplary information at health and load infrastructure 1202 and at load balancing units 106. Moreover, any of the fields in entry 1302 may actually contain a globally unique identifier (GUID) that is used as a key to look up the true information for the field.

Application status characterization 1302(B) includes information that reflects the status of the application 316 to which entry 1302 is associated. Application status characterization 1302(B) includes the following for the associated application 316: application health, application load, and application capacity. Application health is a quasi-Boolean value that indicates whether an application is functioning. Application health can be healthy, failing, or unknown. Application health is a relatively-instantaneous value and is communicated with relatively low latency (e.g., of approximately a second or a few seconds) to load balancing units 106 when the application health value changes.

Application load is a value that indicates how occupied or busy a given application is and thus, directly or inversely, how much additional load the given application can handle. Application load is a relatively slowly-changing or averaged value that can be smoothed with a hysteresis-inducing mechanism, if desired, to eliminate transient spikes of increased or decreased load. It is communicated relatively infrequently to load balancing units 106 (e.g., approximately one to four times a minute). The value of application load is given meaning with regard to application capacity.

Application capacity is a value that indicates the maximum capacity of the application. It is selected in a generic manner to be meaningful for a given context but still sufficiently flexible for other contexts. Application capacity is a unit-less, bounded number (e.g., 0-99) that is determinable at configuration time. It may be based on processing power, memory size/speed, network access, some combination thereof, and so forth. Application capacity expresses relative capacities between and among other applications of the same type in a set of hosts 108(1, 2 ... n).

Thus, relative to application capacity, application load gains meaning. Application load for a given application is a percentage of application capacity for the given application. Alternatively, application load can be expressed as a unit-less number from which the percentage can be ascertained in conjunction with the value of application capacity.

Load balancer directive 1302(C) includes information that reflects the desired and/or expected state of the directive established by health and load infrastructure 1202 for load balancing units 106 with respect to an application 316 to which entry 1302 is associated. Load balancer directive 1302

(C) includes the following for the associated application 316: target load balancing state and current load balancing state.

The target load balancing state reflects the state of the directive to load balancing units 106 as desired by health and load infrastructure 1202. The current load balancing state reflects what health and load infrastructure 1202 understands the current state of the directive to load balancing units 106 to be as recorded at load balancing units 106. The current load balancing state thus reflects the load balancing directive that health and load infrastructure 1202 expects load balancing units 106 to be currently operating under as dictated using a communication protocol. Such an exemplary communication protocol is described further below with reference to FIG. 15. The interaction and relationship between the target load balancing state and the current load balancing state is also further clarified with the description of FIG. 15.

The target load balancing state and the current load balancing state may each take a value of active, inactive, or draining. An active directive indicates that new requests/connections are welcome and may be targeted at the application that is associated with entry 1302. An inactive directive indicates that no additional packets should be forwarded to the associated application. A draining directive indicates that no packets for new requests/connections should be sent to the associated application but that packets for existing requests/connections should continue to be forwarded to the associated application.

In a described implementation, the definitive version of respective health and load information 1206 is stored at health and load tables 1204 that are located at each respective host 108 of multiple hosts 108. With this implementation, if a host 108 crashes, the health and load information 1206 that is lost pertains to those applications 316 that also crashed. A measure of high availability is therefore gained automatically without duplicating data. However, the definitive version of health and load information 1206 may alternatively be stored elsewhere. Other such storage options include load balancing units 106 themselves, a host 108 that (as its sole task or along with hosting duties) stores and maintains health and load information 1206 for multiple other (including all other) hosts 108, another separate and/or external device, and so forth.

Figure 17A:
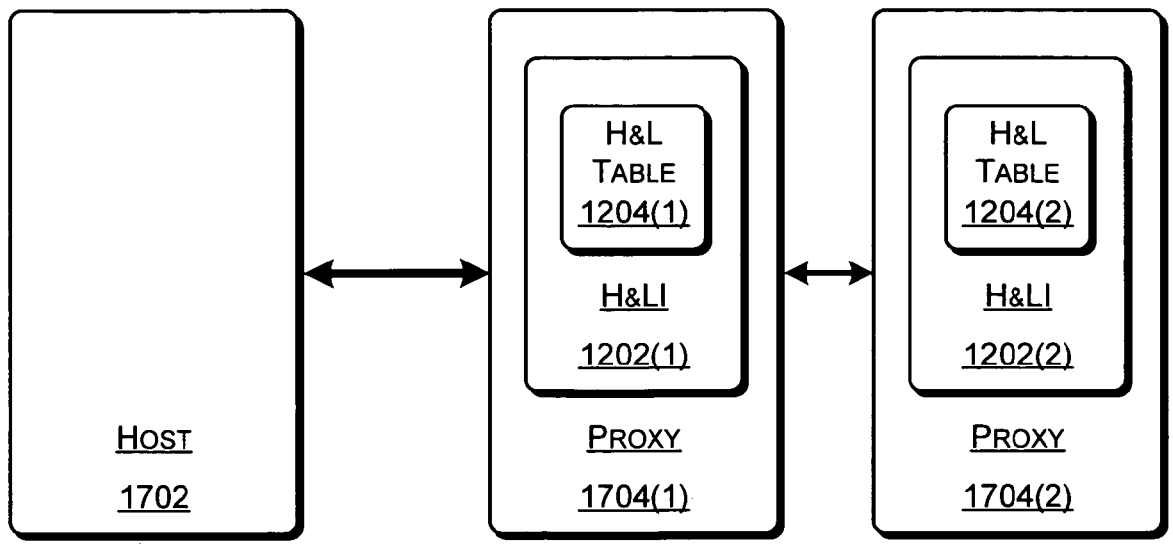
FIGS. 17A and 17B illustrate exemplary health and load information proxy storage scenarios for health and load tables of FIG. 13A and for consolidated health and load caches of FIG. 13B, respectively.
Figure 17B:
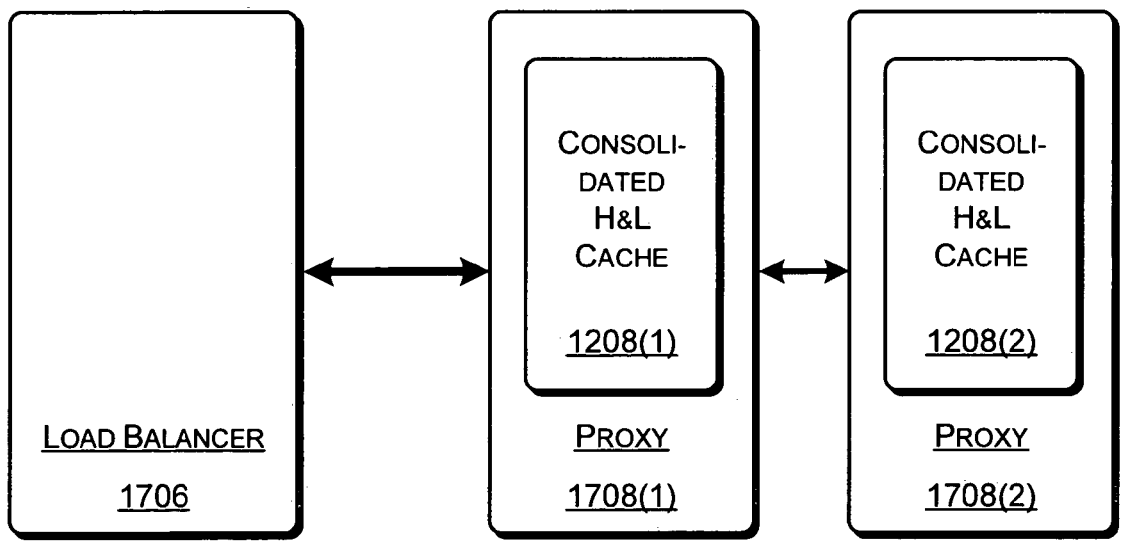

If the definitive version of health and load information 1206 is stored and maintained elsewhere besides being distributed across hosts 108(1, 2 . . . n), such health and load information 1206 may be stored redundantly (e.g., also stored in a duplicative device, backed-up, etc.) for high-availability purposes. Exemplary proxy scenarios for storing health and load information 1206 are described below with reference to FIGS. 17A and 17B. FIG. 17A is directed to a proxy scenario for health and load tables 1204, and FIG. 17B is directed to a proxy scenario for consolidated health and load caches 1208.

FIG. 13B is an exemplary consolidated health and load cache 1208 as illustrated in FIG. 12. In a described implementation, each consolidated health and load cache 1208 in each load balancing unit 106 includes at least part of the information stored in each health and load table 1204 for each health and load infrastructure 1202 at each host 108. The cached health and load information may be organized in any manner in consolidated health and load cache 1208.

As illustrated, consolidated health and load cache 1208 includes a cache for each host 108(1), 108(2) . . . 108(n) that replicates part or all of the information in the health and load table 1204 of each respective host 108(1, 2 . . . n). Specifically, consolidated health and load cache 1208 includes a cache for host #1 1304(1), a cache for host #2 1304(2) . . . a cache for host #n 1304(n). Thus, the illustrated consolidated health and load cache 1208 is organized at a broad level by host 108(1, 2 . . . n), with each individual cache 1304 including application-specific entries for the corresponding respective host 108(1, 2 . . . n). Alternatively, consolidated health and load cache 1208 may be organized at a broad level by type of application 316, with individual blocks that are directed to a specific application type further divided by host 108(1, 2 . . . n). Other data structure formats may also be employed.

Figure 14:
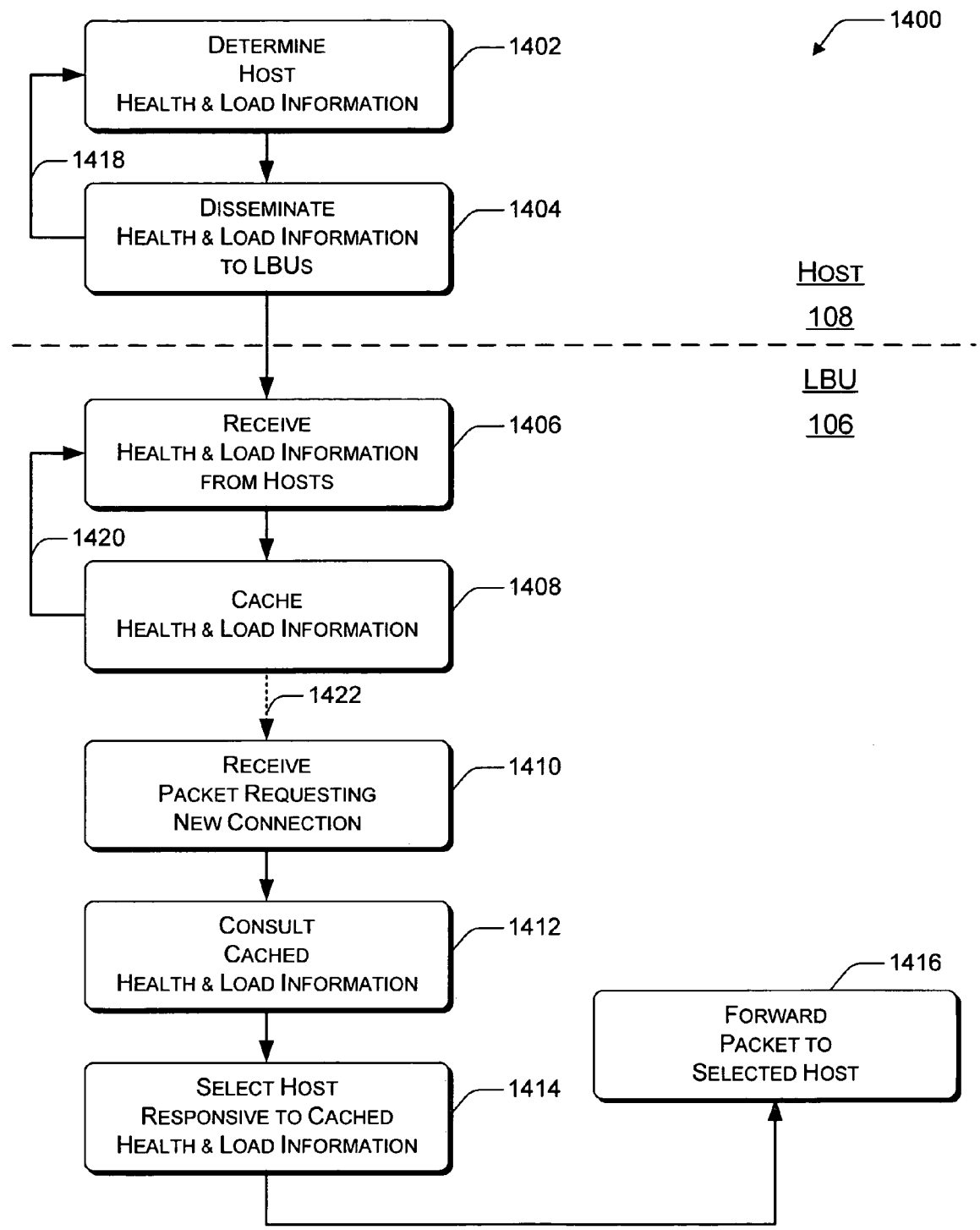
FIG. 14 is a flow diagram that illustrates an exemplary method for network load balancing that involves health and load information.

FIG. 14 is a flow diagram that illustrates an exemplary method for network load balancing that involves health and load information. Flow diagram 1400 includes eight blocks 1402-1416. Although the actions of flow diagram 1400 may be performed in other environments and with a variety of software schemes, FIGS. 1-3 and 12-13B are used in particular to illustrate certain aspects and examples of the method. For example, the actions of two blocks 1402-1404 are performed by a host 108, and the actions of six blocks 1406-1416 are performed by a load balancing unit 106.

At block 1402, health and load information at a host is determined. For example, health and load information 1206 for applications-316(2) may be ascertained by health and load infrastructure 1202(2) and stored in health and load table 1204(2) at host 108(2). At block 1404, the determined health and load information is disseminated to load balancing units. For example, health and load infrastructure 1202(2) may send health and load information 1206 for applications 316(2) to load balancing units 106(1, 2 . . . u). As indicated by arrow 1418, the actions of blocks 1402 and 1404 are repeated so that (application) health and load may be continually monitored and updated as changes occur.

At block 1406, health and load information is received from hosts. For example, load balancing unit 106(1) may receive health and load information 1206 from multiple hosts 108(1, 2 . . . n), which includes health and load information 1206 for applications 316(2) of host 108(2). At block 1408, the received health and load information is cached. For example, load balancing unit 106(1) may store health and load information 1206 from hosts 108(1, 2 . . . n) into consolidated health and load cache 1208(1). With reference to the FIG. 13B implementation of a consolidated health and load cache 1208(1), health and load information 1206 for applications 316(2) from host 108(2) may be stored in cache for host #2 1304(2). As indicated by arrow 1420, the actions of blocks 1406 and 1408 are repeated so that (application) health and load information may be continually received and updated as changes occur.

As indicated by dashed arrow 1422, load balancing units 106 are also handling communications from clients 102 while handling (application) health and load issues. At block 1410, a packet requesting a new connection is received. For example, load balancing unit 106(1) may receive a TCP SYN packet from client 102(2) through network 104. At block 1412, the cached health and load information is consulted. For example, load balancing unit 106(1) may consult consolidated health and load cache 1208(1). More particularly, load balancing unit 106(1) may consult entries that are associated with the application to which the TCP SYN packet is directed across caches for hosts #1, #2 . . . #n 1304(1, 2 . . . n).

At block 1414, a host is selected responsive to the cached health and load information. For example, load balancing unit 106(1) may select host 108(2) having application(s) 316(2) responsive to health and load information 1206 that is cached in consolidated health and load cache 1208(1). The selected application 316 (and host 108) should be healthy and able to accept additional load (e.g., possibly the least loaded application among those applications that are of the application type to which the TCP SYN packet is directed).

The consulting of the cached health and load information (at block 1412) and the host-selecting responsive to the cached health and load information (at block 1414) may be performed prior to reception of a specific new-connection-requesting packet and/or using a batched scheme. Also, the selecting may be in accordance with any of many schemes. For example, a token based or a round-robin based scheme may be employed. With either scheme, the selection may involve a weighting of relative loads among the application options. This consultation and selection, along with the token and round-robin based schemes, are described further below with reference to FIG. 18 and in the section entitled "Exemplary Classifying, Forwarding, and Request Routing", especially with regard to classifying functionality.

After the target host is selected at block 1414, the new-connection-requesting packet may be sent thereto. At block 1416, the packet received from the client is forwarded to the selected host. For example, the TCP SYN packet is forwarded from load balancing unit 106(1) to selected host 108(2). The forwarding of this initial packet may be effectuated directly by a classifier 304 or by a forwarder 302, as is also described further below in the section entitled "Exemplary Classifying, Forwarding, and Request Routing".

For a described implementation, health and load infrastructure 1202 is resident at and distributed across multiple hosts 108 as well as being located at load balancing units 106 (as represented by health and load handler 314). Health and load infrastructure 1202 has three responsibilities. First, it exposes listening point(s) to attain application status updates for application status characterizations 1302(B) of health and load tables 1204. Second, it synthesizes the application status information to determine what load balancing units 106 should do, which is embodied in load balancer directive 1302(C). Third, health and load infrastructure 1202 communicates this directive from hosts 108 to load balancing units 106.

The directive content of load balancer directive 1302(C) is effectively a digested version of the information for application status characterizations 1302(B). However, load balancing units 106 may also receive the raw information of application status characterizations 1302(B) as well as this processed directive. The communication of the content of these and other fields of health and load tables 1204 is accomplished using a message protocol that is described below with reference to FIG. 15.

Figure 15:
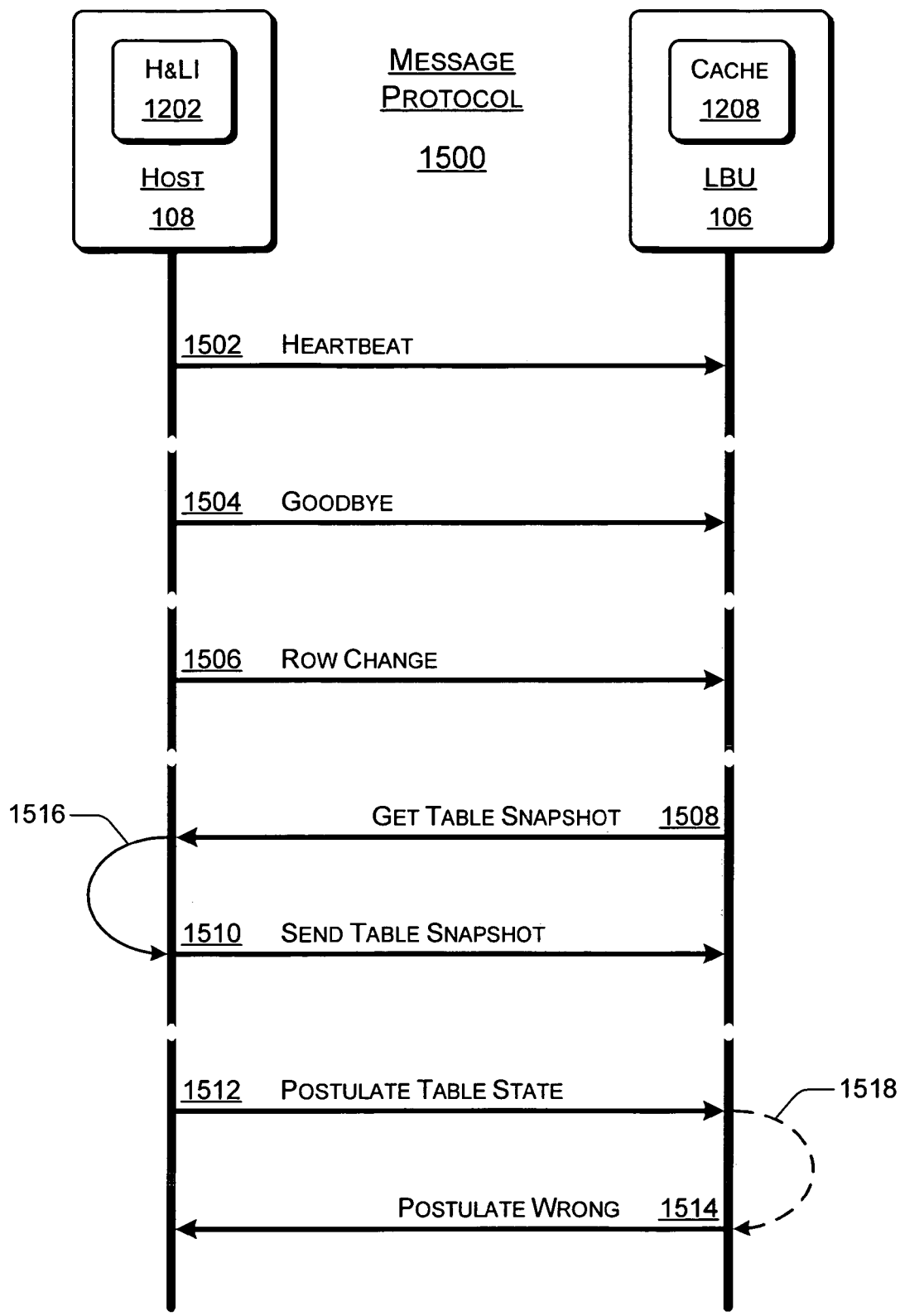
FIG. 15 illustrates an exemplary message protocol for communications between the hosts and load balancing units that are illustrated in FIG. 12.

FIG. 15 illustrates an exemplary message protocol 1500 for the health and load information-related communications that are illustrated in FIG. 12 between hosts 108 and load balancing units 106. Generally, an event-driven mechanism is used to push changes to health and load tables 1204 from hosts 108 to load balancing units 106. In other words, for a described implementation, information is transmitted from hosts 108 to load balancing units 106 when health and load tables 1204 are updated. This avoids periodically sending a snapshot of all of each health and load table 1204, which reduces network bandwidth consumption by health and load infrastructure 1202.

Message protocol 1500 may be implemented using any available message transport mechanism. Such mechanisms include reliable multicast transmission, point-to-point transmission (e.g., user datagram protocol (UDP)), and so forth. As illustrated, message protocol 1500 includes seven message types 1502-1514: a heartbeat message 1502, a goodbye message 1504, a row change message 1506, a get table snapshot message 1508, a send table snapshot message 1510, a postulate table state message 1512, and a postulate wrong message 1514.

It should be understood that, with the exception of arrows 1516 and 1518, no temporal relationship between or among the different messages types 1502-1514 is implied by the illustration. For example, a row change message 1506 does not typically follow a goodbye message 1504.

Heartbeat message 1502 indicates that a particular host 108 is functioning and provides some error checking for the content of a corresponding particular health and load table 1204 with respect to a corresponding particular cache for the particular host 1304 in consolidated health and load cache 1208. Each health and load infrastructure 1202 at each host 108 sends a heartbeat message directly or indirectly to each consolidated health and load cache 1208 at each load balancing unit 106.

Heartbeat messages 1502 address the aging-out problem for data in consolidated health and load caches 1208 that arises, in part, because a snapshot of the entirety of each health and load table 1204 is not periodically transmitted to each load balancing unit 106. A transmission scheme for heartbeat messages 1502 is described further below with reference to FIG. 16.

Heartbeat messages 1502 include an identifier for the host, error checking data, and optionally a DNS name. The identifier of the host may be a unique (e.g., 32-bit) number that is selected at configuration time. The error checking data may be a checksum, a state-change sequence number, a generation number, a CRC value, etc. that enables a receiving load balancing unit 106 to validate that the contents of its consolidated health and load cache 1208 comports with the contents of the health and load table 1204 of the transmitting host 108. If a generation number approach is employed, then multiple generation IDs can be used with each generation ID assigned to a "chunk" of applications. Messages can then refer to a chunk number or a chunk number/generation ID pair, depending on the context.

The error checking data may be a single value for the health and load table 1204 overall, or it may be multiple values determined on a per-entry 1302 basis. The DNS name may optionally be sent (e.g., every "x" heartbeats) to verify or update the current correct network address for the host.

Goodbye message 1504 is sent from a particular host 108 to load balancing units 106 to indicate that the particular host 108 is planning to shutdown. Goodbye message 1504 includes a host identifier that may be indexed/mapped to a network address for the particular host 108. Goodbye message 1504 is used for clean, intentional shutdowns by hosts 108 to precipitate a "fast clear". However, if a goodbye message 1504 is lost, caches eventually age out the particular host's 108 entries because heartbeat messages 1502 are no longer sent.

Row change message 1506 is sent from a particular host 108 to load balancing units 106 to indicate that the health and/or load for a given application 316 of the particular host 108 has changed. Row change message 1506 includes a host identifier, an application identifier, an operation, and data for the operation. Exemplary host identifiers are described above with regard to heartbeat messages 1502 and goodbye messages 1504. Exemplary application identifiers are described above with regard to application identifier 1302(A) of an application-associated entry 1302 of health and load tables 1204.

The row change operation may be add, delete, or update. In other words, the data for the operation may be added to (for an add operation) or a replacement for (for an update operation) information already present at consolidated health and load caches 1208 at load balancing units 106. For a delete operation, no data need be provided. Message protocol 1500 is defined such that multiple operations may be stipulated to be performed for a single row change message 1506. Hence for a particular host identifier, sets of an application identifier, operation, and operation data may be repeated for multiple applications 316 of the host 108 that is identified by the particular host identifier.

Get table snapshot message 1508 is sent from a particular load balancing unit 106 for a particular consolidated health and load cache 1208 to an individual host 108 or hosts 108. This get table snapshot message 1508 requests that health and load infrastructure 1202 at hosts 108 provide a snapshot of the respective health and load table 1204 for the respective host 108. This message includes an identification of the requesting load balancing unit 106 and may be used by a load balancing unit 106 (i) after it has failed and then recovered; (ii) after a host 108 fails, recovers, and begins sending heartbeat messages 1502 again; (iii) if a row change message 1506 is sent to load balancing unit 106, but the message gets dropped, so its consolidated health and load cache 1208 is out of sync with the respective health and load table 1204 for the respective host 108; and (iv) so forth.

For the third (iii) situation, the lack of synchronization between consolidated health and load cache 1208 and the respective health and load table 1204 for the respective host 108 is discovered by a subsequent heartbeat message 1502 from the respective host 108 because the "error checking" will indicate that consolidated health and load cache 1208 is out of date. Load balancing unit 106 can then send a get table snapshot message 1508 so that it can update its consolidated health and load cache 1208. Thus, for any of the three (i, ii, iii) exemplary situations, load balancing unit 106 subsequently reconstitutes its consolidated health and load cache 1208 using get table snapshot 1508. Get table snapshot 1508 may be sent repeatedly to each host 108 in a point-to-point manner or may be sent one time to many hosts 108 in a multicast manner.

Send table snapshot message 1510 is sent from an individual host 108 to a particular load balancing unit 106 after the individual host 108 has received a get table snapshot message 1508 from the particular load balancing unit 106 as indicated by arrow 1516. The contents of a send table snapshot message 1510 is prepared by health and load infrastructure 1202 and includes all or at least multiple rows of the health and load table 1204 of the individual host 108 so that the particular load balancing unit 106 may rebuild its consolidated health and load cache 1208. Send table snapshot message 1510 may be a separately designed message, or it may be equivalent to a sequence of add operations in a row change message 1506.

Postulate table state message 1512 and postulate wrong message 1514 are related to the target load balancing state and the current load balancing state of load balancer directive 1302(C) of an entry 1302 in a health and load table 1204. The target load balancing state is the directive that health and load infrastructure 1202 desires load balancing units 106 to be operating under. The current load balancing state is the directive that health and load infrastructure 1202 expects or believes that load balancing units 106 are currently operating under. Generally, the two load balancing states are identical.

However, the target load balancing state may differ from the current load balancing state during a transitional period for a state directive change. For example, the target load balancing state and the current load balancing state are both initially set to active. A problem with host 108 and/or an application 316 thereof is detected and the target load balancing state directive is switched to draining. This draining directive is communicated to load balancing units 106 using a row change message 1506.

There is a delay before this directive change is noted in all consolidated health and load caches 1208 of all load balancing units 106. During this transitional period, the target load balancing state is draining while the current load balancing state is still active at health and load table 1204 of host 108. Before changing the current load balancing state to draining, health and load infrastructure 1202 wants to ensure that consolidated health and load caches 1208 have actually been updated to the new directive state of draining.

To verify that consolidated health and load caches 1208 of load balancing units 106 have been updated to a new state directive, health and load infrastructure 1202 sends a postulate table state message 1512 to load balancing units 106. Postulate table state message 1512 is sent some time (e.g., a predetermined delay period) after transmission of a row change message 1506 indicating that the state directive is to be changed. The postulate table state message 1512, in this example, indicates that the table state should be draining. As indicated by the dashed arrow 1518, a load balancing unit 106 responds to this postulate table state message 1512 if its consolidated health and load cache 1208 differs from the postulated state directive.

If the directive in consolidated health and load cache 1208 does differ from the postulated state directive, then that load balancing unit 106 sends a postulate wrong message 1514 to the health and load infrastructure 1202 of the host 108 that issued the postulate table state message 1512. This health and load infrastructure 1202 then periodically resends postulate table state message 1512 until no further postulate wrong messages 1514 are received from consolidated health and load caches 1208. At that point, health and load infrastructure 1202 sends a row change message 1506 with the new current load balancing state. In this sense, consolidated health and load caches 1208 are the definitive determiners of the current load balancing state, and health and load infrastructure 1202 is the definitive determiner of the target load balancing state.

Figure 16:
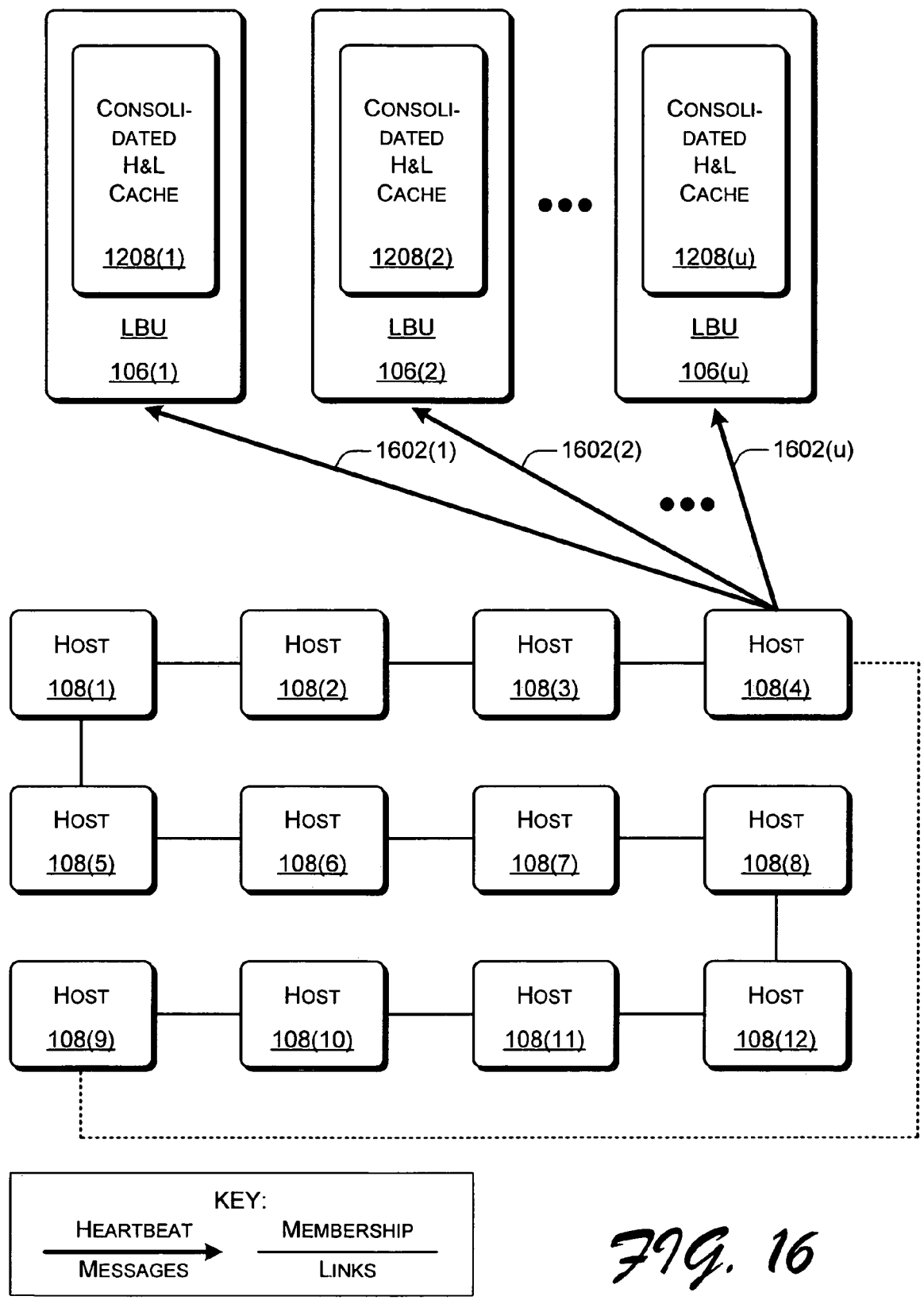
FIG. 16 illustrates an exemplary message transmission scheme for communications between the hosts and load balancing units that are illustrated in FIG. 12.

FIG. 16 illustrates an exemplary message transmission scheme for the communications that are illustrated in FIG. 12 between hosts 108 and load balancing units 106. The exemplary message transmission scheme can reduce the bandwidth consumed by heartbeat messages 1502 on communication linkage 1210. The message transmission scheme of FIG. 16 is particularly adapted to heartbeat messages 1502, but it may also be utilized for other messages of message protocol 1500.

A group of hosts 108(1), 108(2), 108(3) . . . 108(11), and 108(12) are illustrated along with load balancing units 106 (1), 106(2) . . . 106(u). Each line represents membership linkage or inclusion among the group of hosts 108(1, 2 . . . 12). The group of hosts 108(1, 2 . . . 12) form a membership of nodes that work together to propagate heartbeat information to load balancing units 106. Although twelve hosts are shown, more or fewer may be part of any given group of hosts. Also, a total set of hosts 108 that are being served by a load balancing infrastructure 106 may be divided into one, two, three, or more groups of hosts.

In a described implementation, the membership of nodes for group of hosts 108(1, 2 . . . 12) elect a leader that is responsible for transmitting heartbeat messages 1502 to load balancing units 106. Each (non-leading) host 108 in group of hosts 108(1, 2 . . . 12) sends its heartbeat messages 1502 to the elected leader. Host 108(4) is the elected leader in this example.

With the membership of nodes, heartbeat information for each host 108 in group of hosts 108(1, 2 . . . 12) propagates to the group leader host 108(4). Host 108(4) collects the heartbeat information and consolidates it into a consolidated heartbeat message 1602. Consolidated heartbeat messages 1602(1), 1602(2) . . . 1602(u) are then sent to respective load balancing units 106(1), 106(2) . . . 106(u). These consolidated heartbeat messages 1602 may optionally be compressed to further reduce bandwidth consumption.

As another alternative, the leader host 108(4) may only forward changes in group membership to consolidated health and load caches 1208. In other words, in this mode, consolidated health and load caches 1208 deal primarily if not solely with state changes to membership. It is the responsibility of the leader host 108(4) to ensure that the first hello is forwarded when a host 108 comes online and that a goodbye message 1504 gets sent when that host 108 goes offline. Additionally, a host 108 can periodically specify that a heartbeat message 1502 is to be "forwarded". This indicates to the leader host 108(4) to send it to consolidated health and load caches 1208 even though it does not represent a membership change.

Heartbeat messages 1502 (including consolidated heartbeat messages 1602) are used by load balancing units 106 when their consolidated health and load caches 1208 are unsynchronized with health and load tables 1204. This lack of synchronization may arise, for example, from a crash or other failure of consolidated health and load cache 1208 and/or of load balancing unit 106. As described above, each heartbeat message 1502 includes error checking data that is usable to verify equivalency between a consolidated health and load cache 1208 and health and load tables 1204. If non-equivalency is discovered with regard to a particular host 108 and/or an application 316 thereof, the DNS name of the particular host 108 is acquired from the heartbeat messages 1502.

The DNS name is used by consolidated health and load cache 1208 to send a get table snapshot message 1508 to the particular host 108 in order to get updated health and load information 1206 in the form of a send table snapshot message 1510. A different or the same get table snapshot message 1508 is sent to each host 108 for which non-equivalency is discovered. Eventually, the health and load information 1206 in the consolidated health and load cache 1208 is equivalent to the health and load information 1206 in health and load tables 1204 as verifiable by new heartbeat messages 1502. In this manner, a failed consolidated health and load cache 1208 can be bootstrapped back into operation without manual oversight using message protocol 1500 and an equivalency-checking scheme.

FIG. 17A and FIG. 17B illustrate exemplary health and load information proxy storage scenarios for health and load tables 1204 and for consolidated health and load caches 1208, respectively. In implementations described above with reference to FIGS. 12-16, hosts 108 include health and load infrastructure 1202. However, other implementations may entail hosts that do not include health and load infrastructure 1202.

For example, a host may be running a version of application(s) and/or an operating system for which health and load infrastructure is either not implemented or for policy reasons may not be installed on the host. Consequently, these types of hosts do not have health and load infrastructure 1202 executing thereon. Host 1702 is such a host that does not execute health and load infrastructure 1202. Nevertheless, host 1702 can utilize a health and load infrastructure 1202 that is executing on one or more proxies, such as proxy 1704.

Proxy 1704 has resident thereat and executing thereon a health and load infrastructure 1202, which includes a health and load table 1204. Host 1702 can use the functionality of health and load infrastructure 1202 by providing health and load information 1206 to health and load table 1204 for applications that are running on host 1702. Alternatively, proxy 1704 can deduce health and load on host 1702 by performing external monitoring actions. Proxy 1704 is illustrated as proxy 1704(1) and 1704(2) for redundancy and the resulting high availability.

In implementations described above with reference to FIGS. 12-16 and below with reference to FIG. 18, load balancing is effectuated with load balancing units 106 that include consolidated health and load caches 1208. However, other implementations may entail load balancing that does not include consolidated health and load caches 1208.

For example, load balancing may be effectuated by monolithic load balancing hardware or other load balancing infrastructure that does not and/or cannot store or otherwise include a consolidated health and load cache 1208. Load balancer 1706 reflects such a load balancing device or devices that do not have a consolidated health and load cache 1208. Nevertheless, load balancer 1706 can utilize a consolidated health and load cache 1208 that exists on one or more proxies, such as proxy 1708.

Proxy 1708 includes a consolidated health and load cache 1208, which stores health and load information 1206 for hosted applications being serviced by load balancer 1706. Load balancer 1706 can use the health and load information 1206 of consolidated health and load cache 1208 when performing load balancing functions by accessing such information using application programming interfaces (APIs) native to and supported by load balancer 1706. Alternatively, consolidated health and load cache 1208 can invoke APIs to push health and load information 1206, including directives, to load balancer 1706. Proxy 1708 is illustrated as proxy 1708(1) and 1708(2) for redundancy and the resulting high availability.

Figure 18:
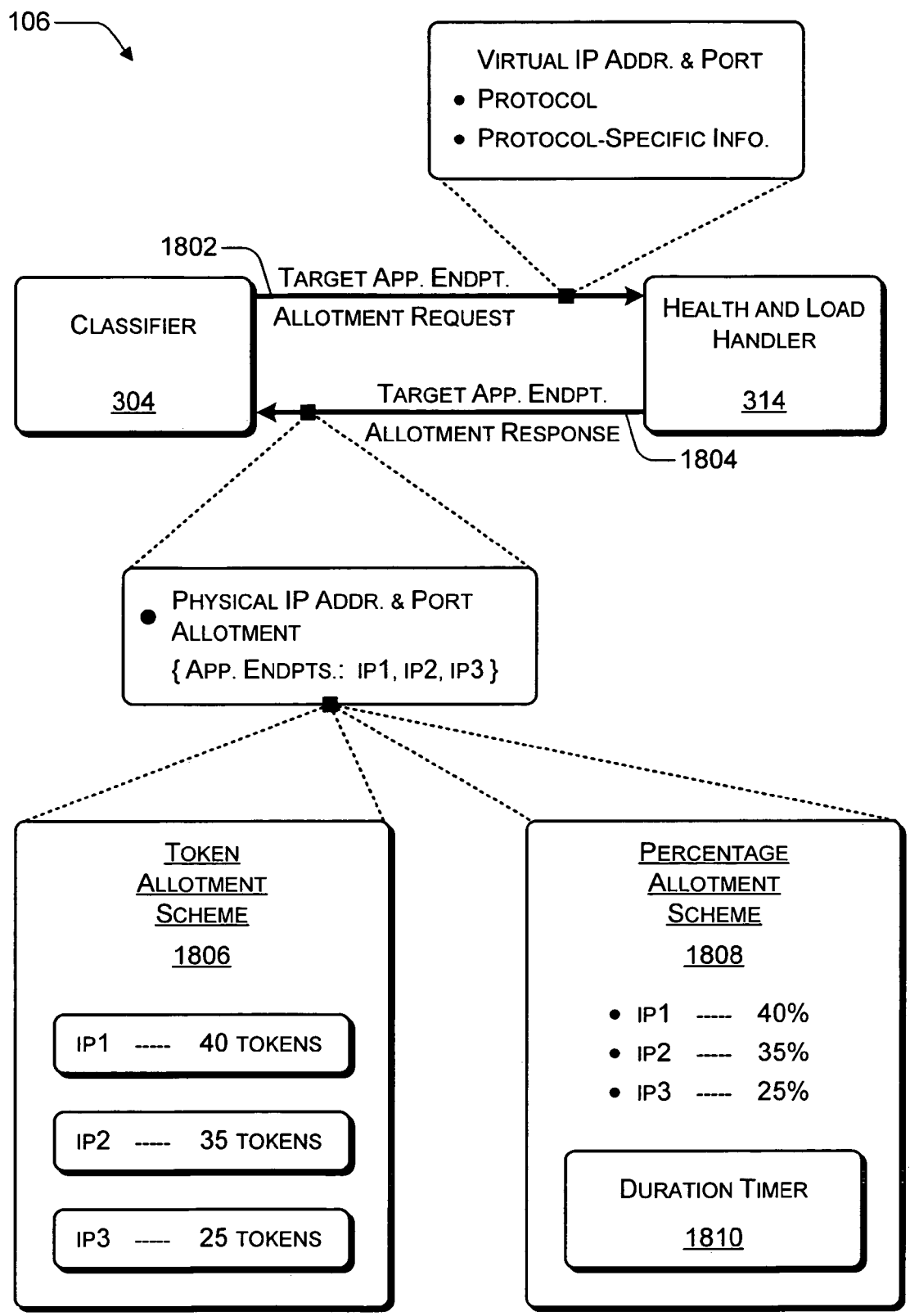
FIG. 18 illustrates an exemplary target host allotment procedure that utilizes health and load information.

FIG. 18 illustrates an exemplary target application endpoint allotment procedure that involves a classifier 304 and a health and load handler 314 of a load balancing unit 106. After health and load handler 314 has acquired a consolidated health and load cache 1208, health and load information 1206 thereof is utilized in the selection of application endpoints for new requests/connections.

As described above with reference to FIG. 13B, consolidated health and load cache 1208 includes cached health and load information 1206 for multiple hosts 108. To facilitate the creation and updating of consolidated health and load cache 1208 from health and load information 1206 that originates from multiple hosts 108, the health and load information 1206 therein is organized so that it may be accessed by identifier of each host 108. However, the health and load information 1206 therein is also organized such that it can be accessed by type of application 316 in order to facilitate application endpoint selection.

In other words, health and load handler 314 is capable of accessing health and load information 1206 on a per-application 316 basis across health and load information 1206 for multiple hosts 108. Once health and load information 1206 for a given application 316 has been accessed for each host 108, allocation of incoming connection requests may be performed in accordance with such health and load information 1206. For example, possible endpoints for the given application 316 may be allocated to incoming connection requests by selection of the endpoints of the given application 316 with consideration of available relative load capacity among healthy endpoints for the given application 316.

In a described implementation, classifier 304 makes a target application endpoint allotment request 1802 to health and load handler 314. As illustrated, target application endpoint allotment request 1802 includes (i) a virtual IP address and port, (ii) a protocol, and (iii) protocol-specification information. Target application endpoint allotment request 1802 therefore identifies a type of application 316 to which incoming connection requests are directed.

Health and load handler 314 receives target application endpoint allotment request 1802 and selects at least one physical endpoint corresponding to the identified type of application 316 using any one or more of many selection mechanisms. To reduce latency, health and load handler 314 selects an allotment of application endpoints to be used over a number of incoming connection requests. This allotment is provided from health and load handler 314 to classifier 304 using target application endpoint allotment response 1804. As illustrated, target application endpoint allotment response 1804 includes an allotment of physical IP addresses and ports (such as endpoints IP1, IP2, and IP3) for the identified type of application 316.

The allotment for target application endpoint allotment response 1804 may be completed using one or more allotment schemes. By way of example, a token allotment scheme 1806 and a percentage allotment scheme 1808 are illustrated. Token allotment scheme 1806 is a unit-based allotment scheme, and percentage allotment scheme 1808 is a time-based allotment scheme.

Token allotment scheme 1806 allocates tokens for each healthy endpoint IP1, IP2, and IP3 responsive to their relative load and capacity ratios. For the example as illustrated, of the total available capacity, IP1 has 40% of the available capacity, IP2 has 35% of the available capacity, and IP3 has 25% of the available capacity. Thus, the total number of tokens is divided along these percentages. The total number of tokens may be provided as part of target application endpoint allotment request 1802 or determined by health and load handler 314.

Any value for the total number of tokens may be used, such as 10, 45, 100, 250, 637, 1000, and so forth. This value may be set in dependence on the number of connection requests per second and the speed/frequency at which application health and/or load is changing. Classifier 304 "uses up"/consumes one token when responding to each connection request with an application endpoint allocation until the tokens are exhausted; classifier 304 then requests another token allotment using target application endpoint allotment request 1802.

Percentage allotment scheme 1808 determines available relative capacity in a similar manner. However, instead of tokens, these determined available relative capacities per application endpoint are provided to classifier 304 along with a duration timer 1810. Classifier 304 allocates target application endpoints to incoming connection requests in accordance with these available relative capacity percentages until expiration of duration timer 1810.

For percentage allotment scheme 1808, classifier 304 maintains a running record of application endpoint allocations to adhere to the allotted percentages and keeps track of time for duration timer 1810. When the timer expires, classifier 304 then requests another percentage allotment using target application endpoint allotment request 1802.

It should be noted that token allotment scheme 1806 can also use a time limit. If allotted tokens are too old, they should be discarded and new ones acquired. Otherwise, classifier 304 may consume stale tokens that were previously allocated based on health and load information that is currently too outdated. Use of application endpoint allotments by classifier 304 is described further below in the section entitled "Exemplary Classifying, Forwarding, and Request Routing".

Exemplary Session Tracking

This section describes how host status information, such as session information, may be collected for and utilized in network load balancing. This section primarily references FIGS. 19-24 and illuminates session affinity preservation functionality such as that provided by session tracker 308 (of FIG. 3). As described above with reference to FIGS. 1-3, each host 108 hosts one or more applications 316 that provide service(s) to clients 102. Session tracker 308 utilizes session information that relates to contexts for the connections established between applications 316 and clients 102 for certain described implementations of network load balancing.

Figure 19:
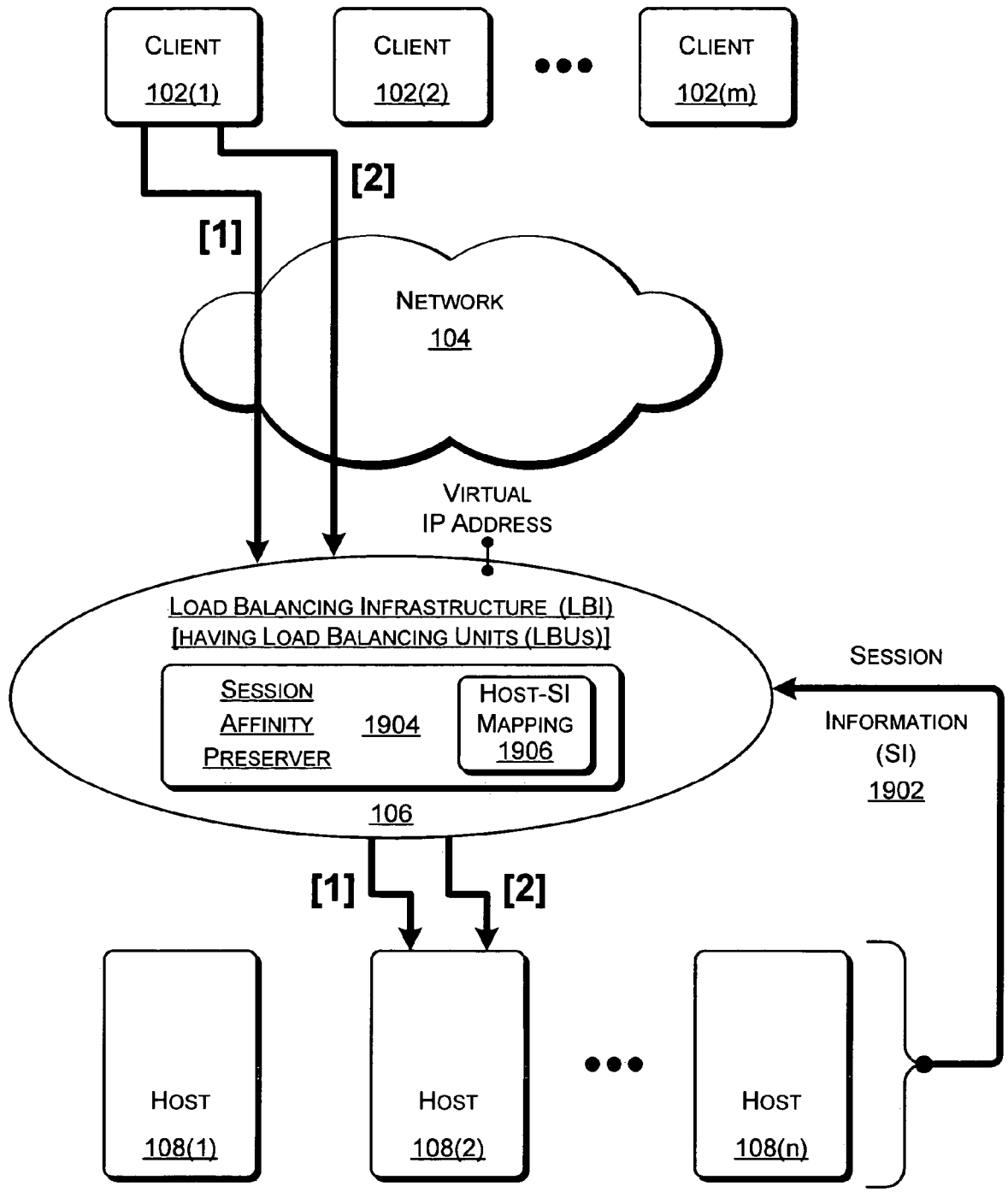
FIG. 19 illustrates an exemplary network load balancing approach that involves session information.

FIG. 19 illustrates an exemplary network load balancing approach that involves session information 1902. At connection [1], client 102(1) is shown making a new connection with host 108(2) via load balancing infrastructure 106. Load balancing infrastructure 106 may be comprised of one or more load balancing units 106. When the connection request arrives at load balancing infrastructure 106, the request is typically routed to a host 108 using network load balancing functionality responsive to health and/or load information of hosts 108 and/or applications 316 (not explicitly shown in FIG. 19) thereof.

When connection [1] is made, a session is established between client 102(1) and the servicing application 316, which is on host 108(2) in this example. The session provides a context for the communication exchange between client 102(1) and host 108(2). The information for the session context is stored at host 108(2). When connection [1] is completed, the session context may not be used again. On the other hand, the session context may be useful again if client 102(1) attempts to initiate another connection with hosts 108 for the service provided by application 316. If this other connection is not routed to the same host 108(2) that stores that session context, then client 102(1) has to establish a new session context, which can be time consuming, data/processing intensive, and/or frustrating to the human user of client 102(1). With health and/or load information-based network load balancing, there is no likelihood greater than random chance that the second connection will be routed to 108(2).

However, if load balancing infrastructure 106 has access to a mapping between session information and hosts 108, load balancing infrastructure 106 can route connection requests that relate to previously established sessions to the appropriate host 108. Some session information may be inferred from the contents of packets flowing through load balancing infrastructure 106. However, this approach is imprecise and haphazard for a number of reasons. First, session establishment and termination is merely inferred. Second, some sessions are not "officially" terminated with an appropriate indication that is included in a packet. For example, some sessions simply time out. Third, packets being transmitted from host 108(2) to client 102(1) may take a path that does not include load balancing infrastructure 106, which precludes any snooping of such packets by load balancing infrastructure 106 for session information.

As shown in FIG. 19, hosts 108 provide session information (SI) 1902 to load balancing infrastructure 106. Using session information 1902 from hosts 108, a session affinity preserver 1904 can preserve the affinity between an established session and the host 108 on which the session was established. Session information 1902 includes a linkage between or a mapping from each session established between a client 102 and a particular host 108 to that particular host 108. This mapping is accessible to session affinity preserver 1904 as part of host-session information mapping 1906. More-specific examples of session information 1902 are provided below especially with reference to FIGS. 20, 22, 23A, and 23B.

In certain described implementations for session tracking, the logical nature of clients 102 is pertinent. As noted above with reference to FIG. 1, a client 102 may be a specific device and/or a specific user of a device. Consequently, session affinity for a user client 102 that is accessing hosts 108 from different devices can still be preserved. Session continuations using session information 1902 can therefore still be effectuated in proxy scenarios (e.g., those of some internet service providers (ISPs)).

Continuing with the connection [1] example, the session established at host 108(2) is provided to load balancing infrastructure 106 as session information 1902. Specifically, a linkage/mapping between (i) the session context of client 102(1) and host 108(2) and (ii) an identifier for host 108(2) is created at host-session information mapping 1906. When a connection request for connection [2] subsequently arrives for the same session context, session affinity preserver 1904 locates this session context in host-session information mapping 1906 and ascertains that host 108(2) is associated with this session context from the linkage/mapping.

Responsive to the mapping of host 108(2) to the requested session context as ascertained by session affinity preserver 1904 from host-session information mapping 1906, connection [2] is routed to host 108(2). In this sense, preserving session affinity is a higher priority for load balancing infrastructure 106 than application health and load-based network load balancing decisions. However, health and/or load may be a more important network load balancing factor than session tracking when, for example, loading is extremely heavy or when the session-relevant application and/or host is in a failed condition.

Many types of connections may be session-related. Examples include: a TCP connection, a transport layer security (TLS)/SSL session, a PPTP session, an IPSec/L2TP session, an ISA session, an HTTP cookie-based session, a Terminal Server session, an administrator-defined session, and so forth. By way of clarification, a TCP connection is considered to be a session of TCP packets. Also, a model for defining sessions by an administrator may be enumerated and supported. Furthermore, client IP-address-based sessions that are delineated by timeouts may also be supported. This is relatively non-intelligent session support, but is expected by some users.

A connection request from a client 102 varies by the type of desired session. For example, for sessions of type "TCP connection", the connection request comprises a TCP packet. For sessions of type "SSL session", the connection request comprises a TCP connection. Other such connection requests correspond to other session types. These examples also show how there may be session layers. At a lower session level, a session context for a TCP connection may include a TCP 4-tuple, a session number, the number of bytes sent/received, and so forth. At a higher session level, a session context for an SSL session may include a 32-byte session ID, a public key of the client 102 that is provided to the host 108, and so forth.

Figure 20:
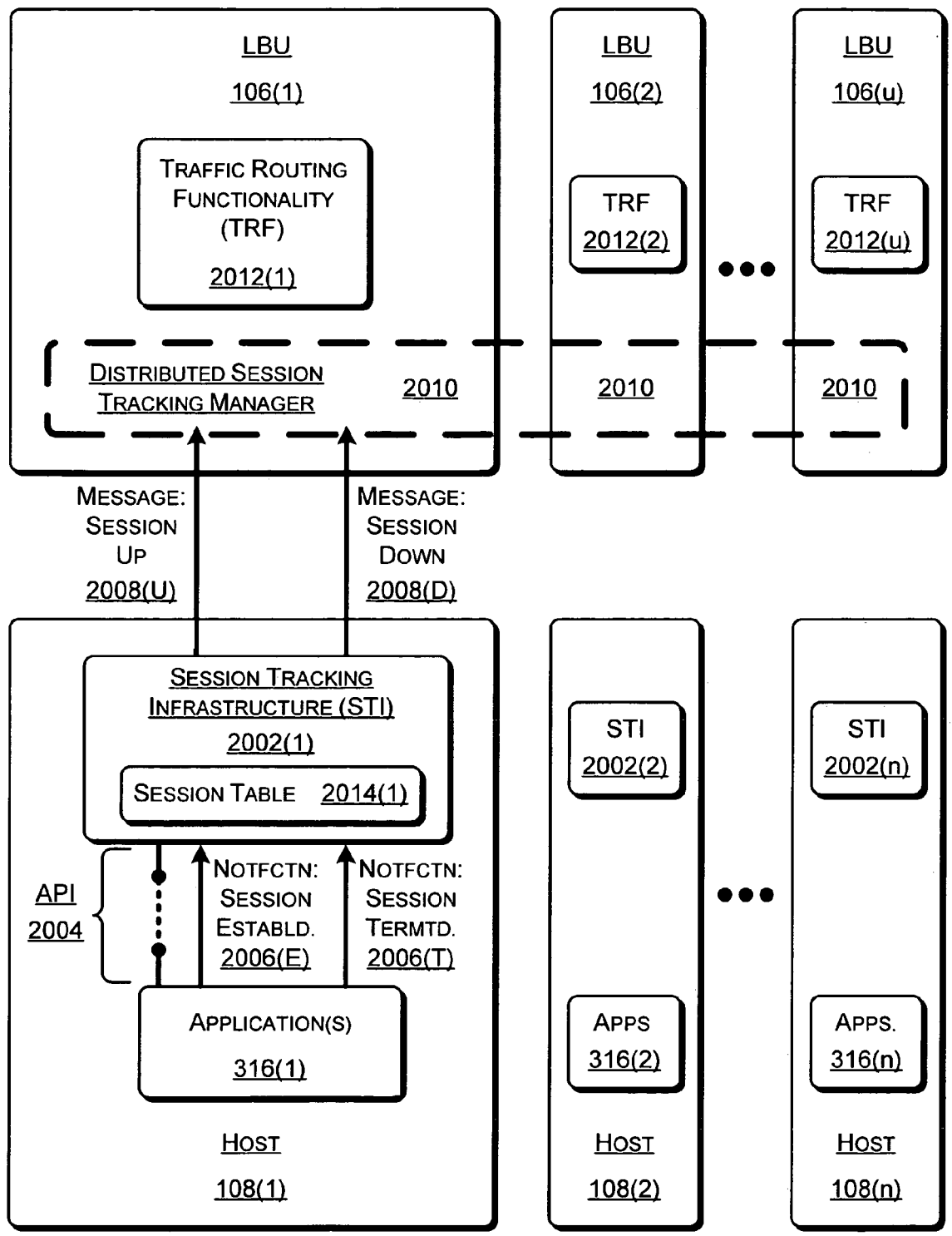
FIG. 20 illustrates an exemplary network load balancing approach that involves communicating session information using notifications and messages.

FIG. 20 illustrates an exemplary network load balancing approach that involves communicating session information using notifications 2006 and messages 2008. Multiple load balancing units 106(1), 106(2) . . . 106(u) and multiple hosts 108(1), 108(2) . . . 108(n) are shown. Each respective host 108(1), 108(2) . . . 108(n) includes one or more respective applications 316(1) 316(2) . . . 316(n) which are resident thereat and executing thereon. Notifications 2006 are used to provide session information from applications 316, and messages 2008 are used to provide session information from hosts 108 to load balancing units 106.

As illustrated, each respective host 108(1), 108(2) . . . 108(n) includes respective session tracking infrastructure (STI) 2002(1), 2002(2) . . . 2002(n). Each respective session tracking infrastructure 2002(1), 2002(2) . . . 2002(n) includes a respective session table 2014(1), 2014(2) . . . 2014(n) (although only session table 2014(1) is explicitly illustrated in FIG. 19).

Each respective load balancing unit 106(1), 106(2) . . . 106(u) includes respective traffic routing functionality (TRF) 2012(1), 2012(2) . . . 2012(u). Traffic routing functionality 2012 may comprise, for example, classifying and/or requesting routing functionality, such as that provided by classifier 304 and request router 306, respectively. Distributed across load balancing units 106(1), 106(2) . . . 106(u) is a distributed session tracking manager 2010.

In a described implementation, traffic routing functionality 2012 and distributed session tracking manager 2010 are part of load balancing infrastructure 106. Session tracking infrastructure 2002 may also be (e.g., a remote) part of load balancing infrastructure 106.

An API 2004 is employed to provide session information from applications 316 to session tracking infrastructure 2002. Using API 2004, applications 316 are empowered to notify session tracking infrastructure 2002 of session information, including various changes thereto. More specifically, each application 316 is capable of providing, and session tracking infrastructure 2002 is capable of accepting, notifications 2006.

A notification that a session has been established (or session establishment notification 2006(E)) is provided from application 316 when a session is newly established or opened. Session establishment notification 2006(E) includes a session identifier and optionally an identifier of application 316. A notification that a session has been terminated (or session termination notification 2006(T)) is provided from application 316 when a session is terminated or closed. Session termination notification 2006(T) also includes the session identifier and optionally the identifier of application 316.

When session tracking infrastructure 2002 accepts a session establishment notification 2006(E), it inserts an entry in session table 2014 for the new session. An exemplary session table 2014 is described further below with reference to FIG. 23A. When session tracking infrastructure 2002 accepts a session termination notification 2006(T), it removes the entry in session table 2014 for the old session.

Session table 2014(1) is the authoritative source for session information 1902 with respect to applications 316(1) on host 108(1). There is generally too much latency, however, to require traffic routing functionality 2012 to contact hosts 108 for access to session tables 2014 upon receipt of each incoming connection request having a session reference. Session information 1902 is therefore cached at load balancing units 106.

At load balancing units 106, distributed session tracking manager 2010 caches session information 1902 as part of its session tracking management responsibilities. Generally, distributed session tracking manager 2010 is a distributed application and/or virtual service that resides partially on each load balancing unit 106. For each logical session, distributed session tracking manager 2010 keeps at least one cached copy of session information therefor in a reliable and scalable manner that may be quickly utilized for routing traffic as incoming connection requests that have a session reference are received by load balancing infrastructure 106.

Communications between hosts 108 and load balancing units 106 are effectuated with a reliable protocol that ensures that messages 2008 sent from a host 108 arrive at the intended load balancing unit 106. Each host 108 is bound to at least one specific load balancing unit 106 that is the intended load balancing unit 106 for messages 2008. This binding is created by assigning an IP address of a specific load balancing unit 106 to each host 108 for sending session-tracking messages 2008 between session tracking infrastructure 2002 and distributed session tracking manager 2010. To facilitate high availability of load balancing infrastructure 106, if a load balancing unit 106 fails, another load balancing unit 106 assumes the IP address of the failed load balancing unit 106. Failure detection for IP address assumption may be accomplished using a heartbeat or another aliveness monitoring scheme.

Thus, messages 2008 communicate session information 1902 from session tracking infrastructure 2002 to distributed session tracking manager 2010. For example, when session tracking infrastructure 2002 accepts a session establishment notification 2006(E), it also sends a session up message 2008(U) to distributed session tracking manager 2010. Session up message 2008(U) includes the session identifier, a host identifier, and optionally other information. Contents for a session up message 2008(U) are described further below with reference to FIG. 23B with respect to information that may be stored for each session by an implementation of distributed session tracking manager 2010. When session tracking infrastructure 2002 accepts a session termination notification 2006 (T), it also sends a session down message 2008(D) to distributed session tracking manager 2010. Messages 2008 can be sent before, during, or after session tracking infrastructure 2002 appropriately modifies session table 2014 in response to notifications 2006.

Figure 21:
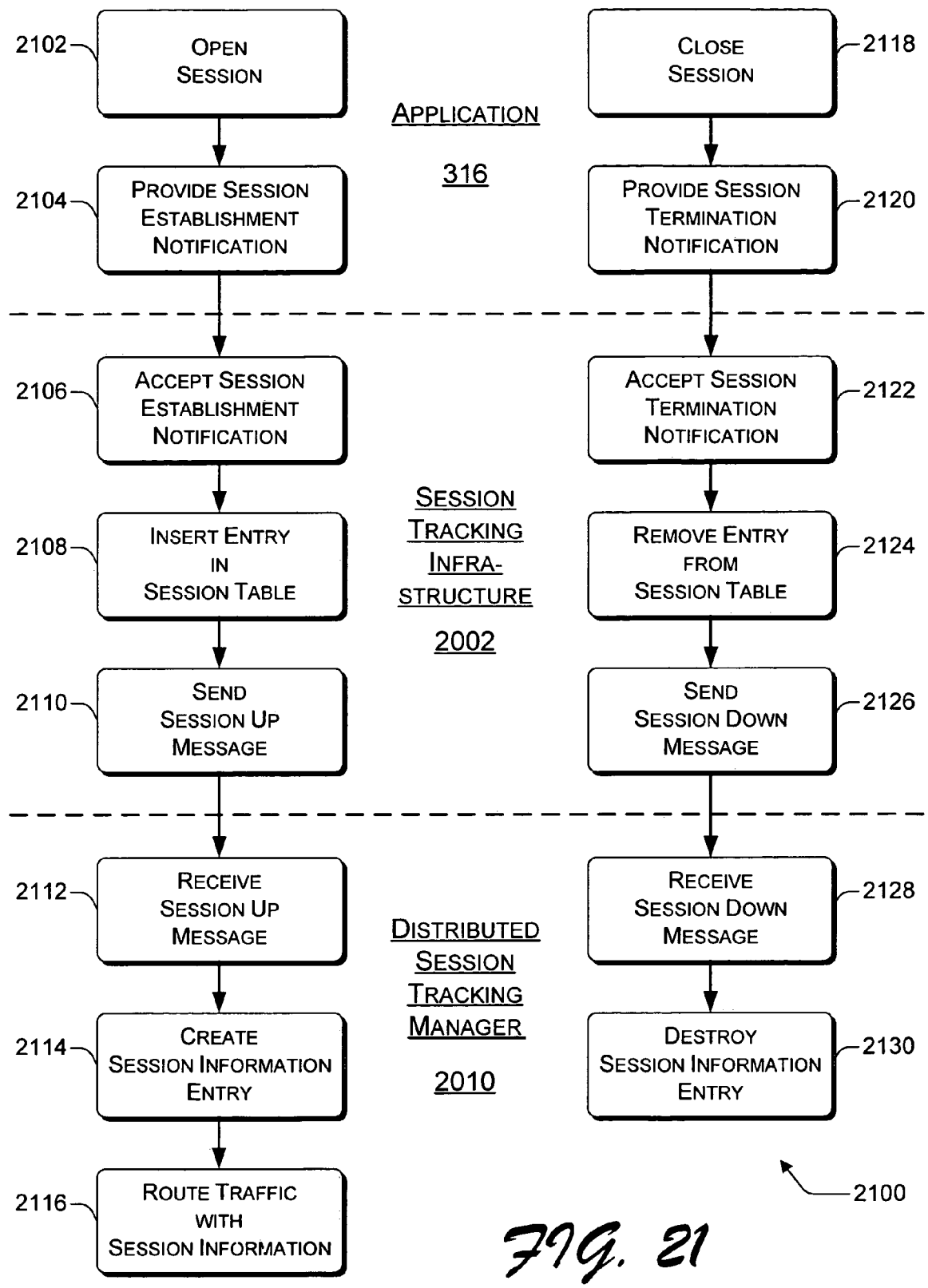
FIG. 21 is a flow diagram that illustrates an exemplary method for network load balancing that involves communicating session information using notifications and messages.

FIG. 21 is a flow diagram 2100 that illustrates an exemplary method for network load balancing that involves communicating session information using notifications and messages. Flow diagram 2100 includes fifteen blocks 2102-2130. Although the actions of flow diagram 2100 may be performed in other environments and with a variety of software schemes, FIGS. 1-3 and 19-20 are used in particular to illustrate certain aspects and examples of the method.

For example, the actions of four blocks 2102-2104 and 2118-2120 are performed by an application 316, the actions of six blocks 2106-2110 and 2122-2126 are performed by session tracking infrastructure 2002, and the actions of five blocks 2112-2116 and 2128-2130 are performed by a distributed session tracking manager 2010. The actions of eight of these blocks 2102-2116 are primarily directed to opening a session, and the actions of seven of these blocks 2118-2130 are primarily directed to closing a session.

At block 2102, a session is opened. For example, application 316 may open a session with a client 102. At block 2104, a session establishment notification is provided. For example, application 316 may provide a session establishment notification 2006(E) to session tracking infrastructure 2002 using API 2004 as a consequence of and/or in conjunction with opening the session.

At block 2106, the session establishment notification is accepted. For example, session tracking infrastructure 2002 may accept session establishment notification 2006(E) from application 316 in accordance with API 2004. At block 2108, an entry in a session table is inserted. For example, session tracking infrastructure 2002 may insert an entry in session table 2014 for the opened session. Examples of such insertion are described further below especially with reference to FIG. 23A. At block 2110, a session up message is sent. For example, session tracking infrastructure 2002 may send a session up message 2008(U) to distributed session tracking manager 2010 using a reliable communication protocol.

At block 2112, the session up message is received. For example, distributed session tracking manager 2010 may receive session up message 2008(U) from session tracking infrastructure 2002 in accordance with the reliable communication protocol. At block 2114, a session information entry is created. For example, distributed session tracking manager 2010 may create a session information entry for cached session information 1902 at one or more load balancing units 106. Examples of such creating and subsequent adding are described further below especially with reference to FIGS. 22 and 23B.

At block 2116, network traffic is routed with the session information. For example, traffic routing functionality 2012 in conjunction with distributed session tracking manager 2010 may use cached session information 1902, including the created session information entry, to route incoming connection requests that have a session reference. An example of such traffic routing is described further below especially with reference to FIG. 24. Additional examples are described below in the section entitled "Exemplary Classifying, Forwarding, and Request Routing".

At block 2118, the session is closed. For example, application 316 may close the session with client 102. At block 2120, a session termination notification is provided. For example, application 316 may provide a session termination notification 2006(T) to session tracking infrastructure 2002 using API 2004 as a consequence of and/or in conjunction with closing the session.

At block 2122, the session termination notification is accepted. For example, session tracking infrastructure 2002 may accept session termination notification 2006(T) from application 316 in accordance with API 2004. At block 2124, the entry in the session table is removed. For example, session tracking infrastructure 2002 may remove the entry in session table 2014 for the closed session. At block 2126, a session down message is sent. For example, session tracking infrastructure 2002 may send a session down message 2008(D) to distributed session tracking manager 2010 using the reliable communication protocol.

At block 2128, the session down message is received. For example, distributed session tracking manager 2010 may receive session down message 2008(D) from session tracking infrastructure 2002 in accordance with the reliable communication protocol. At block 2130, the session information entry is destroyed. For example, distributed session tracking manager 2010 may destroy the session information entry at the cached session information 1902 at any load balancing units 106 that have the session information entry. Examples of such destroying and subsequent deleting are described further below especially with reference to FIGS. 22 and 23B.

Figure 22:
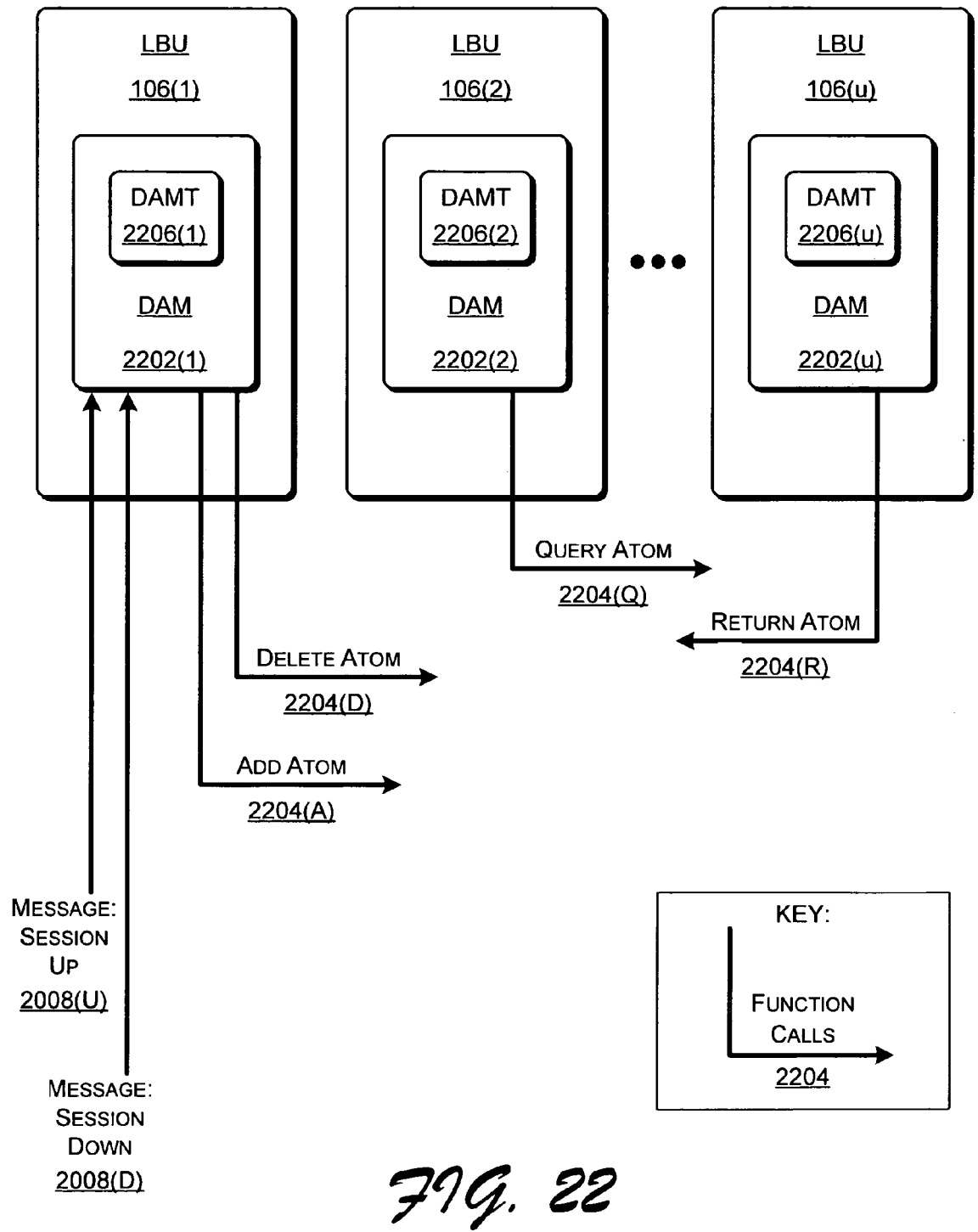
FIG. 22 illustrates an exemplary approach to managing session information at multiple load balancing units.

FIG. 22 illustrates an exemplary approach to managing session information at multiple load balancing units 106. Each respective load balancing unit 106(1), 106(2) . . . 106(u) includes a respective part 2202(1), 2202(2) . . . 2202(u) of a distributed atom manager (DAM) 2202. DAM 2202 is an exemplary implementation of distributed session tracking manager 2010. Each respective DAM portion 2202(1), 2202 (2) . . . 2202(u) includes a respective part 2206(1), 2206(2) . . . 2206(u) of a DAM table (DAMT) 2206.

DAM 2202 is a distributed application or virtual service that manages session information 1902 in a reliable and scalable manner so that traffic routing functionality 2012 can use it to preserve session affinity. For example, traffic routing functionality 2012 can access DAM 2202 using an API (not specifically shown) to search or have searched DAMT 2206. Function calls 2204, operation of DAM 2202, and other aspects of FIG. 22 are described further below after the description of FIGS. 23A and 23B.

FIG. 23A is an exemplary session table 2014 as illustrated in FIG. 20. Session table 2014 includes "v" entries 2302(1), 2302(2) . . . 2302(v). Each entry 2302 is inserted by session tracking infrastructure 2002 responsive to a session establishment notification 2006(E) that is accepted from an application 316. Each entry 2302 is removed by session tracking infrastructure 2002 responsive to a session termination notification 2006(T) that is accepted from application 316.

As described above, each session establishment notification 2006(E) includes a session identifier and optionally an identifier of application 316. Each respective entry 2302(1), 2302(2) . . . 2302(v) in session table 2014 includes respective fields of (i) session identifier 2302(1I), 2302(2I) . . . 2302(vI) and (ii) session type and/or application 2302(1T), 2302(2T) . . . 2302(vT).

Session type and/or application 2302(T) may be "TCP", "IPSEC", "Terminal Server," "HTTP-cookie", an application type as noted above, and so forth. Session identifier 2302(I) may be "<source IP address, source TCP port, destination IP address, destination TCP port >", "Client IP=172.30.189.122", "User='joe_user'", "Cookie= '{b7595cc9-e68b-4eb0-9bf1-bb717b31d447}'", another e.g. application-specific identification for a session, and so forth. For TCP connection/session types, session identifier 2302(I) may alternatively be a canonical version of the TCP 4-tuple (for IPv4 or IPv6). Other values for the fields of session identifier 2302(I) and application/session type 2302(T) may alternatively be used.

FIG. 23B is an exemplary distributed atom manager (DAM) table (DAMT) 2206 as illustrated in FIG. 22. DAM table 2206 includes "w" entries 2304(1), 2304(2) . . . 2304(w). Each session information entry 2304 is created by DAM 2202 responsive to a session up message 2008(U) that is received from session tracking infrastructure 2002. Each session information entry 2304 is destroyed responsive to a session down message 2008(D) that is received from session tracking infrastructure 2002. As described further below, session information entries 2304 of DAM tables 2206 may actually be manipulated by DAM 2202 using function calls 2204.

As described above, session up message 2008(U) includes the session identifier, a host identifier, and optionally other information. Each respective session information entry 2304(1), 2304(2) . . . 2304(w) in DAM table 2206 includes respective fields of (i) key 2304(1K), 2304(2K) . . . 2304(wK), (ii) data 2304(1D), 2304(2D) . . . 2304(wD), and (iii) metadata 2304(1M), 2304(2M) . . . 2304(wM). For example, values for key 2304(K) fields may be alphanumeric strings, and values for data 2304(D) fields may be binary bits. Values for key 2304(K) may be binary bits, too.

Key 2304(K) may correspond to the session identifier 2302(I). Data 2304(D) may correspond to the host identifier, such as a network address of the host 108 on which the session context exists. Metadata 2304(M) may correspond to other, optional information. Examples of such metadata 2304(M) include data that is used internally by DAM 2202 to resolve atom collisions and to track atom aliveness (e.g., via a timeout mechanism). (This characterization of entries 2304 as being atomic is described more fully in the following paragraph.) More specifically, metadata 2304(M) includes, among other things, the identity of the entity (e.g., the instance of traffic routing functionality 2012) that added the session information entry 2304 to the DAM table 2206.

In a described implementation, each session information entry 2304 is atomic in the sense that DAM 2202 may add, delete, copy, etc. the entries 2304 as a whole, but DAM 2202 does not ordinarily modify a portion of any whole entry 2304. Thus, atomic entries 2304 are added, deleted, copied, otherwise manipulated, etc. across DAM tables 2206 by DAM 2202 in order to implement availability and scalability for a session affinity preservation implementation.

Function calls 2204 (of FIG. 22) are usable by DAM 2202 to manipulate the atomic entries 2304 of DAM table 2206. Function calls 2204 may be communicated from one load balancing unit 106 to one or more other load balancing units 106 in a point-to-point or a multicast manner. These function calls include add atom 2204(A), delete atom 2204(D), query atom 2204(Q), and return atom 2204(R).

Add atom 2204(A) takes the form AddAtom(key, data) and is used to add an atomic entry 2304 to one or more DAM tables 2206. Hence, an add atom 2204(A) function call may be formulated as AddAtom(<session identifier>, host IP address). Delete atom 2204(D) takes the form DeleteAtom (key) and is used to delete an atomic entry 2304 at one or more DAM tables 2206. Delete atom 2204(D) function calls may be directed at those DAM tables 2206 known to have a copy of the session that is identified by the key 2304(K) or may be multicast to all DAM tables 2206 to ensure that any copies are deleted.

Query atom 2204(Q) takes the form QueryAtom(key) and is used by a particular DAM portion 2202 when a session identifier as referenced by an incoming connection request is not located in the particular local DAM table 2206 of the particular DAM portion 2202. Query atom 2204(Q) function calls are sent to one or more (including possibly all) other DAM portions 2202. In response, each other DAM portion 2202 checks its local DAM table 2206 for the key/session identifier. If the key is located by another DAM portion 2202, this other DAM portion 2202 replies with a return atom 2204(R).

Return atom 2204(R) takes the form ReturnAtom(key, data) and is used to reply to a query atom 2204(Q) function call. Return atom 2204(R) function calls are used when a DAM portion 2202 has a requested atomic entry 2304 in its local DAM table 2206 as identified by a key 2304(K) specified in the query atom 2204(Q) function call. Return atom 2204(R) function calls may be directed back to the DAM portion 2202 that issued the query atom 2204(Q) function call.

Add atom 2204(A) function calls are used in response to session up messages 2008(U) and/or to replicate an atomic entry 2304 to one or more other DAM tables 2206. Such replication may be for redundancy and/or scalability.

Delete atom 2204(D) function calls are used in response to session down messages 2008(D) and may also be sent to one or more other DAM tables 2206. After an atomic entry 2304 is deleted, the atomic entry 2304 may enter a "zombie" state such that it remains with DAM 2202, and optionally so that it is actually still stored with DAM table 2206 with a zombie indication in the metadata 2304(M) field of the atomic entry 2304.

Thus, once an atomic entry 2304 is deleted, it may stay on in DAM 2202 and DAM table 2206 in a zombie state so that packets for this (now dead and closed) session are directed to the host 108 of the session context for proper, protocol-specific treatment. For example, TCP packets received after a TCP connection has been torn down are directed to the host 108 that terminated the connection. This host 108 can respond appropriately—perhaps by sending an RST or by resending a FIN-ACK. The time the atomic entry 2304 spends in this zombie state matches (as closely as reasonably possible) the protocol-specific dead time of the reliable communication protocol that is employed.

A query atom 2204(Q) function call is used to attain an atomic entry 2304 when a first load balancing unit 106 receives an incoming connection request that references a session that is not stored in the local DAM table 2206 of the DAM 2202 of the first load balancing unit 106. It should be noted that other DAM portions 2202 may be queried simultaneously in a broadcast query atom 2204(Q) function call or sequentially until a positive return atom 2204(R) function call is received.

A return atom 2204(R) function call is used by a DAM portion 2202 of a second load balancing unit 106 to provide an atomic entry 2304 to the DAM portion 2202 of the first load balancing unit 106, where the atomic entry 2304 has a key 2304(K) that is specified by the key/session identifier in a query atom 2204(Q) function call, which was previously issued by the DAM portion 2202 of the first load balancing unit 106. It should be noted that other components, such as traffic routing functionality 2012, may also be capable of calling functions 2204, especially a query atom 2204(Q) function call, in accordance with an API or similar.

DAM portions 2202 and DAM tables 2206 may be organized and managed in a myriad of manners. Exemplary manners relate to replication/redundancy, local caching upon acquisition, hashing for location selection, and so forth. Zero, one, two, or more levels of replication up to full replication may be employed. With a zero level of replication, each atomic entry 2304 is stored at the DAM 2202 that receives a session up message 2008(U) therefor without replication to other DAM portions 2202.

With a first level of replication, each atomic entry 2304 is stored at the DAM 2202 that receives a session up message 2008(U) therefor, and it is also added (copied) to one other DAM portion 2202 using an add atom 2204(A) function call. This handles one level of failure for a load balancing unit 106. Similarly, with a second level of replication, each atomic entry 2304 is stored at the DAM 2202 that receives a session up message 2008(U) therefor, and it is also added to two other DAM portions 2202. Generally, the one, two, etc. other DAM portions 2202 to which a given DAM portion 2202 copies atomic entries 2304 is predetermined or selected at random. Third, fourth, etc. levels of replication may also be employed.

Furthermore, full replication may be employed by having each atomic entry 2304 that is stored at the DAM 2202 that receives a session up message 2008(U) therefor also being added to every other DAM portion 2202. Several factors are impacted by selection of the replication level: As the replication level increases, availability increases and latency decreases. On the other hand, network traffic and memory usage both increase as the replication level increases.

When full replication is not employed, local caching upon acquisition may be. For example, when a DAM portion 2202 does not locate a referenced session identifier in its part of DAM table 2206, the DAM portion 2202 issues a query atom 2204(Q) function call to attain the atomic entry 2304 associated with the referenced session identifier via a return atom 2204(R) function call. Instead of jettisoning the attained atomic entry 2304 after use thereof, the DAM portion 2202 caches the attained atomic entry 2304 in its part of DAM table 2206. This option offers a tradeoff between the above-enumerated factors.

As another option when full replication is not employed, hashing for location selection may be. The first atomic entry 2304 for a session is stored at the DAM portion 2202 that receives the session up message 2008(U). Replicated copy or copies are sent via add atom 2204(A) function calls to specific DAM portion(s) 2202 using a hashing function. Of a total range of possible hash values, each DAM portion 2202 is assigned a subset thereof. Each session identifier is hashed using some hashing function to arrive at a hashing value. This hashing value is mapped to the assigned DAM portion(s) 2202. The DAM portion 2202 that first added the atomic entry 2304 then replicates the atomic entry 2304 to the assigned DAM portion(s) 2202.

With hashing for location selection, at least one DAM portion 2202 that has a desired atomic entry 2304 locally cached at its DAM table 2206 is knowable from the session identifier. A query atom 2204(Q) function call can therefore be directed to the known DAM portion(s) 2202. This usually reduces network traffic and/or latency.

This hashing for location selection may be used with one, two, three, or more levels of replication with each range of hashing values mapping to one, two, three, etc. different DAM portions 2202, respectively. Additionally, hashing for location selection may be used with local caching upon acquisition.

Figure 24:
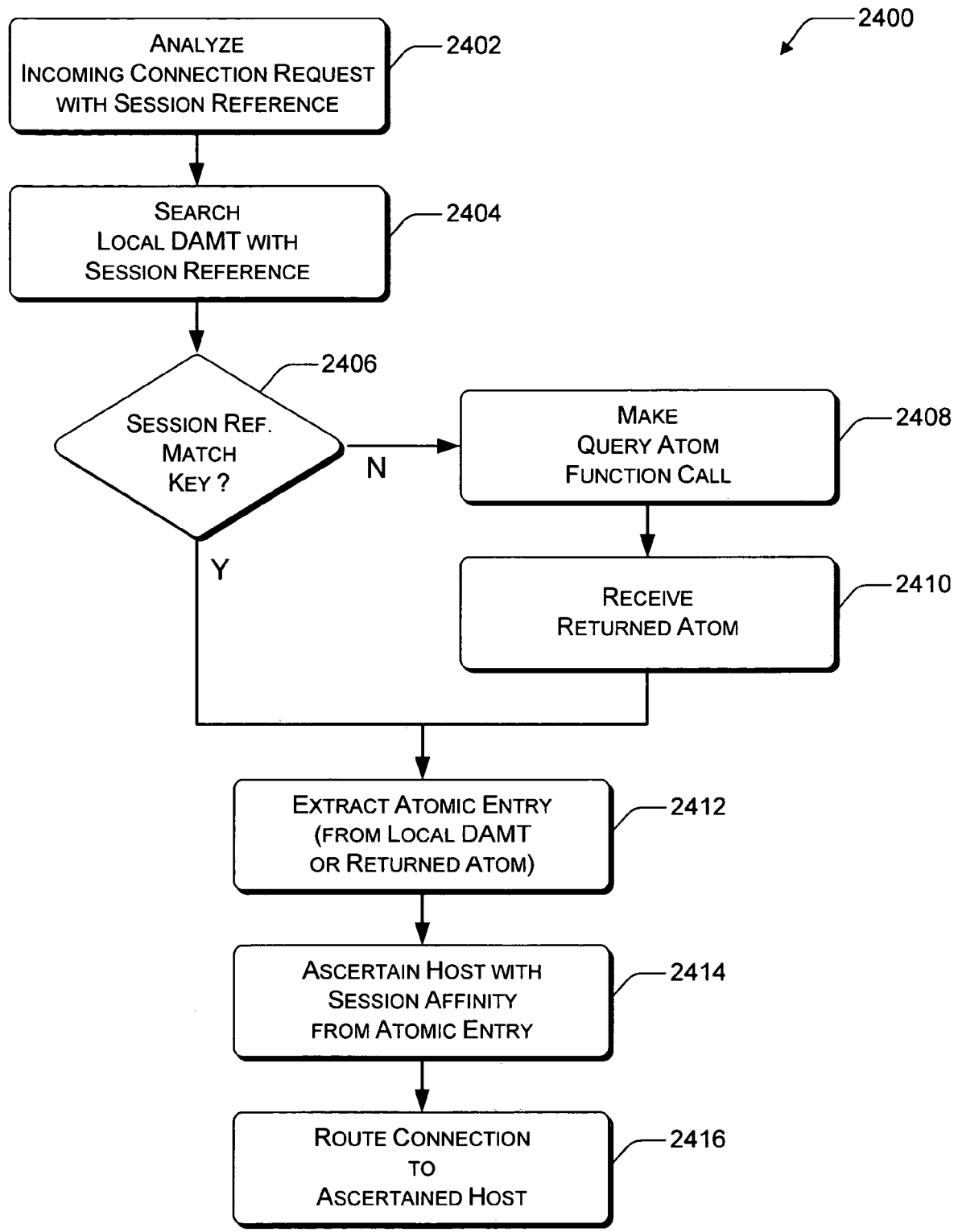
FIG. 24 is a flow diagram that illustrates an exemplary method for managing session information at multiple load balancing units.

FIG. 24 is a flow diagram 2400 that illustrates an exemplary method for managing session information at multiple load balancing units. Flow diagram 2400 includes eight blocks 2402-2416. Although the actions of flow diagram 2400 may be performed in other environments and with a variety of software schemes, FIGS. 1-3, 19, 20, 22, and 23B are used in particular to illustrate certain aspects and examples of the method.

At block 2402, an incoming connection request with a session reference is analyzed. For example, traffic routing functionality 2012 may receive an incoming connection request that references a previously-opened/established session of a particular type. At block 2404, a local DAM table is searched using the session reference. For example, for a given load balancing unit 106 and traffic routing functionality 2012, the DAM portion 2202 thereof may search its corresponding DAM table 2206 looking for the session reference.

At block 2406, it is determined if the session reference matches a key of the local DAM table. For example, DAM portion 2202 may search key fields 2304(K) of multiple entries 2304 of DAM table 2206 to determine whether the session reference matches any values of the key fields 2304(K). If so, flow diagram 2400 continues at block 2412.

If, on the other hand, the session reference does not match any key, flow diagram 2400 continues at block 2408. At block 2408, a query atom function call is made. For example, DAM portion 2202 may make a query atom 2204(Q) function call that includes the session reference/identifier as the key. The query atom 2204(Q) function call may be sent to at least one other DAM portion 2202. The number, selection, order, etc. of possible destination DAM portions 2202 for query atom 2204(Q) may depend on the options (e.g., replication level, hashing for location selection, local caching upon acquisition, point-to-point versus multicast, etc.) employed by DAM 2202.

At block 2410, a returned atom is received. For example, information from a returned atom 2204(R) function call that is issued by another DAM portion 2202 may be received. The other DAM portion 2202 successfully located an atomic entry 2304 in its corresponding DAM table 2206, with the located atomic entry 2304 having a key that matches the session reference. The information from the returned atom 2204(R) function call includes values from key field 2304(K) and data field 2304(D) for the located atomic entry 2304. These values correspond to the session identifier of the session and the network address of the host 108 that is affinitized to the session.

At block 2412, an atomic entry is extracted. The atomic entry is extracted from the local DAM table if a match was found locally (at blocks 2404 and 2406) or from the returned atom if a match was found elsewhere (at blocks 2408 and 2410). For example, an atomic entry 2304 may be extracted from DAM table 2206 of the DAM portion 2202 or from information received by a return atom 2204(R) function call. The extracted atomic entry 2304 may be cached at the local DAM table 2206 if received as a result of the return atom 2204(R) function call.

At block 2414, the host having session affinity with the referenced session is ascertained from the atomic entry. For example, a value of the data field 2304(D) of the extracted atomic entry 2304 may be ascertained to thereby ascertain a network address of the affinitized host 108. At block 2416, the incoming connection request is routed to the ascertained host. For example, traffic routing functionality 2012 and/or forwarding functionality may route the incoming connection request having the session reference to the ascertained and affinitized host 108. Exemplary classifying, request routing, and forwarding functionalities are described in the following section.

Exemplary Classifying, Forwarding, and Request Routing

This section describes how traffic routing may be implemented for network load balancing, including with regard to high availability of such traffic routing functionality. Traffic routing functionality may include classifying and/or requesting routing functionality, especially in conjunction with forwarding functionality. This section primarily references FIGS. 25-31. It illuminates the functionality of a request router 306 (of FIG. 3), an interrelationship between tracking sessions and utilizing health and load information when routing traffic, operational implementations for traffic routing interactions with session information and/or health and load information, failover procedures for high availability of network load balancing infrastructure (including handling failures of classifying, forwarding, and/or request routing components), additional network load balancing infrastructure configurations, and so forth.

Figure 25:
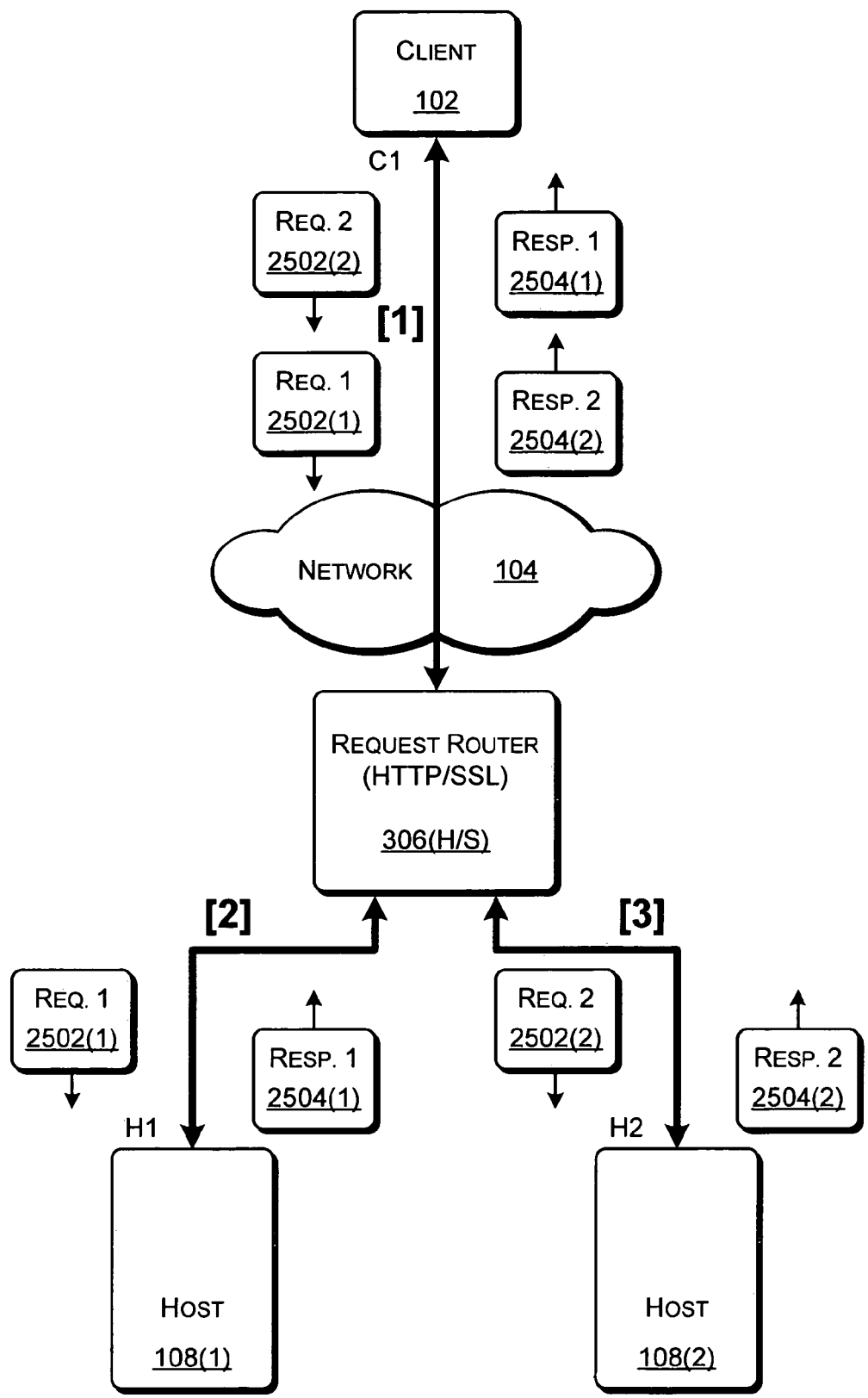
FIG. 25 illustrates exemplary network load balancing infrastructure having request routing functionality.

FIG. 25 illustrates exemplary network load balancing infrastructure having request routing functionality as realized by request router 306(H/S). As noted above with reference to traffic routing functionality 2012, traffic routing may relate to classifying (e.g., with forwarding) and/or requesting routing. Packet-level classifying, in conjunction with forwarding, is described above with particular reference to FIG. 4. Request routing is described here with particular reference to FIG. 25.

Request-level routing occurs at a higher level than that of packet-level routing. Generally, a request router 306 acts as a proxy for an application 316 running on a host 108. Request router 306 terminates TCP connections, parses (perhaps partially) each request from a client 102, and resubmits each request to host 108. Request router 306 may perform preprocessing on the connection, such as SSL decryption. Also, request router 306 may chose to absorb certain requests (e.g., the request router may maintain a cache of responses), and it may "arbitrarily" modify requests before forwarding them to hosts 108.

Request routers 306 are usually application-specific, and they may be rather open-ended in what they are capable of doing. By way of example only, a single class of request routers 306—HTTP/SSL request routers 306(H/S)—are addressed in the following description. As illustrated, a client 102 having a network address C1 is communicating across network 104 with hosts 108(1) and 108(2) having network addresses H1 and H2, respectively. The communications are effectuated via load balancing infrastructure that includes an HTTP/SSL request router 306(H/S).

HTTP/SSL request router 306(H/S) terminates HTTP and SSL traffic, decrypts SSL traffic, examines each HTTP request from client 102, applies application-specific rules to classify each request and to determine the "best" endpoint for that request while taking into account application endpoint health and load information, and submits the request to the endpoint. The request submission to the endpoint uses a separate TCP connection than that of the one originated by client 102 (the latter connection is terminated at HTTP/SSL request router 306(H/S)). These actions may be considered as logically equivalent to the actions performed by a classifier 304, but a difference arises in that these actions in HTTP/SSL request router 306(H/S) are occurring at the logical request level for each request within the TCP connection. HTTP/SSL request router 306(H/S), and request routers 306 generally, can use the same (i) application health and load and (ii) session tracking infrastructure that is used by classifiers 304.

HTTP/SSL request router 306(H/S) is acting as an intermediary between client 102 and two hosts 108(1) and 108(2). It is handling two requests from client 102 over a single TCP connection. In a described implementation, the resulting request routing involves a number of actions. First, client 102 establishes an http or https connection [1] to HTTP/SSL request router 306(H/S) and sends a request #1 2502(1).

Second, HTTP/SSL request router 306(H/S) terminates the SSL session (if the traffic is SSL encrypted), parses request #1 2502(1), and examines the content of request #1 2502(1). Taking into account application health and load as well as session information, HTTP/SSL request router 306(H/S) determines that host 108(1) is the "best" host for this particular request #1 2502(1) in this example.

Third, HTTP/SSL request router 306(H/S) establishes a secondary TCP connection [2] to host 108(1). It may alternatively use an existing connection [2] to host 108(1). HTTP/SSL request router 306(H/S) then sends an e.g. unencrypted version of request #1 2502(1) to host 108(1). Fourth, host 108(1) replies with a response #1 2504(1). Fifth, HTTP/SSL request router 306(H/S) encrypts this response #1 2504(1) and sends it back to client 102 on TCP connection [1].

Sixth, client 102 sends another request, request #2 2502(2). Request #2 2502(2) is handled similarly to the handling of request #1 2502(1), except that HTTP/SSL request router 306(H/S) selects host 108(2). The different selection may be because host 108(1) is now failing or more-heavily loaded, because request #2 2502(2) is directed to a different URL than request #1 2502(1), and so forth. Regardless, HTTP/SSL request router 306(H/S) establishes another secondary TCP connection, but this secondary TCP connection [3] is to host 108(2). Unencrypted request #2 2502(2) is routed to host 108(2), and a response #2 2504(2) is received therefrom as a result. An encrypted version of response #2 2504(2) is then sent to client 102 from HTTP/SSL request router 306(H/S).

Seventh, client 102 closes TCP connection [1] with HTTP/SSL request router 306(H/S). HTTP/SSL request router 306(H/S) (at some future time) closes connections [2] and [3] that it made to hosts 108(1) and 408(2), respectively, on behalf of client 102. TCP connection [2] may alternatively be closed after HTTP/SSL request router 306(H/S) decides to open/use TCP connection [3] for request #2 2502(2).

Because an HTTP/SSL request router 306(H/S) terminates the http/https connection, HTTP/SSL request router 306(H/S) can do more than route requests. For example, HTTP/SSL request router 306(H/S) can potentially maintain its own cache of responses (e.g., with an out-of-band mechanism to invalidate the cache). As noted in the above example, HTTP/SSL request router 306(H/S) can also potentially route different kinds of requests to different sets of hosts 108 based on e.g. the requested URL. Conversely, HTTP/SSL request router 306(H/S) can potentially aggregate requests from many short-lived client connections and send them over a few, long-standing TCP connections to hosts 108. Such connection aggregation can reduce the TCP connection processing overhead in hosts 108.

Request routers of other classes may correspond to other exemplary protocols besides HTTP. For example, a request router may be a SOAP request router. SOAP request routers function analogously to an HTTP/SSL request router 306(H/S). However, SOAP request routers specialize in routing SOAP traffic. SOAP request routers understand SOAP headers and make routing decisions based on the SOAP headers as well as application health and load.

Both packet-level classification and forwarding (or packet-level routing) and request-level routing can provide some form of layer-7 load balancing. Layer-7 load balancing is described further below in the section entitled "Exemplary Connection Migrating with Optional Tunneling and/or Application-Level Load Balancing". Packet-level routing provides read-only access to the initial portion of a client's TCP connection data, and request-level routing provides read and modify access to an entire data stream.

Packet-level routing typically has several advantages over request-level routing. These advantages include transparency (client packets are delivered to hosts as-is, preserving source and destination IP addresses and port numbers), low processing overhead (generally, forwarding traffic involves a route lookup), low latency (individual packets are forwarded, and packets are not queued once the TCP connection destination has been determined), and high-availability (generally, a failure in a forwarder does not terminate the TCP connection). Request-level routing, on the other hand, typically has the following advantages over packet-level routing: an ability to examine an entire data stream flowing to and from the client; and an ability to transform a data stream, and even to split the data stream among multiple hosts or aggregate data streams from multiple clients.

Figure 26:
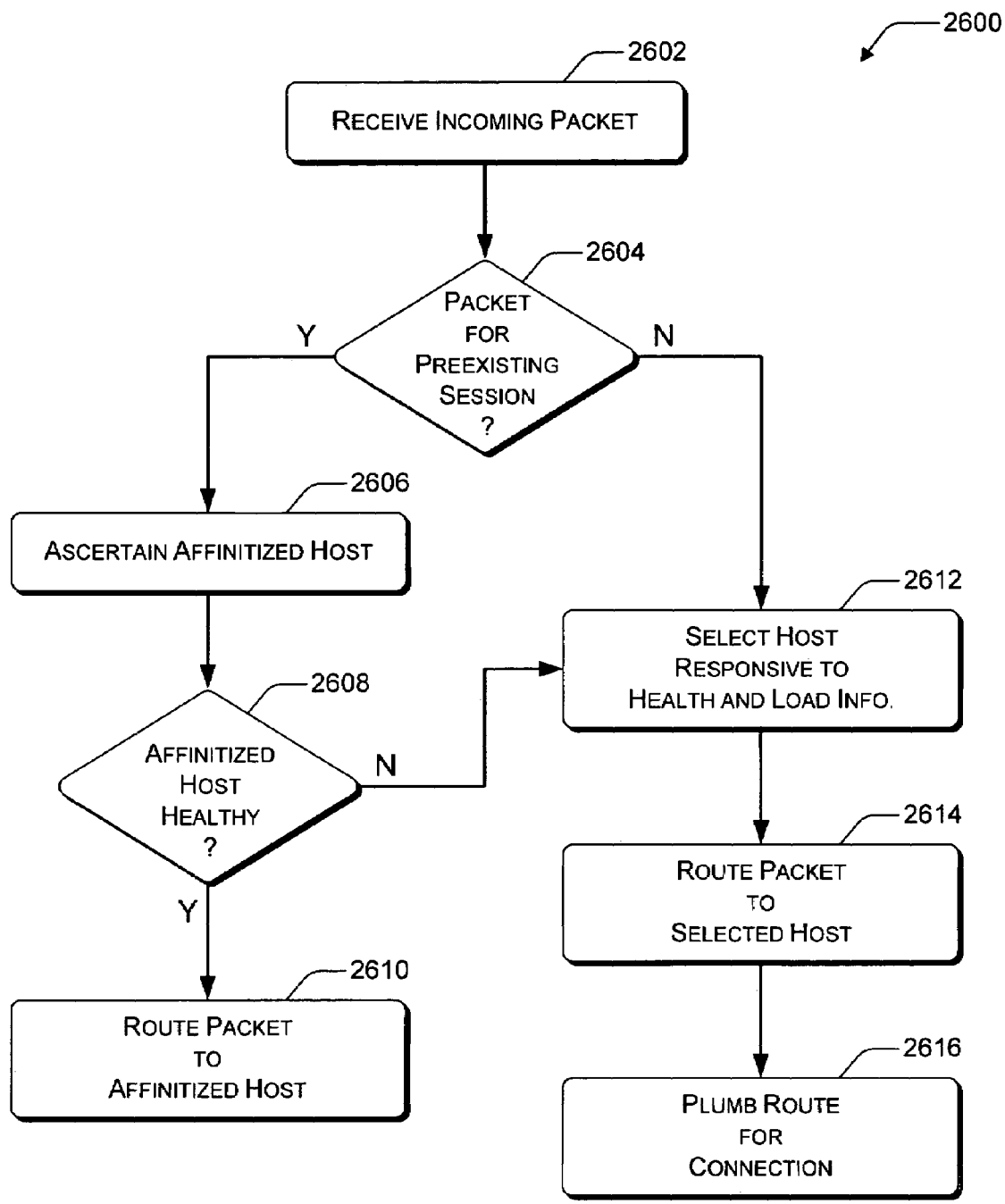
FIG. 26 is a flow diagram that illustrates an exemplary method for routing incoming packets with regard to (i) session information and (ii) health and load information.

FIG. 26 is a flow diagram 2600 that illustrates an exemplary method for routing incoming packets with regard to (i) session information and (ii) health and load information. Flow diagram 2600 includes eight blocks 2602-2616. Although the actions of flow diagram 2600 may be performed in other environments and with a variety of software schemes, FIGS. 1-3, 12, 18-20, 22, and 23B are used in particular to illustrate certain aspects and examples of the method.

At block 2602, an incoming packet is received. For example, a packet from a client 102 may be received at a forwarder 302 of a load balancing unit 106. At block 2604, it is determined if the received packet is for a preexisting session. For example, forwarder 302 may consult a local DAM table 2206( ) to determine that the received packet is already part of a TCP/IP session.

Additionally, forwarder 302 may consult the local DAM table 2206( ) and determine that the received packet is not already part of a TCP/IP session. In this case, forwarder 302 provides the received packet to a classifier 304, which checks for a higher level session affinity for the received packet if it has a session reference. Examples for these actions are described above with particular reference to FIG. 24 and further below with particular reference to FIGS. 27 and 28.

If the received packet is for a preexisting session (as determined at block 2604), then flow continues at block 2606. At block 2606, a host that is affinitized to the preexisting session is ascertained. For example, an affinitized host 108 may be ascertained from the local DAM 2206( ) and/or the overall distributed DAM 2206 by forwarder 302 or classifier 304.

At block 2608, it is determined if the affinitized host is healthy. For example, classifier 304 may consult a consolidated health and load cache 1208 to determine if the affinitized host 108 is healthy, especially for those received packets that are part of sessions that are of a higher logical level than TCP/IP sessions. The action(s) of this block may be accomplished in conjunction with a health and load handler 314.

If the affinitized host is healthy (as determined at block 2608), then flow continues at block 2610. At block 2610, the received packet is routed to the affinitzed host. For example, forwarder 302 (for TCP/IP sessions) or classifier 304 (for higher-level sessions) may route the packet to the affinitized host 108. In an alternative implementation, classifier 304 may return the received packet to forwarder 302 for routing to the affinitized host 108 even for received packets that are part of higher-level sessions.

If, on the other hand, the affinitized host is not healthy (as determined at block 2608), then flow continues at block 2612. Also, if on the other hand, the received packet is not for a preexisting session (as determined at block 2604), then flow continues at block 2612. At block 2612, a host is selected responsive to health and load information. For example, classifier 304 may select a host 108 from and/or using a health and load-related application allotment (e.g., from a target application endpoint allotment response 1804) that is attained from health and load handler 314. Examples for these action(s) are described-above with particular reference to FIGS. 19 and 18 and further below with particular reference to FIG. 30.

At block 2614, the received packet is routed to the selected host. For example, classifier 304 may route (optionally via forwarder 302) the packet to the selected host 108. At block 2616, a route for a connection path to the selected host is plumbed. For example, classifier 304 may add a session information entry to DAM table 2206, especially at the DAM table 2206( ) that is local to the forwarder 302 that provided the received packet to the classifier 304. This session information entry may be replicated in accordance with the instituted redundancy policy for a DAM 2202 (e.g., of a session tracker 308).

The action(s) of block 2614 and those of block 2616 may be performed in the order specifically illustrated, with those of block 2616 being performed prior to those of block 2614, with the actions partially or fully overlapping in any order, and so forth. It should be noted that the actions performed by classifier 304 as described above may alternatively be performed by a request router 306 (or more generally traffic routing functionality 2012).

Figure 27:
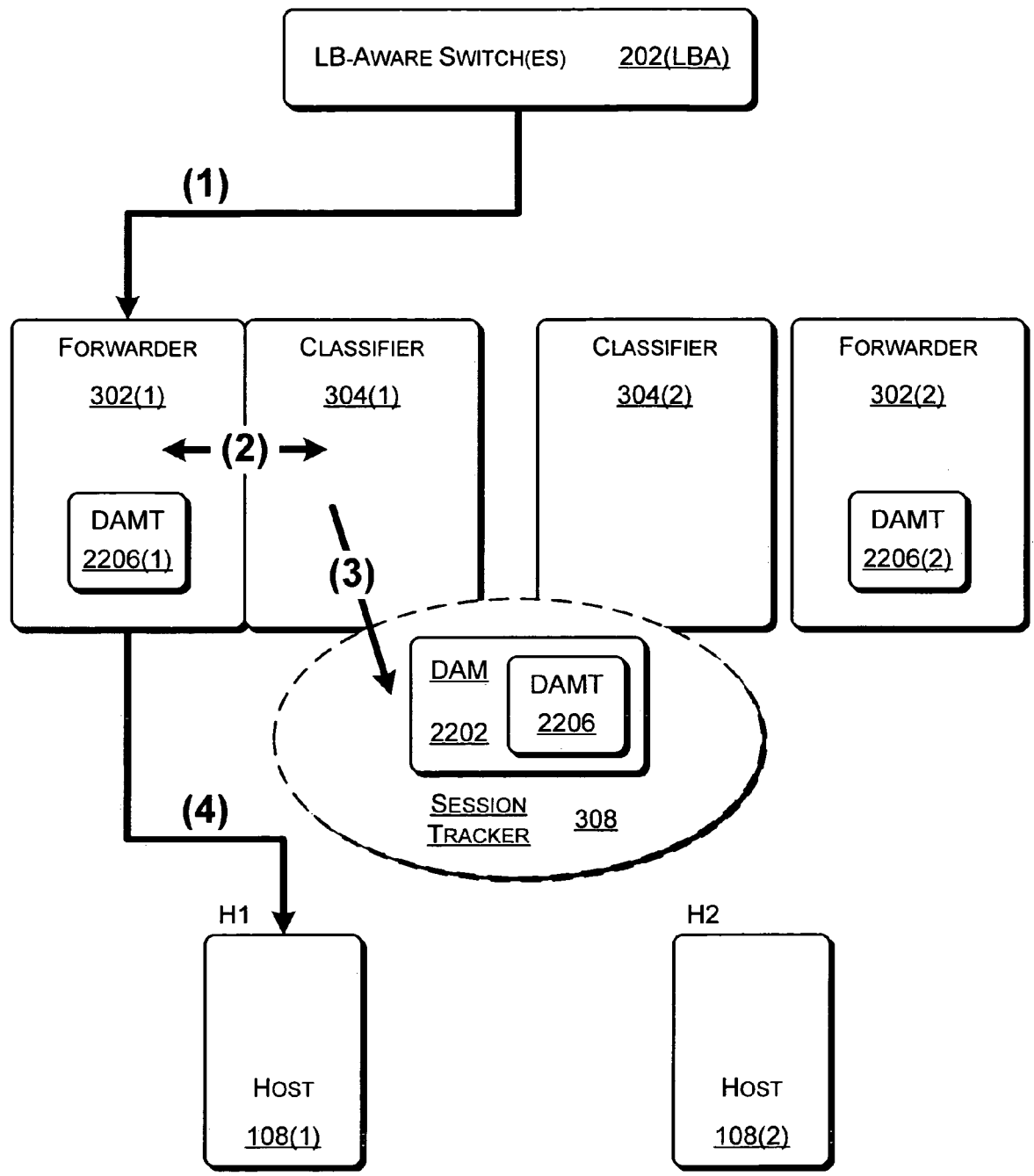
FIG. 27 illustrates an exemplary traffic routing flow in the absence of failures.

FIG. 27 illustrates an exemplary traffic routing flow in the absence of failures. As illustrated, one or more load-balancing-aware switches 202(LBA) front the remaining load balancing infrastructure 106 (not separately indicated). Forwarding and classifying functionality are distributed across three devices or nodes. A first device includes forwarder 302(1) and classifier 304(1). A second device includes classifier 304(2). A third device includes forwarder 302(2).

With classifier 304(2) executing on the second device and forwarder 302(2) executing on the third device, each device may be specially tuned for its respective functions. For example, the hardware, software, firmware, some combination thereof, etc. of the second device and the third device may be adapted to support the desired functionality without excessive over provisioning. Thus, the third device that includes forwarder 302(2) may be akin to a switch and/or router from a hardware capability perspective, and the second device that includes classifier 304(2) may be more akin to a server and/or personal computer from a hardware capability perspective.

Although shown as three devices that are providing functionality across four components, alternative logical and/or device-level configurations for forwarding and classifying functionality are applicable to the exemplary traffic routing flow that is described here for FIG. 27. Also, although the routing destinations are shown as hosts 108, the descriptions herein of routing implementations may alternatively be applied more generally to a next node destination for the packet and not necessarily a final node that consumes the packet.

A DAM 2202 realization of session tracker 308 is used to implement DAM table 2206. However, session affinity preservers 1904 in general are also applicable to the exemplary traffic routing flow of FIG. 27. Forwarder 302(1) includes DAM table portion 2206(1), and forwarder 302(2) includes DAM table portion 2206(2). Incoming packets are routed to host 108(1) or host 108(2).

In a described implementation, DAM 2202 is a distributed, in-memory table of "atoms" 2304 (e.g., keyword-value pairs, with optional metadata) having session information. DAM 2202 and DAM table 2206 is described further above with particular reference to FIGS. 22-24. Any node in the cluster of classifiers 304 may add, query, and delete atoms 2304. DAM 2202 maintains a highly available DAM table 2206 that includes active (e.g., TCP/IP level) routes as well as higher-level session information.

At (1), load-balancing-aware switches 202(LBA) direct an incoming packet to forwarder 302(1). At (2), forwarder 302 (1) consults its internal routing table, DAM table 2206(1). When forwarder 302(1) does not find an atomic entry 2304 for this packet, it forwards the packet to its assigned and/or associated classifier, classifier 304(1).

At (3), classifier 304(1) recognizes that the packet in this example is a TCP-SYN packet. Classifier 304(1) therefore treats the packet as a start of a new TCP connection from a client 108. Using health and load information from a health and load handler 314 (not explicitly illustrated), classifier 304(1) determines that host 108(1) should receive this TCP connection. Classifier 304(1) updates DAM table 2206(1) that serves as the local routing table for forwarder 302(1), and it also inserts an atomic entry 2304 representing the route into the overall DAM 2206. These may be separate operations, a single operation in which the TCP/IP-level sessions of DAM table 2206 are located at forwarders 302, and so forth. DAM 2202 internally replicates this route to one or more other members of the cluster of classifiers 304 in accordance with its stipulated redundancy policy.

At (4), forwarder 302(1) directly forwards subsequent packets for this connection to host 108(1) without interacting with classifier 304(1). DAM-2202 can be used to mask, at least in part, the failure of a forwarder 302, a classifier 304, or a forwarder/classifier pair 302/304. DAM 2202 can also be used, at least in part, to preserve client connectivity if load-balancing-aware switches 202(LBA) inadvertently start sending packets for an established connection to a different forwarder 302.

Figure 28:
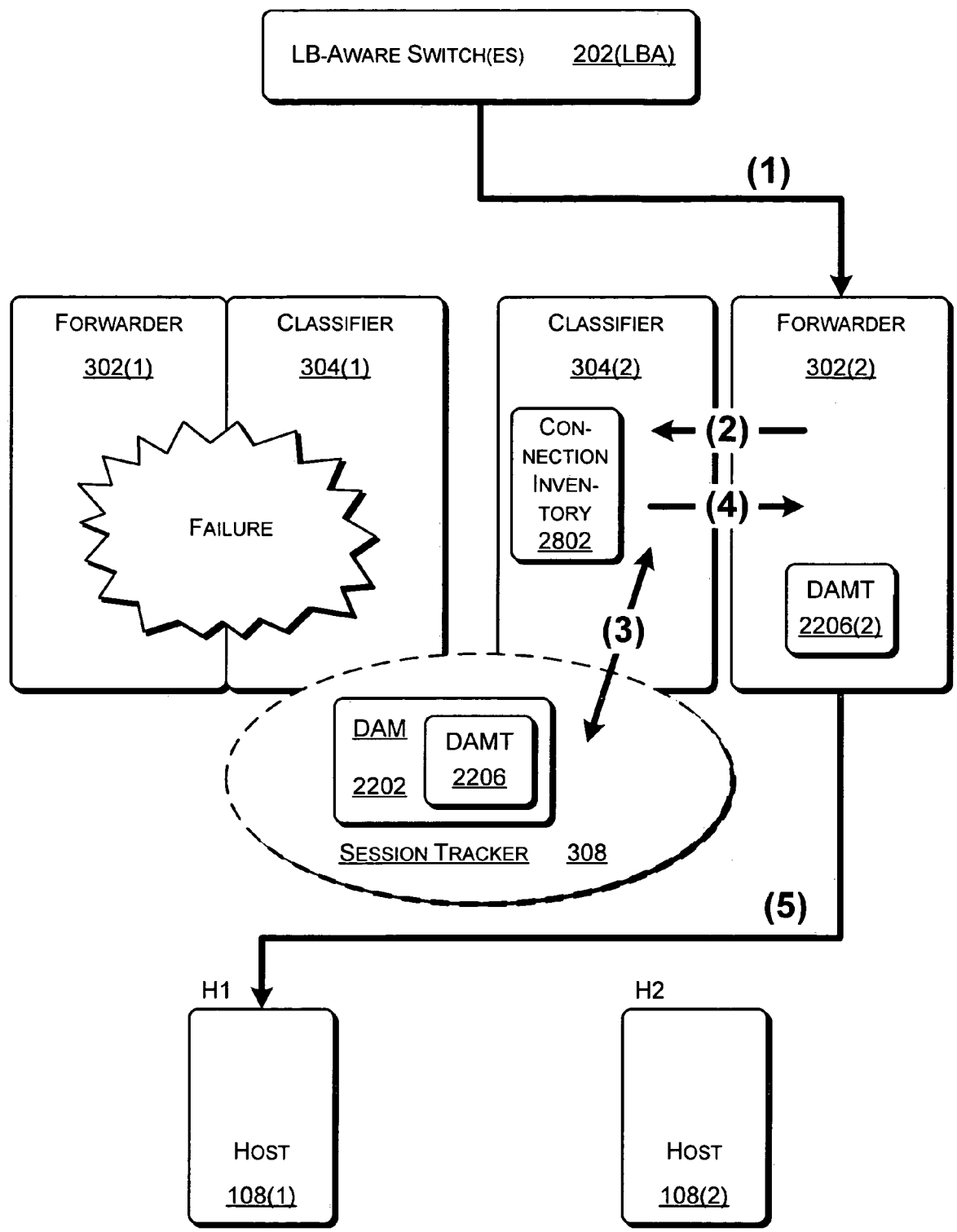
FIG. 28 illustrates an exemplary traffic routing flow in the presence of failure(s).

FIG. 28 illustrates an exemplary traffic routing flow in the presence of failure(s). In contrast to the "failure-free" exemplary traffic routing flow of FIG. 27, a failure has occurred in a portion of the network load balancing infrastructure 106 (not specifically identified) of FIG. 28. Specifically, the first device, on which forwarder 302(1) and classifier 304(1) are resident and executing, fails after the connection that is illustrated in FIG. 27 is established. This failure is masked, at least in part, by DAM 2202.

At (1), load-balancing-aware switches 202(LBA) detect the failure of forwarder 302(1) and start forwarding packets for the connection to some other forwarder 302 in the cluster. In this example, the other forwarder 302 is forwarder 302(2). Although FIG. 28 illustrates a failure situation, load-balancing-aware switches 202(LBA) may also send this traffic to forwarder 302(2) even if forwarder 302(1) is still available. This non-failure-induced change of forwarders 302 may occur, for example, because load-balancing-aware switches 202(LBA) "forget" the affinity of this traffic to forwarder 302(1). The actions of notations (2)-(5) apply to both the failure and the "forgotten affinity" situations.

At (2), forwarder 302(2) consults its routing table, DAM table 2206(2). When it does not find a route for this packet, it forwards the packet to its classifier 304(2). At (3), classifier 304(2) recognizes that this packet is a "mid-connection" TCP packet, and classifier 304(2) queries DAM 2202 for the route for this packet. DAM 2202 responds with the route for the connection from an atomic entry 2304 that is associated therewith.

At (4), classifier 304(2) plumbs the route in forwarder 302(2). An exemplary protocol for plumbing routes is described further below. At (5), subsequent packets for this connection that are directed to forwarder 302(2) are routed directly to the correct host, which is host 108(1) in this example, without consulting classifier 304(2).

Generally, a route plumbing protocol for communications between classifiers 304 and forwarders 302 includes instructions to add and remove routes. More specifically, an add route instruction is sent from a classifier 304 to a forwarder 302 in order to plumb a route from the forwarder 302 to a destination host 108 for a given connection. By way of example, an add route instruction can be provided to forwarder 302(2) from classifier 304(2) as indicated at (4) in FIG. 28. The route (e.g., a key and corresponding value) is added to local DAM table 2206(2) for quick access by forwarder 302(2) in the future. In this example, classifier 304(2) is a separate device from forwarder 302(2), so the route plumbing protocol may be an inter-device protocol. However, the route plumbing protocol may also be utilized for intra-device communications.

In a described implementation, classifier 304(2) includes a connection inventory 2802. With connection inventory 2802, classifier 304(2) keeps track of the connections of any forwarders 302 (such as forwarder 302(2)) for which classifier 304(2) plumbs routes. To enable classifier 304(2) to keep track of the connections, including cessations thereof, forwarder 302(2) forwards final packets for connections (such as a TCP FIN packet) to classifier 304(2). Classifier 304(2) then deletes an entry in connection inventory 2802 that corresponds to the connection and sends a delete route instruction to forwarder 302(2). Upon receiving the delete route instruction, forwarder 302(2) removes the corresponding route in DAM table 2206(2). In this manner, the classifying functionality in conjunction with session tracking functionality can control the route tables, and the routes thereof, that are used by the forwarding functionality. Consequently, forwarding functionality that is separated onto a different device may be effectuated using high-speed, but relatively simple, hardware.

Figure 29:
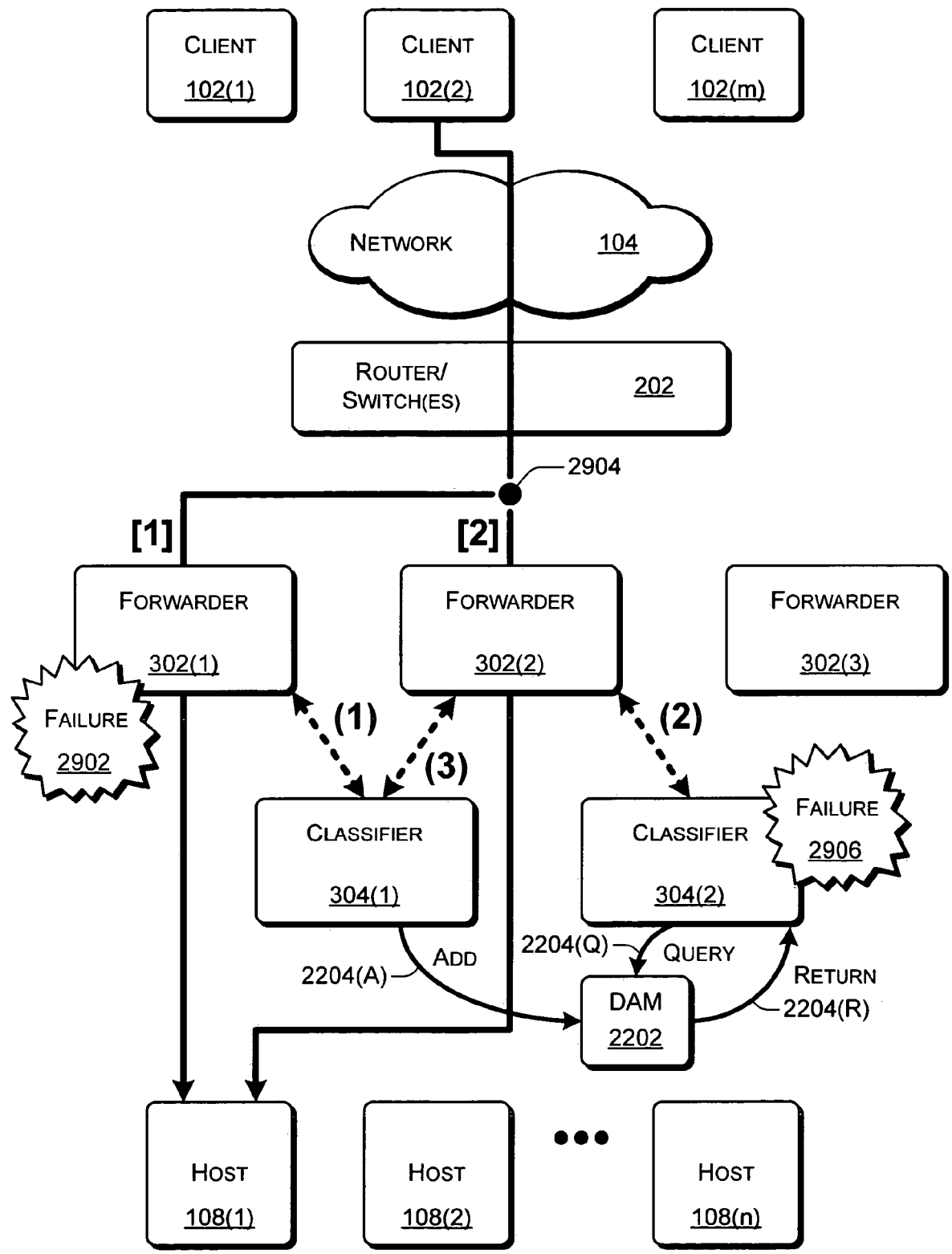
FIG. 29 illustrates additional exemplary failover procedures for high availability of network load balancing infrastructure.

FIG. 29 illustrates additional exemplary failover procedures for high availability of network load balancing infrastructure 106. Failover procedures for two different failures, failure 2902 and failure 2906, are described. As illustrated, network load balancing infrastructure 106 (not separately indicated) includes five components: forwarder 302(1), forwarder 302(2), forwarder 302(3), classifier 304(1), and classifier 304(2).

In a described implementation, each of these five components 302(1), 302(2), 302(3), 304(1), and 304(2) corresponds to an individual device. However, similar failover procedures apply to environments in which different load balancing components share devices.

Initially at [1], router/switch(es) 202 direct an incoming packet that happens to be for a new connection to forwarder 302(1). Because forwarder 302(1) does not have a route for this connection in its local routing table, it sends the packet to classifier 304(1) as indicated by the dashed double arrow at (1). Classifier 304(1) first checks session information with reference to session tracking 308 for a possible higher-level session affinity. In this example, the packet is not affinized to an existing session, so classifier 304(1) selects a host 108 with reference to health and load information with reference to health and load handling 314.

Specifically, classifier 304(1) selects host 108(1) in this example. Assuming the packet is for a TCP/IP connection, this TCP/IP session as linked to host 108(1) is added to DAM 2202 using an add atom 2204(A) function call by classifier 304(1). The initial packet is forwarded to host 108(1) by classifier 304(1) or forwarder 302(1). Classifier 304(1) also plumbs a route in the local routing table of forwarder 302(1). Subsequent packets are forwarded to host 108(1) by forwarder 302(1) without further interaction with classifier 304 (1).

At some time during connection [1], there is a failure 2902 at forwarder 302(1). With load-balancing-aware router/switch(es) 202(LBA), this failure 2902 is detected. As a result, at point 2904, router/switch(es) 202 direct later packets that would have been sent to forwarder 302(1) along connection [1] to another forwarder 302, which is forwarder 302(2) in this example.

Forwarder 302(2) thus receives future packets along a connection [2]. Because forwarder 302(2) does not have an entry in its local routing table for the packets that were formerly directed to forwarder 302(1), forwarder 302(2) sends the first received packet of connection [2] to the classifier to which it is assigned/associated. In this example, forwarder 302(2) is assigned to classifier 304(2) as indicated by the dashed double arrow at (2).

Classifier 304(2) uses a query atom 2204(Q) function call to attain the atomic entry 2304 (not explicitly shown) from DAM 2202 that is associated with the existing TCP/IP connection. This atomic entry 2304 is provided through DAM 2202 of session tracking 308 via a return atom 2204(R) function call. Classifier 304(2) extracts the host 108(1) that is affinitized with this TCP/IP connection from the returned atomic entry 2304. Classifier 304(2) forwards the first received packet for connection [2] to host 108(1) and also plumbs a route in the local routing table of forwarder 302(2). Subsequent packets are forwarded to host 108(1) by forwarder 302(2) without further interaction with classifier 304 (2).

The above descriptions focus predominantly on failures of individual forwarder 302 components. However, classifier 304 components can also fail. For example, at some point, there is a failure 2906 at classifier 304(2). Forwarder 302(2) detects failure 2906 when it attempts to consume classification services or through noticing a lack of some aliveness indication such as a heartbeat-type indicator. To handle failure 2906, forwarder 302(2) is reassigned or re-associated with a different classifier 304, which is classifier 304(1) in this example. Future classification functionality is provided to forwarder 302(2) by classifier 304(1) as indicated by the dashed double arrow at (3).

Figure 30:
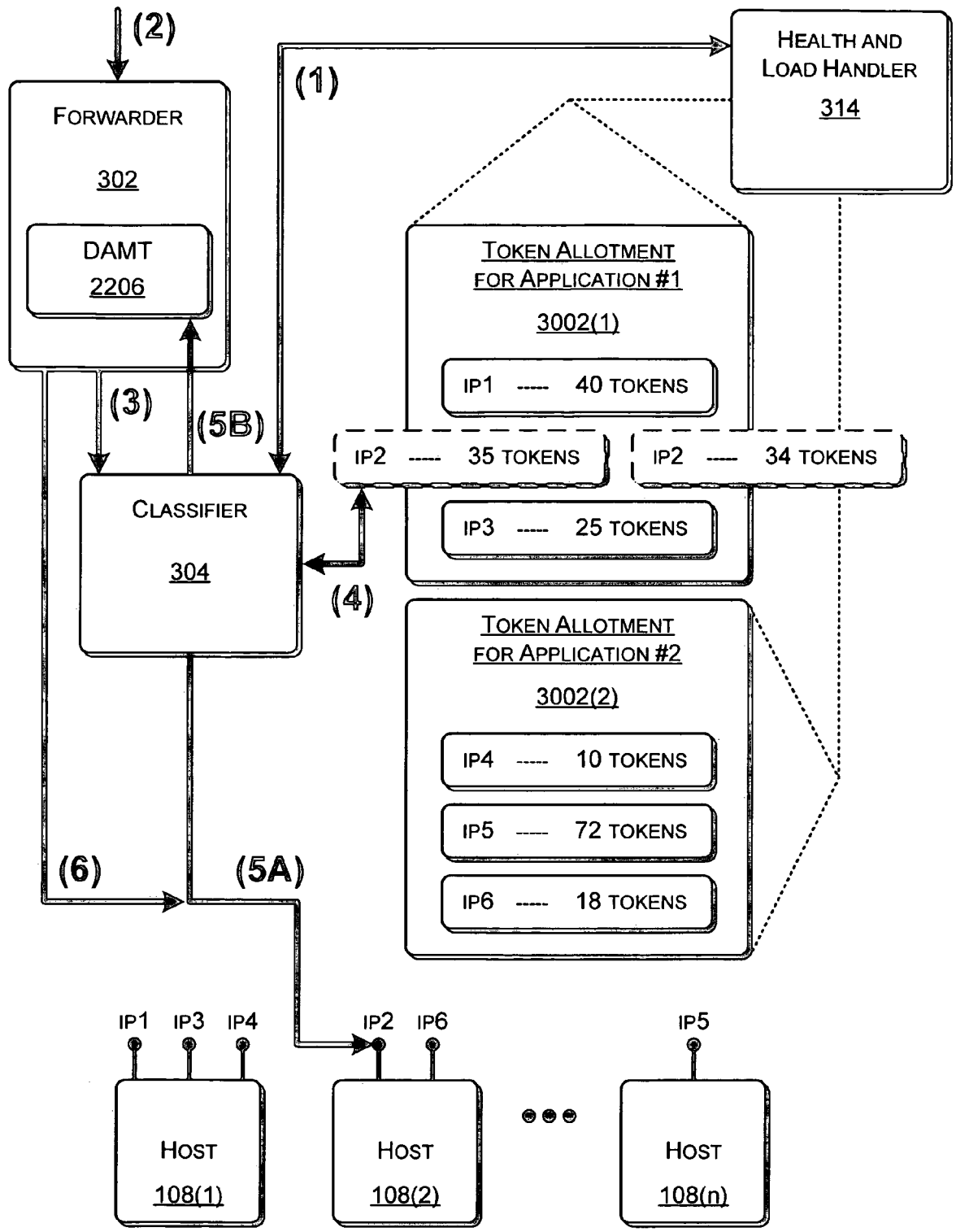
FIG. 30 illustrates an exemplary operational implementation of traffic routing interaction with health and load information.

FIG. 30 illustrates an exemplary operational implementation of traffic routing interaction with health and load information. Forwarder 302 and classifier 304 interact with health and load handler 314 in order to route packets to hosts 108(1), 108(2) ... 108(*n*). Although a forwarder 302 and a classifier 304 are illustrated, the exemplary operational implementation is also applicable to a request router 306 (or traffic routing functionality 2012 in general).

As illustrated, host 108(1) includes application endpoints IP1, IP3, and IP4 for application #1, application #1, and application #2, respectively. Host 108(2) includes application endpoints IP2 and IP6 for application #1 and application #2, respectively. Host 108(*n*) includes application endpoint IP5 for application #2. These hosts 108(1), 108(2) ... 108(*n*) and application endpoints IP1, IP2, IP3, IP4, IP5, and IP6 are monitored by health and load handler 314 (e.g., using health and load infrastructure 1202, consolidated health and load cache 1208, etc.).

In a described implementation, at (1) classifier 304 requests one or more application endpoint allotments (e.g., via at least one target application endpoint allotment request 1802) in an environment using a token allotment scheme 1806. Health and load handler 314, in this example, responds by providing token allotments 3002 (e.g., via at least one target application endpoint allotment response 1804).

Specifically, a token allotment for application #1 3002(1) and a token allotment for application #2 3002(2) are available to classifier 304. Token allotment for application #1 3002(1) initially provides 40 tokens for IP1, 35 tokens for IP2, and 25 tokens for IP3. Token allotment for application #2 3002(2) provides 10 tokens for IP4, 72 tokens for IP5, and 18 tokens for IP6. For each new connection that is allocated a routing to an application endpoint by classifier 304, a token is consumed by classifier 304.

At (2), forwarder 302 receives an initial incoming packet for a new connection. Because no routing for this new connection is present in local DAM table portion 2206 of forwarder 302, forwarder 302 forwards the initial packet to classifier 304 at (3).

At (4), classifier 304 (e.g., after determining that the initial packet does not include a session reference for a higher-level session) selects an application endpoint (and thus a host 108) responsive to health and load information. Specifically, for a new connection that is to be served by application #1, classifier 304 can select any of IP1, IP2, and IP3 if a token for the respective endpoint still exists.

Classifier 304 can consume tokens in any of many possible manners. For example, classifier 304 may use a round-robin approach regardless of the number of tokens per endpoint. Alternatively, classifier 304 may simply start from IP1 and progress through IP3 while consuming all tokens for each endpoint before moving to the next endpoint in a linear approach. Also, classifier 304 may consume a token from the endpoint-defined-set of tokens that currently has the greatest number of tokens at any one moment. Using the latter approach, classifier 304 selects IP1. Other approaches may also be employed.

As illustrated, classifier 304 consumes a token for application endpoint IP2. Consequently, the token set for IP2 is reduced from 35 tokens to 34 tokens as a token is consumed. Also, the initial packet for the new connection is to be routed to application endpoint IP2.

At (5A), the initial packet is forwarded from classifier 304 to application endpoint IP2 of host 108(2). Before, during, or after this forwarding, classifier 304 at (5B) plumbs a route for this connection in local DAM table portion 2206. Classifier 304 may also add an atomic entry 304 for this session into DAM table 2206 for distribution and replication purposes. At (6), future packets for this connection/session are forwarded from forwarder 302 to application endpoint IP2 of host 108(2) using the local routing table of forwarder 302 as realized by local DAM table portion 2206 in FIG. 30.

Figure 31:
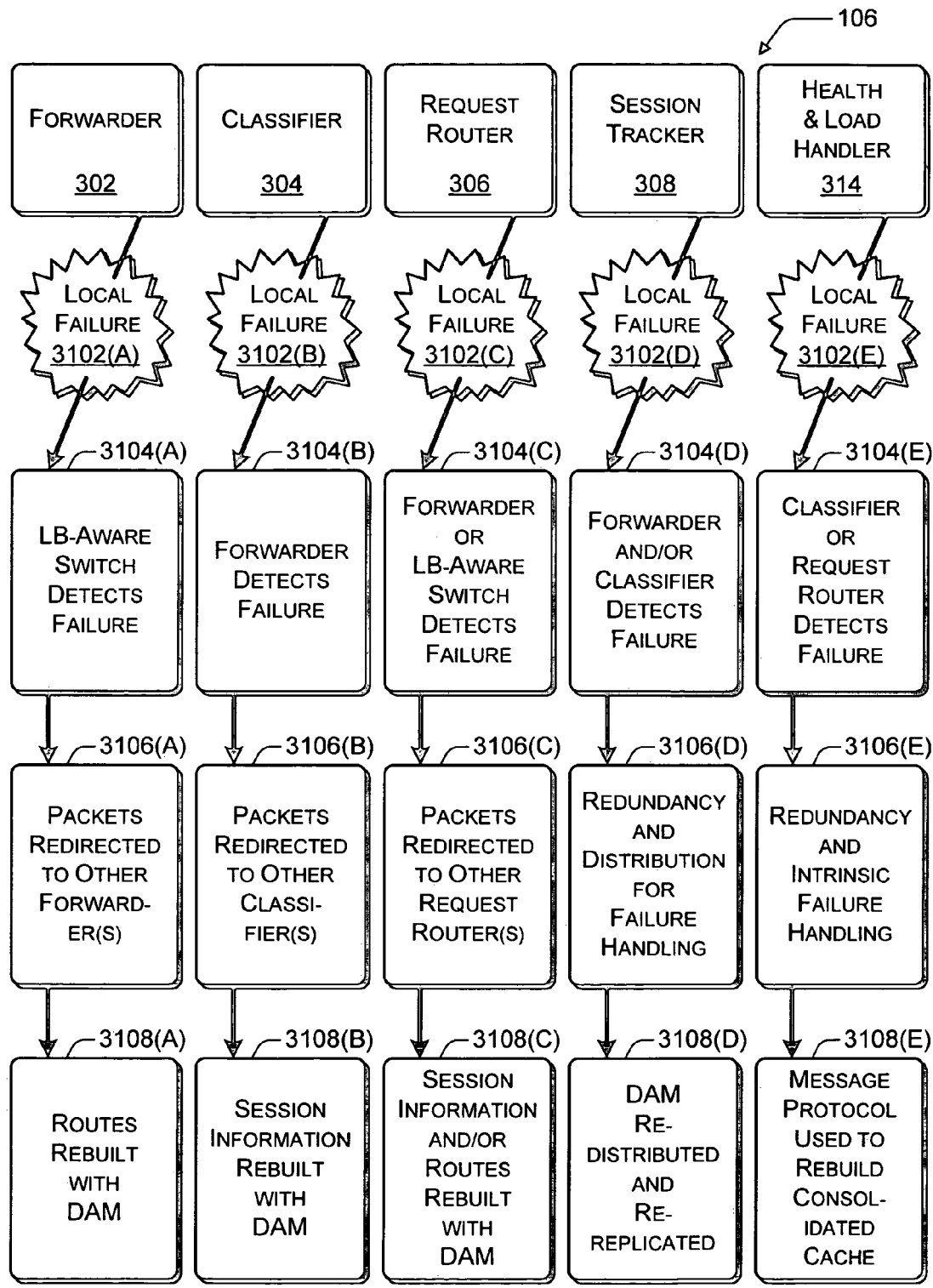
FIG. 31 illustrates exemplary high availability mechanisms for network load balancing infrastructure.

FIG. 31 illustrates exemplary high availability mechanisms for network load balancing infrastructure 106. Specifically, exemplary failure detection 3104, exemplary failure handling 3106, and exemplary failure recovery 3108 are shown. These exemplary high availability mechanisms are described with regard to different network load balancing infrastructure 106 components. The network load balancing infrastructure 106 components include a forwarder 302, a classifier 304, a request router 306, a session tracker 308, and a health and load handler 314.

At 3102(A), forwarder 302 undergoes a local failure. At 3104(A), at least one load-balancing-aware switch detects the failure. To handle local failure 3102(A), packets are redirected to other forwarder(s) at 3106(A) by the load-balancing-aware switch. To recover from the failure of forwarder 302, routes that were stored locally at forwarder 302 are rebuilt at 3108(A) at the forwarder(s) to which packets are redirected using a distributed session tracking manager and a table thereof such as a DAM and a DAM table thereof. The distributed session tracking manager may therefore include data redundancies of one or more levels.

At 3102(B), classifier 304 undergoes a local failure. At 3104(B), at least one forwarder detects the failure. To handle local failure 3102(B), packets are redirected to other classifier(s) at 3106(B) by the forwarder detecting the failure. To recover from the failure of classifier 304, session information that was stored locally at classifier 304 are rebuilt at 3108(B) at the classifier(s) to which packets are redirected using DAM. This session information may be, for example, session information of a higher level than baseline TCP/IP connections. Also, such session information may be considered as part of session tracking infrastructure that is resident on the same device as classifier 304.

At 3102(C), request router 306 undergoes a local failure. At 3104(C), at least one forwarder and/or load-balancing-aware switch detect the failure. To handle local failure 3102(C), packets are redirected to other request router(s) at 3106(C) by the forwarder and/or load-balancing-aware switch. Individual current logical requests on which request router 306 is working upon the occurrence of local failure 3102(C) may be lost unless each such individual logical request is replicated while the request is being serviced. To recover from the failure of request router 306, session information and/or routes that were stored locally at request router 306 are rebuilt at 3108(C) at the request router(s) to which packets (and thus new logical requests) are redirected. The session information rebuilding may be effectuated using DAM. Again, such session information may be considered as part of session tracking infrastructure that is resident on the same device as request router 306.

At 3102(D), session tracker 308 undergoes a local failure. At 3104(D), at least one forwarder and/or classifier detect the failure. For example, if session tracker 308 is resident on a same device as a classifier, then a forwarder or another classifier may detect the failure. If session tracker 308 is resident on a separate device, then a classifier may detect the failure. To handle local failure 3102(D), data redundancy of one or more levels and distribution across multiple devices are instituted at 3106(D) for the tracked session information. It should be noted that the redundancy and distribution are instituted prior to failure 3102(D). To recover from the failure of session tracker 308, session information from the tables of the DAM may be redistributed and re-replicated at 3108(D) across at least two devices (if not already so distributed and sufficiently replicated) in order to handle a second level of failure.

At 3102(E), health and load handler 314 undergoes a local failure. At 3104(E), at least one classifier and/or request router detect the failure. For example, a component that is receiving health and load information from health and load handler 314 may detect a failure if health and load handler 314 becomes non-responsive, especially if health and load handler 314 is resident on a different device from that of the inquiring component. To handle local failure 3102(E), cached health and load data redundancy and intrinsic failure handling are employed at 3106(E) for the health and load information.

For example, each health and load handler 314 can include a consolidated health and load information cache 1208 that duplicates information in health and load tables 1204 on multiple hosts 108. Also, consumers of the health and load information 1206 of a given health and load handler 314 may be located on a same device as health and load handler 314 so that failure of health and load handler 314 is intrinsically acceptable. Similarly, the authoritative version of a respective portion of health and load information 1206 is located on a respective host 108 so that failure of the host 108 renders the loss of the respective portion of the health and load information acceptable.

To recover from the failure of health and load handler 314, a given network load balancing component that consumes health and load information may query a different health and load handler because each such health and load handler includes a consolidated cache of health and load handler information. Also, when health and load handler 314 is again accessible, message protocol 1500 may be used at 3108(E) to rebuild its consolidated cache of health and load information. Using these exemplary high availability mechanisms, failures of network load balancing infrastructure 106 components can be detected, handled, and recovered from in order to mask such failures from clients 102.

Exemplary Connection Migrating with Optional Tunneling and/or Application-Level Load Balancing This section describes how connection manipulation, such as connection migration, may be utilized in network load balancing. This section primarily references FIGS. 32-39 and illuminates connection migrating functionality such as that provided by connection migrator 310 (of FIG. 3). As described above with reference to FIGS. 3 and 4, each incoming connection at load balancing infrastructure 106 may be terminated thereat. Afterwards, the connection may be migrated to a host 108 such that the connection is then terminated at the host 108. Connection migrator 310 is capable of performing this connection migration and may be located partially at hosts 108 to effectuate the migration. Such connection migration may be performed in conjunction with application-level load balancing by a classifier 304 and/or using tunneling via tunneler 312.

Figure 32:
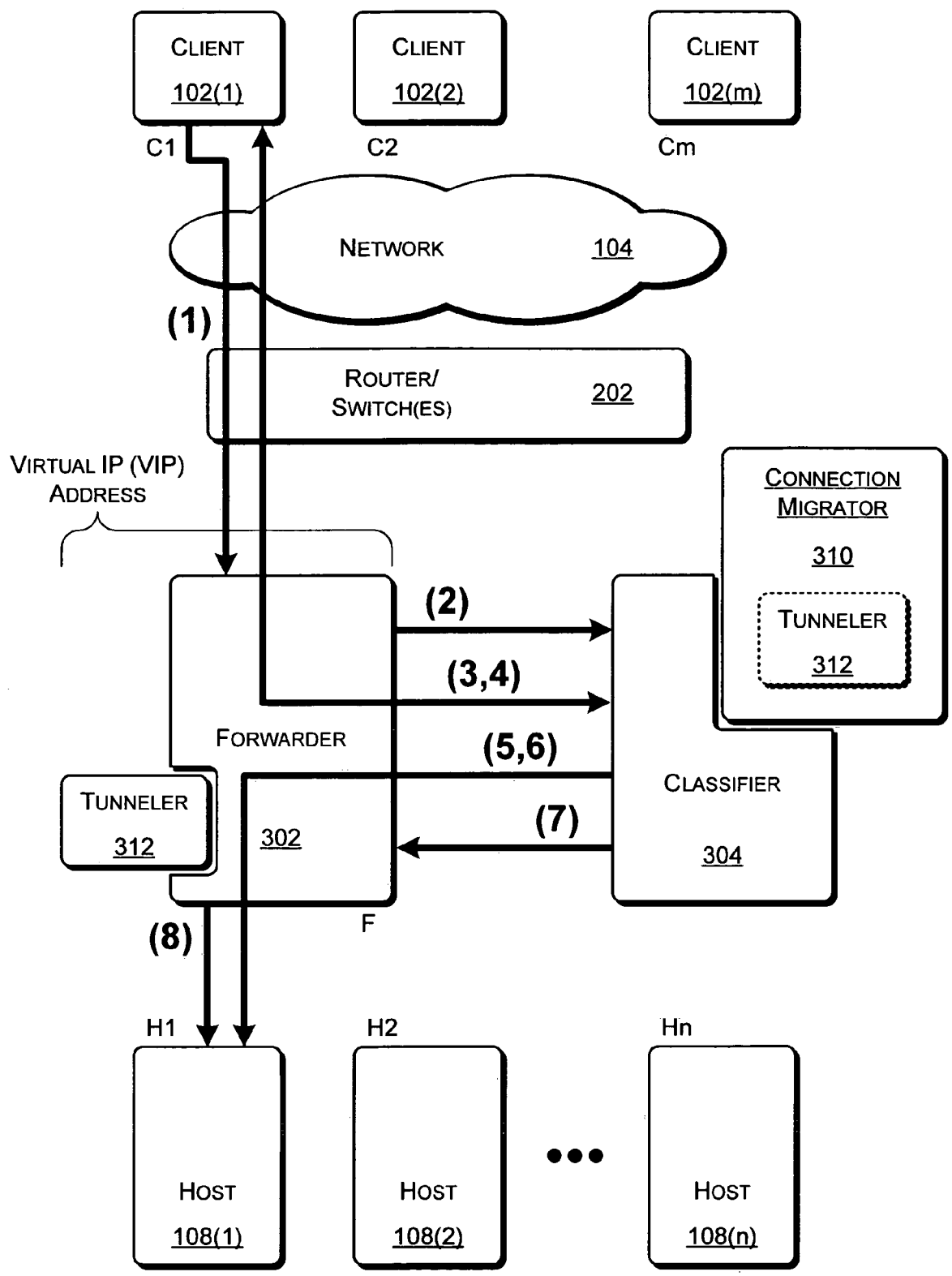
FIG. 32 illustrates an exemplary approach to application-level network load balancing with connection migration.

FIG. 32 illustrates an exemplary approach to application-level network load balancing with connection migration. Application-level, or layer-7, load balancing pertains to making load balancing decisions with regard to an application that is to handle a connection. To perform application-level load balancing, load balancing infrastructure 106 usually takes into consideration a data portion of a connection. Unless request routing is employed, a classifier 304 typically takes a peek at the initial portion of a connection and then migrates the connection, in conjunction with connection migrator 310, to a selected host 108.

For application-level load balancing in a TCP-based environment generally, classifiers 304 peek at the initial portion of a client's TCP data when deciding where to forward the client's TCP connection. Thus, application-level logic examines the client's data and makes load balancing decisions based on that data. For example, if a connection is an (unencrypted) HTTP connection, a classifier 304 can take a peek at the HTTP header of the first HTTP request in the connection, and it can make routing decisions based on some portion of the content of the header (e.g., the URL, a cookie, etc.). Although application-level load balancing, connection migration, and tunneling are applicable to other protocols, TCP/IP is used predominantly in the examples herein.

As illustrated, load balancing infrastructure 106 (not specifically indicated) includes a forwarder 302, a classifier 304, a tunneler 312, and a connection migrator 310 (and possibly e.g. load-balancing-aware router/switches 202(LBA)). Forwarder 302 corresponds to the virtual IP address and forwards packets to hosts 108 in accordance with host selections by classifier 304. Although not specifically shown in FIG. 32 for clarity, hosts 108 also include connection migrator 310 functionality and tunneler 312 functionality.

In a described implementation, forwarder 302, classifier 304, and connection migrator 310 (at classifier 304 and on hosts 108), along with TCP protocol software on classifier 304 and hosts 108, cooperate to provide connection migration. The connection migration illustrated in FIG. 32 is for a connection from client 102(1) that is initially terminated at classifier 304. After connection migration, the connection from client 102(1) is terminated at host 108(1). Once the connection is terminated at host 108(1), packets for the connection may be tunneled using tunneler 312 (at forwarder 302 and host 108(1)).

At (1), client 102(1) sends a SYN packet to forwarder 302 to signal the start of a new TCP connection. At (2), forwarder 302 forwards this packet to classifier 304. At (3), classifier 304 accepts the TCP connection on behalf of a host 108 (whose identity is not yet known because the actual target host 108( ) has yet to be selected). In TCP protocol terms, classifier 304 sends a SYN-ACK packet to client 102(1).

At (4), client 102(1) begins sending data. (The initial SYN packet may also contain data.) The data is processed by classifier 304, which can consult application-specific logic. The application-specific logic can relate to which host 108 is capable of handling or best handling which types of requests or connections. Hence, classifier 304 uses the data, as well as application health and load information from health and load handler 314 and optionally application session information from session tracker 308, to determine a host 108 that is better or best suited to handle this connection from client 102(1). In this example, host 108(1) is selected.

At (5), classifier 304 sends a "binary blob" that represents the state of the TCP connection to host 108(1). This connection state is aggregated with cooperation from a TCP stack on classifier 304 by connection migrator 310. The binary blob contains data from client 102(1) that has been acknowledged by classifier 304 and TCP parameters such as the TCP/IP 4-tuple, initial sequence numbers, and so forth.

At (6), a connection migrator 310 component on host 108(1) (not explicitly shown in FIG. 32) "injects" this connection state into a TCP stack on host 108(1). This connection state injection is performed in cooperation with the TCP stack on host 108(1), making it appear to applications 316 on host 108(1) that this connection was originally accepted by host 108(1) itself. Client 102(1) is unaware of the connection migration.

At (7), classifier 304, in cooperation with the TCP stack on classifier 304, silently cleans up the internal state maintained for this connection. Classifier 304 also adds a route in a local routing table of forwarder 302 that indicates host 108(1) as the destination for packets of this connection.

At (8), subsequent packets for the connection are routed by forwarder 302 to host 108(1). These packets may be treated the same by forwarder 302 as those packets for connections that are classified and routed without using connection migration. These subsequent packets may optionally be tunneled from forwarder 302 to host 108(1) using tunneler 312. Tunneler 312 is also illustrated (using dashed lines) at connection migrator 310 at classifier 304 because certain parameter(s) used by tunneler 312 may be determined during a connection migration and/or associated with a connection being migrated. Exemplary implementations for tunneler 312 are described further below with particular reference to FIGS. 38 and 39.

Figure 33:
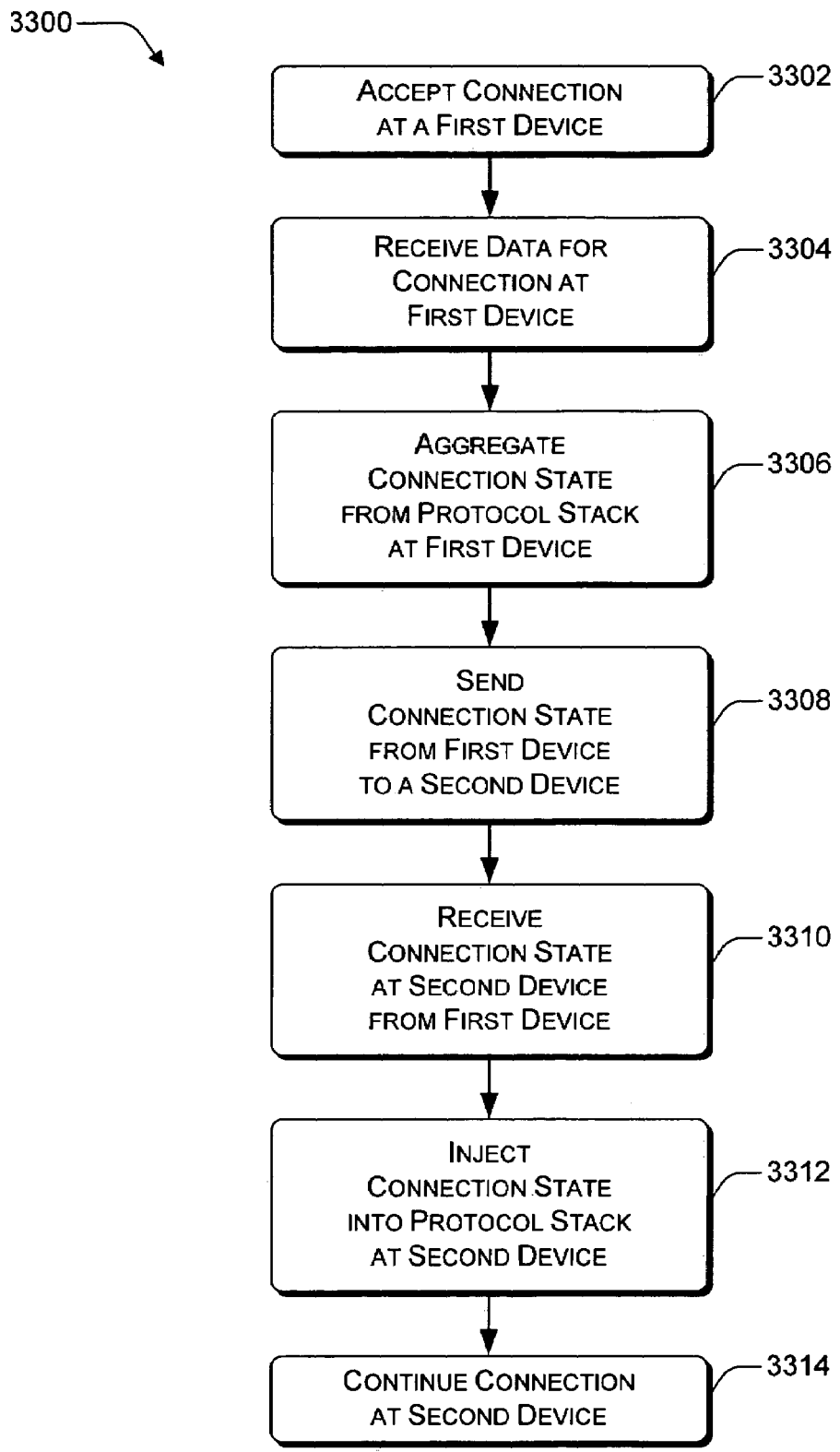
FIG. 33 is a flow diagram that illustrates an exemplary method for migrating a connection from a first device to a second device.

FIG. 33 is a flow diagram 3300 that illustrates an exemplary method for migrating a connection from a first device to a second device. Flow diagram 3300 includes seven blocks 3302-3314. Although FIGS. 32 and 34-37 focus primarily on connection migration in a network load balancing environment, connection migration as described herein may be effectuated between two devices in general that each include connection migration functionality, such as that of connection migrator 310.

At block 3302, a connection is accepted at a first device. For example, a first device may terminate an incoming connection in accordance with one or more protocols of a protocol stack portion of a network stack. At block 3304, data is received for the connection at the first device. For example, this data may be received in an initial packet that requests the connection or in one or more packets that are received subsequent to an acceptance of the connection.

At block 3306, a connection state for the accepted connection is aggregated from a protocol stack (or more generally from a network stack) at the first device. For example, a protocol state of the one or more protocols of the protocol stack may be compiled and aggregated with any received data that has been acknowledged. At block 3308, the connection state is sent from the first device to a second device. For example, the aggregated information of the connection state may be sent using a reliable protocol to a second device.

At block 3310, the connection state for the connection being migrated is received from the first device at the second device. At block 3312, the connection state is injected into a protocol stack (or more generally into the network stack) of the second device. For example, the connection may be rehydrated using the protocols of the protocol stack of the second device such that programs above the protocol stack level are unaware that the connection is a migrated connection. More specifically, the protocol state may be infused into the protocol stack. The aggregated data of the connection state is also incorporated at the second device. At block 3314, the connection is continued at the second device. For example, the connection may be continued at the second device as if the connection was not previously terminated elsewhere.

Figure 34:
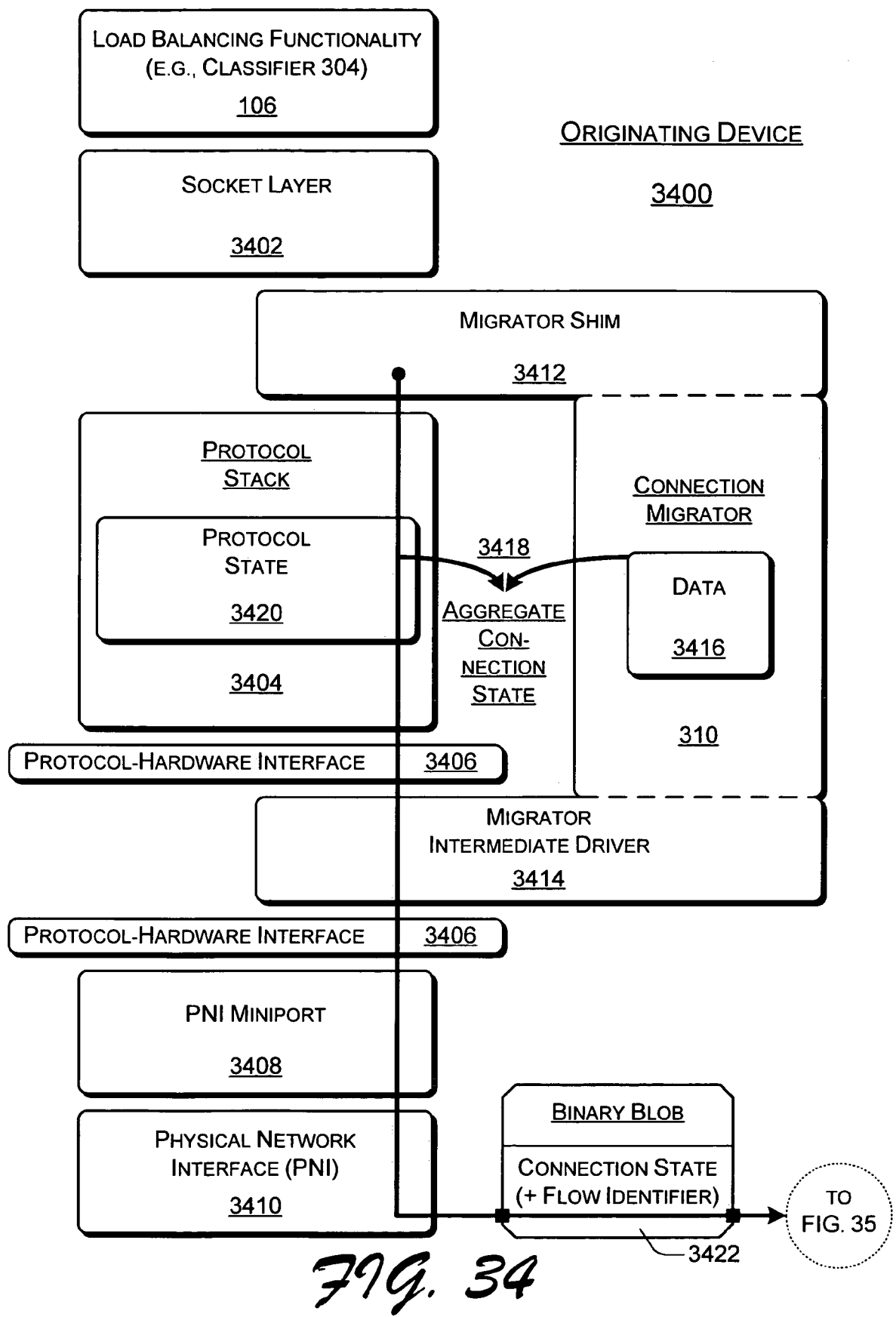
FIG. 34 illustrates an exemplary approach to connection migration from the perspective of an originating device.

FIG. 34 illustrates an exemplary approach to connection migration from the perspective of an originating device 3400. Connection migration in originating device 3400 is effectuated, at least partly, by connection migrator 310. In a described implementation, originating device 3400 is a device that is part of network load balancing infrastructure 106. For example, originating device 3400 may comprise a classifier 304, possibly along with a forwarder 302, a request router 306, and so forth.

As illustrated, originating device 3400 includes as parts of its network stack a physical network interface (PNI) 3410, a PNI miniport 3408, a protocol-hardware interface 3406, a protocol stack 3404, and a socket layer 3402. Originating device 3400 also includes load balancing functionality 106, such as a classifier 304 at an application level and connection migrator 310. Specifically, connection migrator 310 includes a migrator intermediate driver 3414 and a migrator shim 3412. Connection migrator 310 is capable of offloading a connection from originating device 3400.

In a described implementation, physical network interface 3410 may be a network interface card (NIC) (e.g., an Ethernet NIC), a wireless interface, and so forth. Although only one physical network interface 3410 is shown, a given device may actually have multiple such physical network interfaces 3410 (i.e., originating device 3400 may be multi-homed). Each physical network interface 3410 typically corresponds to one or more physical network addresses.

PNI miniport 3408 is a software module that understands and interfaces with the specific hardware realization of physical network interface 3410. Protocol-hardware interface 3406 is a layer that includes one or more respective interfaces between one or more respective protocols and PNI miniport 3408.

Protocol stack 3404 includes one or more respective modules that are each directed to one or more respective protocols. Examples of such protocols are described further below with reference to FIGS. 36 and 37. In a transient context, protocol stack 3404 includes a protocol state 3420 for each connection existing at originating device 3400. A socket layer 3402 lies between a program such as load balancing functionality 106 and protocol stack 3404. Socket layer 3402 provides APIs between load balancing functionality 106 and protocol stack 3404, and it enables programs to register for connections, among other things.

Migrator intermediate driver 3414, or more generally migrator driver 3414, is located at protocol-hardware interface layer 3406. Migrator shim 3412 is located transparently between protocol stack 3404 and socket layer 3402.

When an initial packet (not shown) requesting a new connection is presented to originating device 3400, the packet is directed upward from physical network interface 3410, to PNI miniport 3408, through protocol-hardware interface layer 3406, and to protocol stack 3404. As the packet traverses the one or more protocols of protocol stack 3404, protocol state 3420 is created thereat. Also, as a result of this initial packet or as a consequence of load balancing functionality 106 accepting the connection to take a peek at the request, data 3416 arrives at originating device 3400.

In operation, migrator intermediate driver 3414 diverts a copy of data 3416 to the logic of connection migrator 310. When load balancing functionality 106 issues a migrate connection function call, the migrate function call is passed to a topmost layer of protocol stack 3404 so that connection state aggregation 3418 may commence. Protocol state 3420 is compiled from the one or more protocols of protocol stack 3404. In a TCP/IP implementation, protocol state 3420 may include (i) destination and source TCP ports and IP addresses (e.g., a TCP/IP 4-tuple), (ii) TCP window state, (iii) initial sequence numbers, (iv) timeout information, (v) IP fragment ID, (vi) routing information, and (vii) so forth.

Connection state aggregation 3418 also aggregates data 3416 that has been diverted to connection migrator 310 and that has already been acknowledged from originating device 3400 (e.g., by load balancing functionality 106). This aggregated connection state 3418 includes protocol state 3420 and data 3416 (and optionally other connection-related information). Aggregated connection state 3418 is then sent as a binary blob 3422 away from originating device 3400 toward a targeted device using a reliable protocol. This binary blob 3422 may also be bundled with a flow identifier if the connection is to be tunneled subsequently with tunneler 312. Flow identifiers with tunneling are described further below with particular reference to FIGS. 38 and 39.

Figure 35:
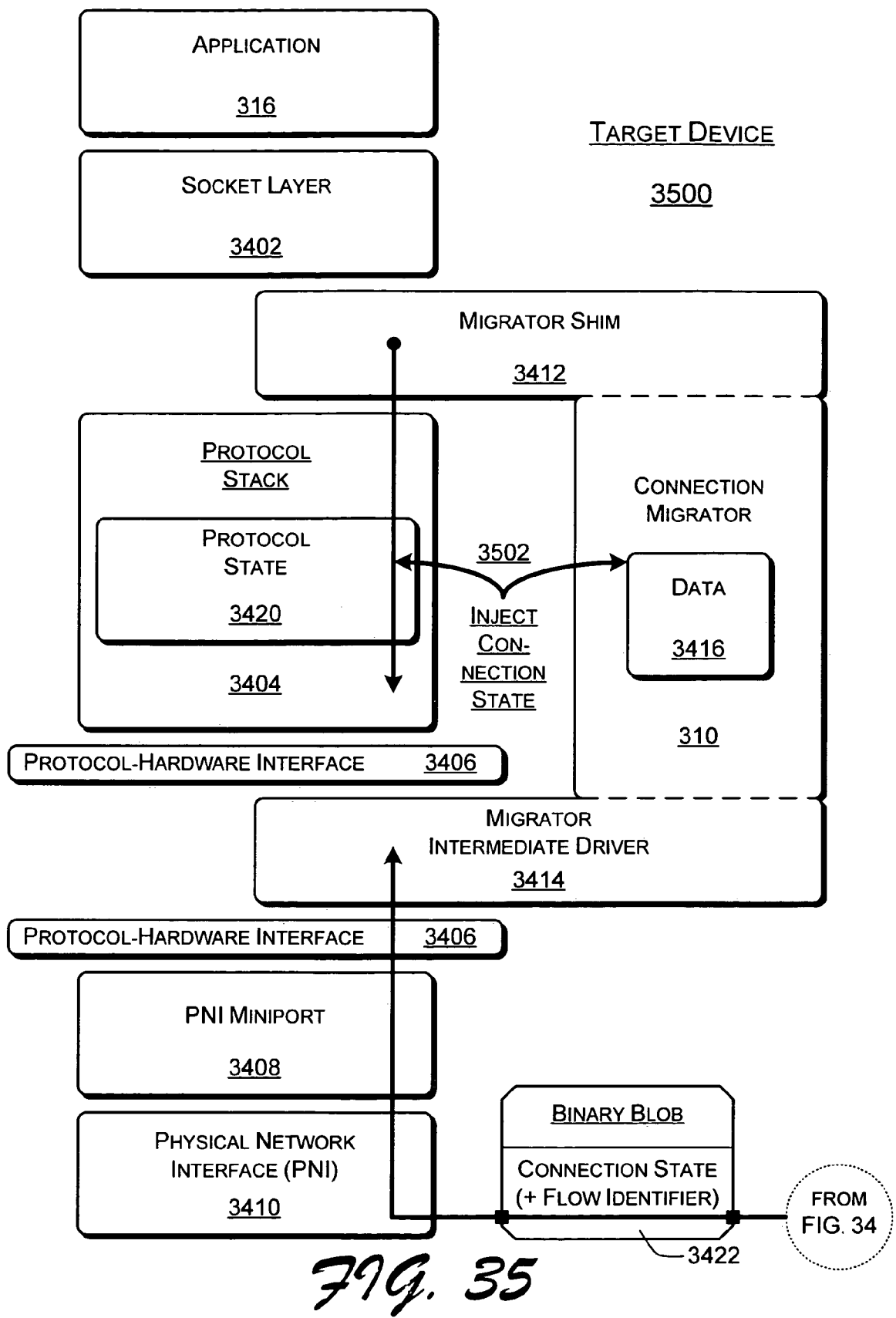
FIG. 35 illustrates an exemplary approach to connection migration from the perspective of a targeted device.

FIG. 35 illustrates an exemplary approach to connection migration from the perspective of a target device 3500. Target device 3500 is similar to originating device 3400 with respect to the various illustrated layers/modules, including connection migrator 310. As illustrated however, at least one application 316 at an application level is interfacing with socket layer 3402. Target device 3500 may therefore comprise a host 108. Also, connection migrator 310 is capable of uploading a connection from originating device 3400.

In a described implementation, application 316 is the destination of the connection-initiating packet received at originating device 3400. From originating device 3400, target device 3500 receives binary blob 3422. Binary blob 3422 includes the connection state associated with the connection being migrated to target device 3500 and optionally a flow identifier. This connection state includes protocol state 3420 and acknowledged data 3416 (and possibly other connection-related information).

In operation, when binary blob 3422 reaches protocol-hardware interface layer 3406, migrator intermediate driver 3414 recognizes it as a blob for connection migration and diverts it. The connection state is injected at 3502 to create the appearance to application 316 that the connection was originally terminated at target device 3500.

Specifically, protocol state 3420 of injected connection state 3502 is infused into protocol stack 3404. In a described implementation, protocol state 3420 is infused first at higher-level protocols and then at lower-level protocols of protocol stack 3404. After protocol state 3420 is infused into protocol stack 3404, data 3416 can be indicated up to application 316. This data 3416 can be provided to application 316 as if it were part of a newly and locally terminated connection.

After connection state injection 3502 is completed, the connection initiated by the packet received at originating device 3400 is successfully migrated therefrom to target device 3500. Subsequent packets for the connection may be forwarded directly to target device 3500 without passing through originating device 3400, or at least with only simple routing and no application-level analysis being applied thereto. Optionally, these packets may be tunneled such that migrator intermediate driver 3414 effectively operates as a software-based virtual NIC that is bound to the virtual IP address.

Figure 36:
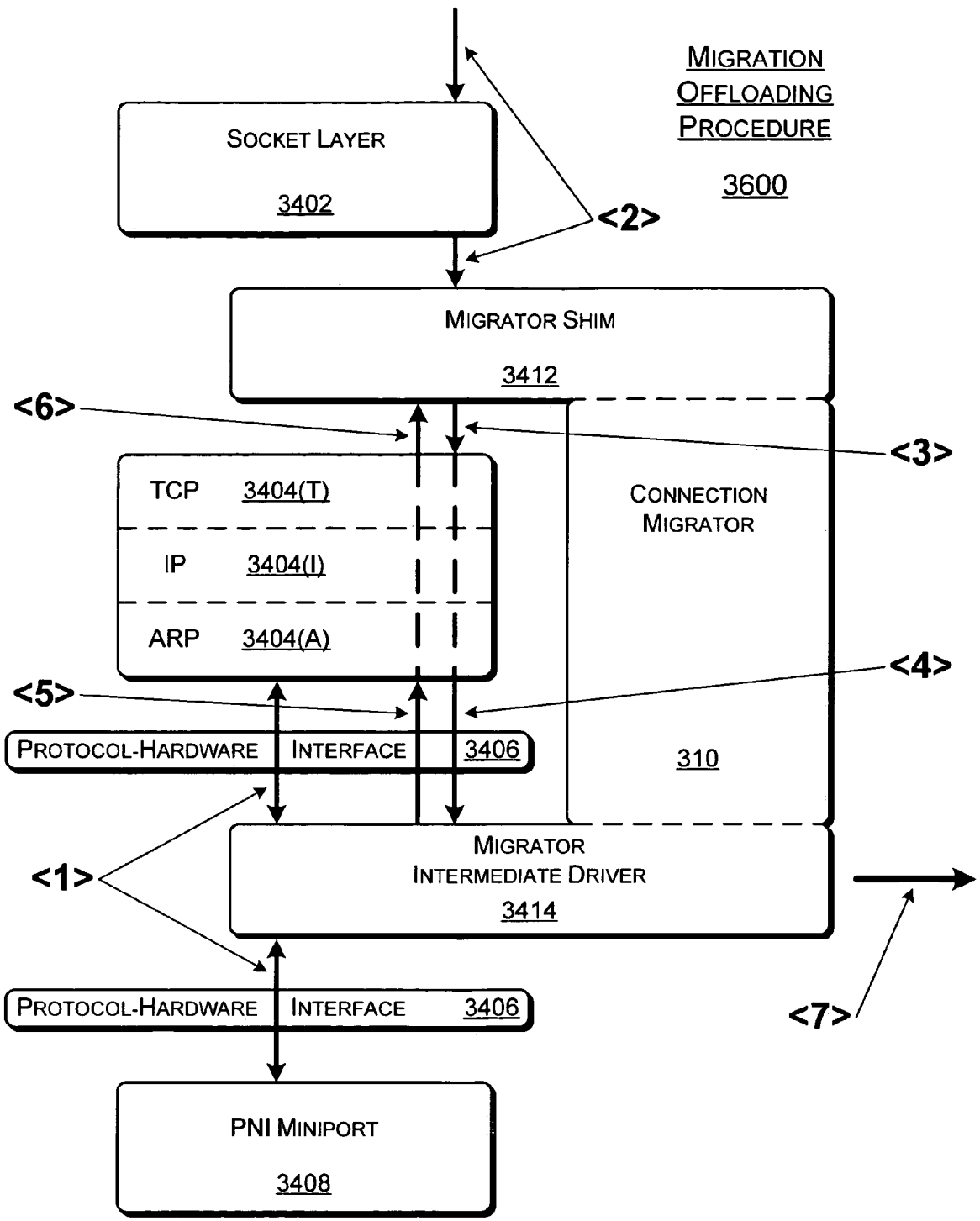
FIG. 36 illustrates an exemplary approach to an offloading procedure for a connection migration.

FIG. 36 illustrates an exemplary approach to an offloading procedure 3600 for a connection migration. Migration offloading procedure 3600 illustrates additional exemplary details for a connection migration by an originating device 3400. As illustrated, general protocol stack 3404 includes a TCP stack 3404(T), an IP stack 3404(I), and an address resolution protocol (ARP) stack 3404(A). However, other specific protocol stacks 3404( ) may alternatively be employed.

By way of example, protocol-hardware interface layer 3406 may be realized as a network driver interface specification (NDIS)-based layer in a Microsoft® Windows® operating system (OS) environment. Also, socket layer 3402 may be realized as a Winsock™ layer in a Microsoft® Windows® OS environment.

In a described implementation, migrator intermediate driver 3414 includes protocol-hardware interfaces 3406 at the junctions to ARP stack 3404(A) and to PNI miniport 3408. Migrator intermediate driver 3414 serves as an offload target in migration offloading procedure 3600. The offload target is a protocol-hardware interface 3406 miniport as illustrated in this example. In a migration uploading procedure 3700 (as in FIG. 37), migrator intermediate driver 3414 serves as an upload diverter.

More specifically, migrator intermediate driver 3414 is bound to each physical network interface 3410 through which a TCP connection may be migrated. Migrator intermediate driver 3414 usually operates as a pass-through driver by passing packets upwards or downwards in the network stack without otherwise interacting with the packets. However, migrator intermediate driver 3414 does interact with packets related to connection migration (optionally including subsequently tunneled packets).

Responsibilities of migrator intermediate driver 3414 include: (i) the acceptance of migrate offload requests; (ii) the aggregation of the protocol state information that is related to the TCP connection being migrated as compiled from the specific protocol stacks 3404( ), along with acknowledged data to produce the connection state information; and (iii) the transmission of the aggregated connection state to a targeted device 3500 for a migration uploading procedure 3700. A reliable wire protocol for such transmission may be shared with that used by the session tracking components 2002 and 2010 to send and receive session information messages 2008 (e.g., as described above with reference to FIG. 20).

Another responsibility of migrator intermediate driver 3414 (e.g., in a migration uploading procedure 3700) is to initiate the uploading of migrated connections that it receives from other devices and to buffer any incoming packets related to the migrating connection while it is in the process of being uploaded. To upload the connection, migrator intermediate driver 3414 sends an upload request to migrator shim 3412. Migrator shim 3412 issues an inject call down into protocol stack 3404 at TCP stack 3404(A) to instantiate the connection in the protocol stack 3404 portion of the network stack.

Migrator shim 3412 exposes a client interface to TCP stack 3404(T) and exposes a provider interface to socket layer 3402. Migrator shim 3412 has two roles: (i) to initiate connection migration offload procedure 3600 on an originating device 3400 and subsequently migration upload procedure 3700 on a targeted device 3500 and (ii) to mediate the classification process between a host application 316 program, a load-balancing classifier 304 program, and socket layer 3402. Migrator shim 3412 and migrator intermediate driver 3414 are both further described below with reference to FIGS. 36 and 37.

For an exemplary migration offloading procedure 3600, the migration of a TCP connection is performed after classifier 304 classifies the incoming TCP connection using one, two, or more packets thereof. Migration offloading procedure 3600 is described at points <1> through <7>.

At <1>, an initialization is performed prior to classification operations. Protocol stack 3404 makes queries at protocol-hardware interface layer 3406 to determine what offloading capabilities, if any, are available. Migrator intermediate driver 3414 indicates that connection migration offloading is available and propagates the query down to PNI miniport 3408. If a TCP chimney offload ability is provided by a physical network interface 3410, PNI miniport 3408 also so indicates. TCP chimney offload enables some TCP/IP processing to be offloaded to the hardware of physical network interface 3410 and involves some compiling of protocol state 3420. Consequently, some compiling and aggregation logic may be shared between the two offloading mechanisms.

At <2>, once a TCP connection has been classified, classifier 304 initiates a TCP connection migration to a selected host 108. Specifically, a migration command indicating a targeted device 3500 is issued via socket layer 3402 to migrator shim 3412.

At <3>, migrator shim 3412 initiates TCP connection migration to compile the TCP protocol state. Specifically, migrator shim 3412 invokes a TCP initiate migrate offload API (or more generally a migrate connection function call or migrate connection command). This routine compiles the relevant state for the specified TCP connection that is used to reinstate the connection on the targeted device 3500. The compiled protocol state 3420, includes state from the intermediate stack layers, including TCP stack 3404(T), IP stack 3404(I), and ARP stack 3404(A).

At <4>, once protocol stack 3404 has compiled protocol state 3420 for the TCP connection being migrated, it invokes an initiate migrate offload API on the miniport to which it is bound; in this example, that miniport is migrator intermediate driver 3414. However, in practice, there may be other intermediate drivers inserted between protocol stack 3404 and migrator intermediate driver 3414, such as IP QoS. If so, those IM drivers may participate in the migration, if relevant, by compiling/aggregating their state to the connection state information for the connection being migrated. Intermediate drivers continue to propagate the initiate migrate offload call down the network stack, which eventually results in execution of a migrate offload handler at migrator intermediate driver 3414. At this point, migrator intermediate driver 3414 also aggregates any acknowledged data with the remaining connection state for transfer of the TCP connection to targeted device 3500.

At <5>, after storing/copying connection state information for the TCP connection being migrated, migrator intermediate driver 3414 notifies the network stack that the migration is in its final stages by invoking an initiate migrate offload complete API. This initiate migrate offload complete API follows the reverse path up the network stack, through the same intermediate drivers (if any), and eventually to protocol stack 3404. As each layer processes this call, state information that is associated with the migrated connection may be released. Until the processing of this call is complete, each layer may send updating notifications down the network stack to update any part of the connection state that has changed since the migration was initiated.

At <6>, when the initiate migrate offload complete routine reaches TCP stack 3404(T), TCP silently (i.e., no reset is sent to client 108) closes the connection, flushing all state associated with the migrated connection, and propagates the initiate migrate offload complete call to migrator shim 3412. At this point, the network stack is free of any residual knowledge of the migrated TCP connection.

At <7>, when the initiate migrate offload complete call returns to migrator intermediate driver 3414 (via the migrator shim 3412 portion of connection migrator 310), the migration of the TCP connection from originating device 3400 to targeted device 3500 may commence with the transfer of the connection state thereto. The connection state may be transferred asynchronously and reliably.

Once migration is initiated, originating device 3400 is also responsible for ensuring that subsequent data from client 108 is forwarded to target device 3500. Consequently, even after the connection is successfully migrated to the target, the originator retains some amount of state for the connection (e.g., a routing table entry) in order to properly route subsequent packets to the target. When the connection is terminated, the target notifies the originator to enable it to purge whatever residual state remains for the migrated connection.

Furthermore, as a consequence of the asynchronous nature of the connection migration, data packets for the migrating connection that are forwarded by originating device 3400 (or a forwarder designated thereby if a separate device) may start arriving at targeted device 3500 before targeted device 3500 receives the migrated connection state. Migrator intermediate driver 3414 at targeted device 3500 is responsible for buffering those packets until the associated migrated connection is established on targeted device 3500.

Figure 37:
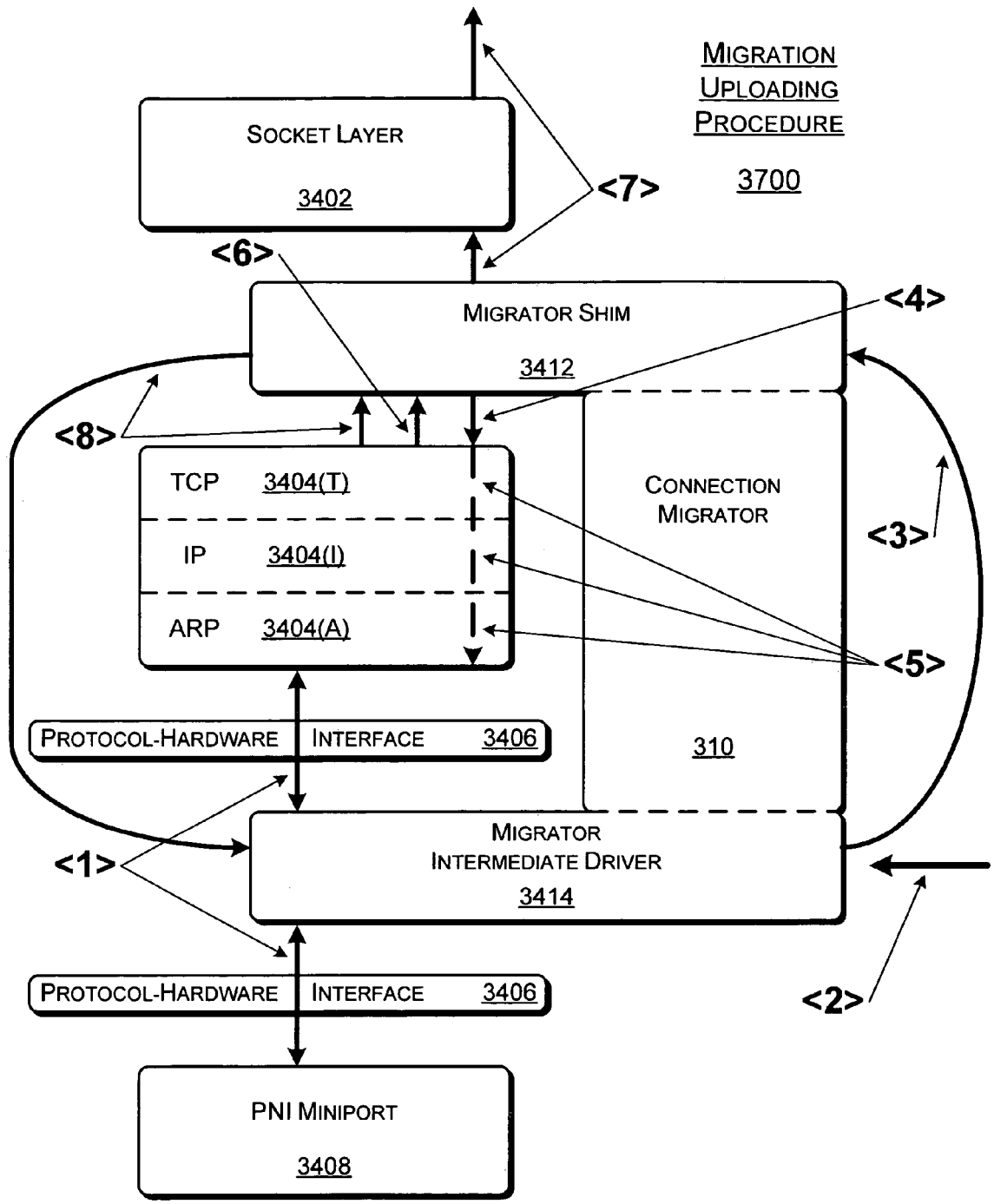
FIG. 37 illustrates an exemplary approach to an uploading procedure for a connection migration.

FIG. 37 illustrates an exemplary approach to an uploading procedure 3700 for a connection migration. Migration uploading procedure 3700 illustrates additional exemplary details for a connection migration by targeted device 3500.

When a migrated connection arrives at targeted device 3500, it is relayed to migrator intermediate driver 3414 for processing. After amalgamating and assimilating the migrated connection state, migrator intermediate driver 3414, in conjunction with migrator shim 3412, injects the migrated connection into the local network stack in a manner transparent to application 316. For an exemplary migration uploading procedure 3700, the migration of a TCP connection at points <1> through <8> is described.

At <1>, as described above with reference to migration offloading procedure 3600, an initialization is performed prior to application hosting operations. Specifically, protocol stack 3404 makes queries regarding what offloading capabilities, if any, are available. Migrator intermediate driver 3414 fills in the TCP connection migration support query to indicate that connection migration uploading is available and also propagates the query down to PNI miniport 3408 for possible TCP chimney offload capabilities.

At <2>, when connection migration data arrives at target device 3500, the connection migration information (e.g., a bundled binary blob 3422) is delivered to migrator intermediate driver 3414. Migrator intermediate driver 3414 re-assembles the connection state, matches it up with any associated data that has arrived during the migration, and prepares for the upload onto the network stack. Any data from client 102 that arrives during the process of uploading the migrated connection is buffered by migrator intermediate driver 3414. Upon successful completion of the migration, the data will be delivered to application 316.

At <3>, to initiate the upload of the migrated connection into the local network stack, migrator intermediate driver 3414 notifies migrator shim 3412 that a migrated connection request has arrived. Migrator intermediate driver 3414 also delivers the connection state (or at least protocol state 3420) to migrator shim 3412.

At <4>, migrator shim 3412 initiates the upload of the migrated connection by invoking a TCP initiate inject routine (or more generally an infuse protocol state routine) and by providing the migrated protocol state 3420 to TCP stack 3404(T). At <5>, TCP/IP recreates the migrated connection throughout protocol stack 3404 using the provided protocol state 3420. This protocol state 3420 may include one or more of transport state (TCP), path state (IP), neighbor and next-hop state (ARP), and so forth.

At <6>, if the migrated connection is successfully reestablished on target device 3500, TCP initiates a connect event to a client portion of migrator shim 3412 to indicate that a new connection has been established. There are a multitude of possible reasons for failure, but common reasons may include the lack of a corresponding listener, routing failure, etc. In these cases where the network stack is unable to reestablish the migrated connection, no connect event is indicated and a failure status is specified in the initiate inject complete call. Connection migrator 310 is responsible for cleaning up the migration and for sending a reset notification back to client 102 to abandon the connection.

At <7>, migrator shim 3412 acts as a provider to propagate the connect event to socket layer 3402 so as to indicate to the listening application 316 that a new connection has been established. If the application 316 accepts the connection, it processes the requests and responds through normal read and write socket operations; application 316 can be unaware that the connection was migrated. If the connection is not accepted by the application 316, TCP terminates the connection but does not send a reset notification back to client 102. Again, a failure status is specified in the initiate inject complete call, and connection migrator 310 is responsible for cleaning up the migration and for sending a reset notification back to client 102 to abandon the connection.

A special situation arises when application 316 and classifier 304 are co-located on the same device: migrator shim 3412 may referee between them. When both classes of programs reside on the same host 108, they may both be listening to the same IP address(es) and port(s). However, TCP typically has one listener per unique IP address and port. Consequently, migrator shim 3412 can obscure a configuration where two programs are listening on the same IP address and port by multiplexing the two sockets into a single listener at the TCP layer.

In such a case, when connect events arrive at the client portion of migrator shim 3412, migrator shim 3412 as a provider determines on which listening socket to deliver the connect notification at socket layer 3402. If there is only one socket listening to the corresponding IP address and port, then that socket receives the connect event. If there is more than one socket listening, then the recipient depends on the context in which the connect event is indicated. If the connect event is a brand new connection for a virtual IP address, then the connect event is delivered to classifier 304; if the connect event is for a dedicated IP address (non-load-balanced IP address) or the result of uploading a migrated connection, then the connect event is delivered to the target application 316.

At <8>, once the injection of the migrated connection is complete, TCP notifies migrator shim 3412 by invoking the provided initiate inject complete handler. A status code is provided to notify migrator shim 3412 whether or not the connection was successfully uploaded. If uploading of the migrated connection fails, connection migrator 310 is responsible for cleaning up the migration and for notifying client 102 that the connection has been abandoned by sending it a reset. If the migrated connection was successfully injected into the local network stack, migrator intermediate driver 3414 may begin delivering any buffered data from client 102 by passing the received packet(s) up through the packet receive path of protocol-hardware interface 3406.

When a migrated connection is terminated (because uploading failed, because the migrated connection is subsequently closed through normal means, etc.), target device 3500 notifies originating device 3400. Originating device 3400 uses these notifications to more efficiently and reliably clean out lingering state for migrated connections, including routing table entries. Therefore, to account for successfully migrated connections which terminate arbitrarily in the future, migrator shim 3412 may monitor their activity and notify migrator intermediate driver 3414 when the sockets therefor are closed.

Figure 38:
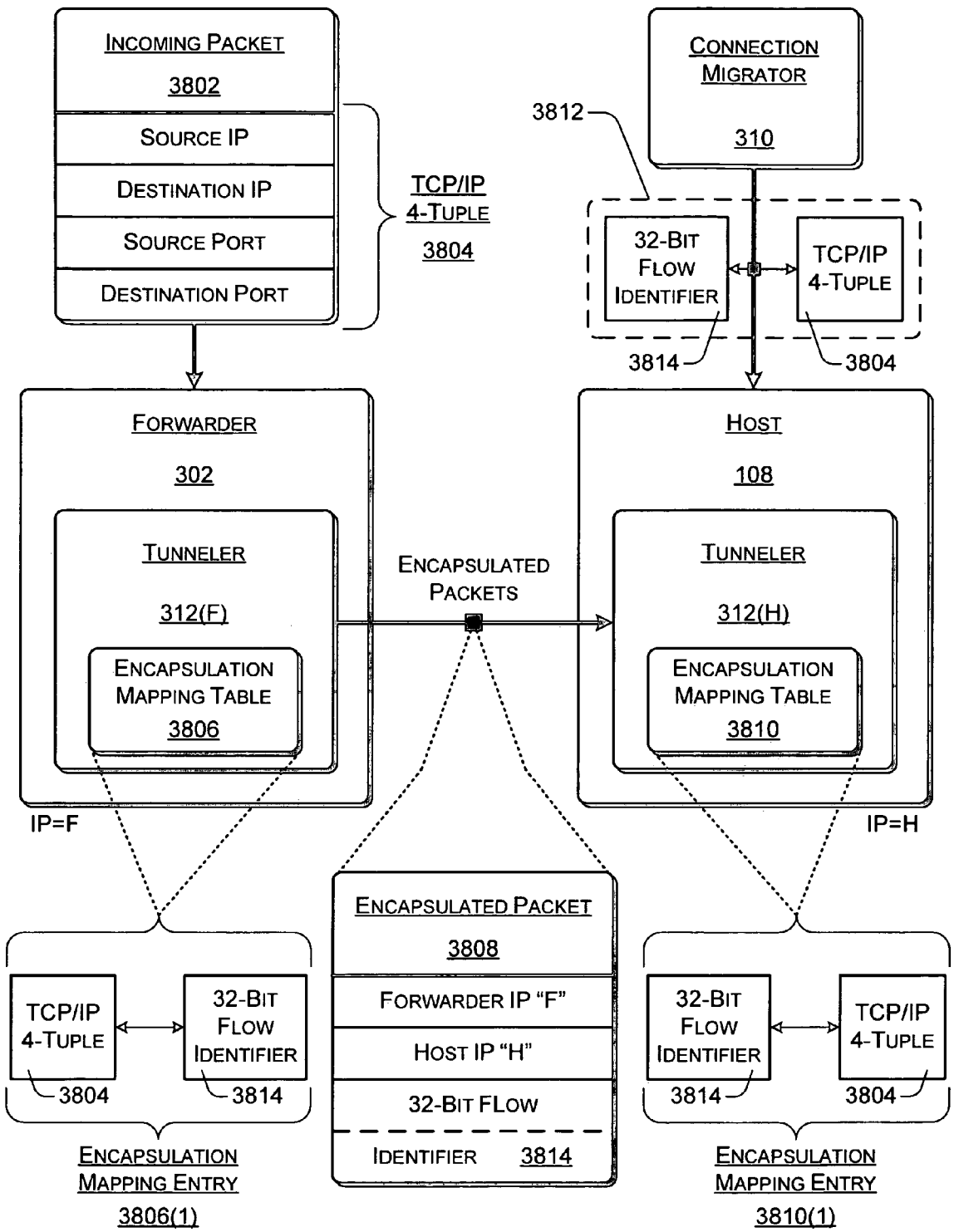
FIG. 38 illustrates an exemplary approach to packet tunneling between a forwarder and a host.

FIG. 38 illustrates an exemplary approach to packet tunneling between a forwarder 302 and a host 108. Encapsulated packets 3808 may be tunneled from forwarder 302 to host 108 without incurring overhead for each packet transmitted. As described further below, the tunneling is effectuated using a flow identifier 3814 and encapsulation mapping tables 3806 and 3810 of tunnelers 312(F) and 312(H), respectively, of forwarder 302 and host 108, respectively. Flow identifier 3814 is inserted into encapsulated packets 3808.

As noted above with reference to FIG. 32, packets for a connection that arrive subsequent to a connection migration may be routed by forwarder 302 to host 108(1) using tunneling by a tunneler 312. At (8) (of FIG. 32), forwarder 302 forwards such subsequent packets from forwarder 302 having a network address of "F" to host 108(1) having a network address of "H1". As described above with reference to FIG. 4, forwarder 302 may perform NAT, half-NAT, tunneling, etc. in order to route the incoming packets to host 108(1).

Such incoming packets include a destination IP address of the virtual IP ("VIP") address and a source IP address of "C1" for packets arriving from client 102(1). The packets being routed to host 108(1) have a destination IP address of H1 and a source address of C1 (for half-NAT) or "F" (for full NAT). This re-writing of the addresses can interfere with some protocols that expect both of client 102(1) and host 108(1) to have identical views of the source and destination addresses.

Furthermore, at least with respect to full NAT, return paths from host 108(1) to client 102(1) that do not run through forwarder 302 are prohibitive because host 108(1) does not know the address of client 102(1). Direct paths from host 108(1) to client 102(1) are desirable in situations in which traffic from host 108(1) to client 102(1) is especially high and/or significantly greater than traffic in the opposite direction (e.g., when host 108(1) provides streaming media to client 102(1)).

Tunneling by tunnelers 312 as described herein can provide for identical views with respect to the source and destination addresses (and ports) for clients 102 and applications 316 on hosts 108. By way of example and with reference to FIGS. 34 and 35, tunneler 312 in each of forwarder 302 and host 108 may operate as part of or in conjunction with a migrator intermediate driver 3414 of a connection migrator 310.

In a described implementation for FIG. 38, connection migrator 310 provides an encapsulation mapping 3812 between a flow identifier 3814 and a TCP/IP 4-tuple 3804. Connection migrator 310 may be associated with a classifier 304, and connection migrator 310 (optionally along with such a classifier 304) may be located on a same device as forwarder 302. Alternatively, connection migrator 310 (as well as the classifier 304) may be located on a different device from forwarder 302. Encapsulation mapping 3812 may alternatively be provided by or in conjunction with tunneler 312 functionality that is, for example, located at and/or associated with a classifier 304.

By being mapped to a TCP/IP 4-tuple 3804 in encapsulation mapping 3812, flow identifier 3814 serves to identify a flow of encapsulated packets 3808 for a particular connection. TCP/IP 4-tuple 3804 includes network addresses (and ports, etc.) for the source and destination for a particular connection in accordance with a TCP/IP protocol, or any similar or analogous protocol. Flow identifier 3814 is 32 bits in a described implementation because 32 bits is available for connections established in accordance with an internet IPv4 protocol. However, flow identifiers 3814 of other lengths may alternatively be used, especially for other protocols such as internet IPv6, UDP, and so forth.

Flow identifiers 3814 may be generated using any appropriate mechanism, such as an incrementing connection counter. Furthermore, TCP/IP 4-tuple 3804 is more generally a source/destination pair. Each source value and destination value of an individual source/destination pair may include a network node identifier (e.g., network address, port, some combination thereof, etc.) for the source and destination, respectively, of a given packet propagating on a particular connection.

Connection migrator 310 provides encapsulation mapping 3812 to host 108. Tunneler 312(H) at host 108 stores encapsulation mapping 3812 in encapsulation mapping table 3810 as encapsulation mapping entry 3810(1). Tunneler 312(H) can thereafter use flow identifier 3814 to map to and identify the particular connection corresponding to TCP/IP 4-tuple 3804. Encapsulation mapping 3812 may optionally be provided to host 108 as part of a bundled binary blob 3422 in a connection migration operation.

Forwarder 302 also includes a tunneler 312(F) component with an encapsulation mapping table 3806. Encapsulation mapping table 3806 stores an encapsulation mapping entry 3806(1) that links/maps TCP/IP 4-tuple 3804 for a particular connection to a flow identifier 3814. Tunneler 312(F) also receives the mapping information for encapsulation mapping entry 3806(1) from connection migrator 310 (e.g., as an encapsulation mapping 3812).

Although only one encapsulation mapping entry 3806(1) and 3810(1) is shown, each of encapsulation mapping table 3806 and encapsulation mapping table 3810 may have multiple such entries. These encapsulation mapping tables 3806 and 3810 may be combined with other information, such as tables for session information of session tracker 308.

When a transmitting device (such as forwarder 302) and a receiving device (such as host 108) of encapsulated packets 3808 only tunnel between each other, the encapsulation mapping tables thereof likely have the same encapsulation mapping entries. Otherwise, encapsulation mapping table 3806 and encapsulation mapping table 3810 likely have a different total set of encapsulation mapping entries 3806( ) and encapsulation mapping entries 3810( ), respectively.

In operation, an incoming packet 3802 for a particular connection is received at forwarder 302. The particular connection is associated with TCP/IP 4-tuple 3804. Incoming packet 3802 includes TCP/IP 4-tuple 3804 with a source IP address (of a client 102), a destination IP address (the virtual IP), a source TCP port (of the client 102), and a destination TCP port.

Tunneler 312(F) accepts incoming packet 3802 for tunneling to host 108. Using TCP/IP 4-tuple 3804, tunneler 312(F) accesses encapsulation mapping table 3806 to locate encapsulation mapping entry 3806(1). Flow identifier 3814 is extracted from encapsulation mapping entry 3806(1) as being linked/mapped to TCP/IP 4-tuple 3804.

To create encapsulated packet 3808, tunneler 312(F) inserts flow identifier 3814 into the source and destination port portions of the TCP/IP 4-tuple header. For an internet IPv4 implementation, these two TCP port portions offer 32 bits of total space. Also, for the source IP address portion of the TCP/IP 4-tuple header, tunneler 312(F) inserts the IP address "F" of forwarder 302. For the destination IP address portion of the TCP/IP 4-tuple header, tunneler 312(F) inserts the IP address "H" of host 108.

Forwarder 302 routes/transmits encapsulated packet 3808 to host 108, and host 108 receives encapsulated packet 3808 from forwarder 302. The tunneler 312(H) component at host 108 detects that encapsulated packet 3808 is a tunneled packet that is to be de-encapsulated.

Flow identifier 3814 is extracted from encapsulated packet 3808 and used to look up the corresponding TCP/IP 4-tuple 3804 that is linked thereto in encapsulation mapping entry 3810(1) of encapsulation mapping table 3810. TCP/IP 4-tuple 3804 is used by tunneler 312(H) to recreate the TCP/IP 4-tuple 3804 header as originally received in incoming packet 3802 at forwarder 302.

Specifically, the IP address F of forwarder 302 is replaced with the source IP address, and the IP address H of host 108 is replaced with the destination IP address. Furthermore, flow identifier 3814 is replaced by the source TCP port and the destination TCP port. The de-encapsulated packet is then indicated up the network stack of host 108 to the targeted application 316.

More generally, a portion of a packet header, including a portion of a source/destination pair, for a given packet that is not necessarily used for communicating the given packet may be used to carry a flow identifier 3814. By pre-providing at least part of the source/destination pair at host 108, a flow identifier 3814 may be employed to tunnel (e.g., encapsulate and/or de-encapsulate) packets without incurring an encapsulation overhead on each packet. Furthermore, packets that are full-size with respect to a given protocol may be tunneled without being broken apart.

Figure 39:
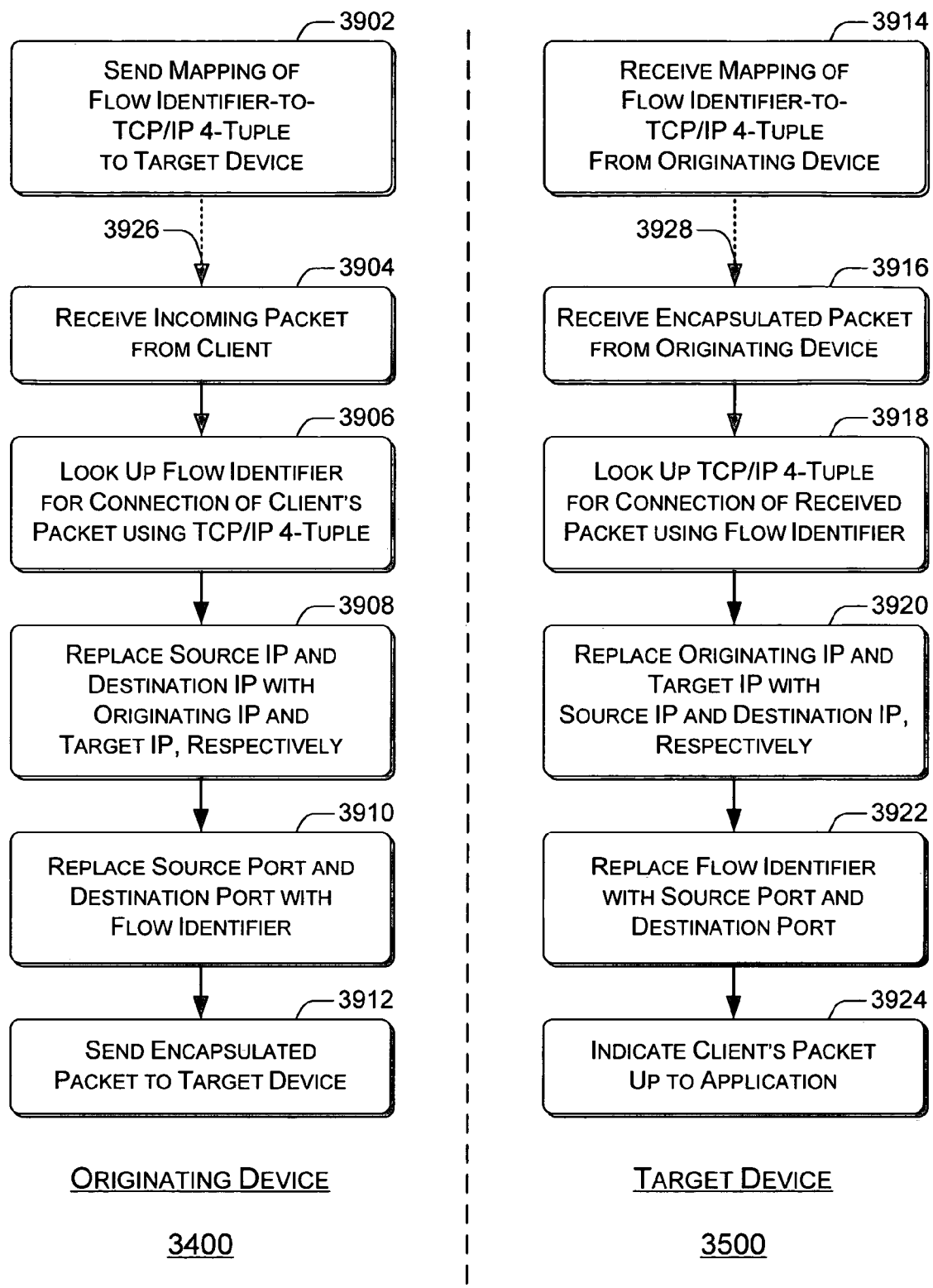
FIG. 39 is a flow diagram that illustrates an exemplary method for packet tunneling between a first device and a second device.

FIG. 39 is a flow diagram 3900 that illustrates an exemplary method for packet tunneling between a first device and a second device. For example, the first device and the second device may correspond to an originating device 3400 and a target device 3500, respectively, of load balancing infrastructure 106 and a cluster of hosts 108, respectively. Nevertheless, tunneling may be employed in non-load-balancing implementations.

Flow diagram 3900 includes twelve blocks 3902-3924. Although the actions of flow diagram 3900 may be performed in other environments and with a variety of software schemes, FIGS. 1-3, 32, 34, 35, and 38 are used in particular to illustrate certain aspects and examples of the method.

At block 3902, a mapping of a flow identifier-to-TCP/IP 4-tuple is sent to a target device from an originating device. For example, originating device 3400 may send an encapsulation mapping 3812 that links a flow identifier 3814 to a TCP/IP 4-tuple 3804. At block 3914, the mapping of the flow identifier-to-the TCP/IP 4-tuple is received at the target device from the originating device. For example, target device 3500 receives encapsulation mapping 3812 that links flow identifier 3814 to TCP/IP 4-tuple 3804 from originating device 3400.

Alternatively, target device 3500 may receive encapsulation mapping 3812 from another device. As indicated by dashed arrows 3926 and 3928, the actions of blocks 3904-3912 and blocks 3916-3924 can occur at some time after the actions of blocks 3902 and 3914, respectively.

At block 3904, an incoming packet is received at the originating device from a client. For example, an incoming packet 3802 having a header with TCP/IP 4-tuple 3804 may be received at originating device 3400 from a client 102. At block 3906, a flow identifier is looked up for a connection corresponding to the client's packet using the TPC/IP 4-tuple of the incoming packet. For example, flow identifier 3814 may be looked up for the connection with client 102 using TCP/IP 4-tuple 3804 that is mapped thereto in an encapsulation mapping entry 3806(1) of an encapsulation mapping table 3806.

At block 3908, the source IP and destination IP of the incoming packet are replaced with an originating IP address of the originating device and a target IP address of the target device, respectively. For example, originating device 3400 may replace the IP address portions of the TCP/IP 4-tuple 3804 portion of a header of incoming packet 3802 with IP addresses of originating device 3400 and target device 3500.

At block 3910, the source port and the destination port of the incoming packet are replaced with the flow identifier. For example, originating device 3400 may replace source and destination TCP ports of the TCP/IP 4-tuple 3804 portion of the header of incoming packet 3802 with flow identifier 3814. At block 3912, the encapsulated packet is sent from the originating device to the target device. For example, originating device 3400 may send an encapsulated packet 3808 to target device 3500.

At block 3916, the encapsulated packet is received at the target device from the originating device. For example, target device 3500 may receive the encapsulated packet 3808 from originating device 3400. At block 3918, the TCP/IP 4-tuple is looked up for the connection corresponding to the packet received from the client using the flow identifier. For example, target device 3500 may access an encapsulation mapping table 3810 at an encapsulation mapping entry 3810(1) that maps flow identifier 3814 to TCP/IP 4-tuple 3804.

At block 3920, the originating IP address and the target IP address are replaced with the source IP address and the destination IP address, respectively, using the looked-up TCP/IP 4-tuple. For example, target device 3500 may replace the IP addresses of originating device 3400 and target device 3500 in encapsulated packet 3808 with the source IP address and the destination IP address from TCP/IP 4-tuple 3804 as attained from encapsulation mapping table 3810.

At block 3922, the flow identifier is replaced with the source port and the destination port of the incoming packet using the looked up TCP/IP 4-tuple. For example, target device 3500 may replace flow identifier 3814 in encapsulated packet 3808 with the source TCP port and the destination TCP port from TCP/IP 4-tuple 3804. At block 3924, the client's packet is indicated up to an application at the target device. For example, a de-encapsulated version of encapsulated packet 3808, or incoming packet 3802, is indicated up to application 316 of target device 3500.

The actions, aspects, features, components, etc. of FIGS. 1-39 are illustrated in diagrams that are divided into multiple blocks. However, the order, interconnections, layout, etc. in which FIGS. 1-39 are described and/or shown is not intended to be construed as a limitation, and any number of the blocks can be combined, rearranged, augmented, omitted, etc. in any manner to implement one or more systems, methods, devices, procedures, media, APIs, apparatuses, arrangements, etc. for network load balancing. Furthermore, although the description herein includes references to specific implementations (and the exemplary operating environment of FIG. 40), the illustrated and/or described implementations can be implemented in any suitable hardware, software, firmware, or combination thereof and using any suitable network organization(s), transport/communication protocols(s), application programming interface(s) (APIs), client-server architecture(s), and so forth.

Exemplary Operating Environment for Computer or Other Device

Figure 40:
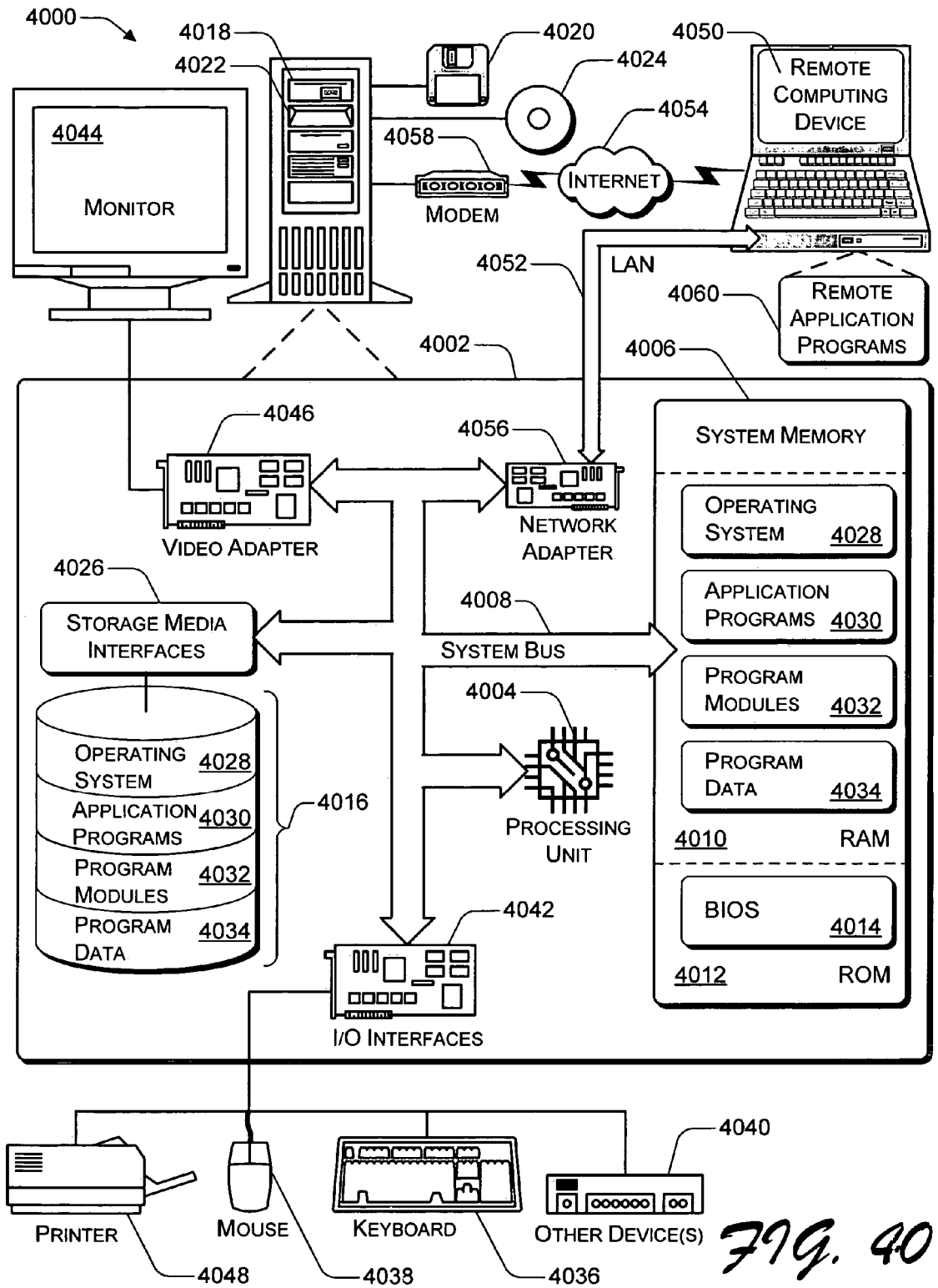
FIG. 40 illustrates an exemplary computing (or general device) operating environment that is capable of (wholly or partially) implementing at least one aspect of network load balancing as described herein.

FIG. 40 illustrates an exemplary computing (or general device) operating environment 4000 that is capable of (fully or partially) implementing at least one system, device, apparatus, component, arrangement, protocol, approach, method, procedure, media, API, some combination thereof, etc. for network load balancing as described herein. Operating environment 4000 may be utilized in the computer and network architectures described below or in a stand-alone situation.

Exemplary operating environment 4000 is only one example of an environment and is not intended to suggest any limitation as to the scope of use or functionality of the applicable device (including computer, network node, entertainment device, mobile appliance, general electronic device, etc.) architectures. Neither should operating environment 4000 (or the devices thereof) be interpreted as having any dependency or requirement relating to any one or to any combination of components as illustrated in FIG. 40.

Additionally, network load balancing may be implemented with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, minicomputers, mainframe computers, network nodes, distributed or multi-processing computing environments that include any of the above systems or devices, some combination thereof, and so forth.

Implementations for network load balancing may be described in the general context of processor-executable instructions. Generally, processor-executable instructions include routines, programs, protocols, objects, interfaces, components, data structures, etc. that perform and/or enable particular tasks and/or implement particular abstract data types. Network load balancing, as described in certain implementations herein, may also be practiced in distributed processing environments where tasks are performed by remotely-linked processing devices that are connected through a communications link and/or network. Especially in a distributed computing environment, processor-executable instructions may be located in separate storage media, executed by different processors, and/or propagated over transmission media.

Exemplary operating environment 4000 includes a general-purpose computing device in the form of a computer 4002, which may comprise any (e.g., electronic) device with computing/processing capabilities. The components of computer 4002 may include, but are not limited to, one or more processors or processing units 4004, a system memory 4006, and a system bus 4008 that couples various system components including processor 4004 to system memory 4006.

Processors 4004 are not limited by the materials from which they are formed or the processing mechanisms employed therein. For example, processors 4004 may be comprised of semiconductor(s) and/or transistors (e.g., electronic integrated circuits (ICs)). In such a context, processor-executable instructions may be electronically-executable instructions. Alternatively, the mechanisms of or for processors 4004, and thus of or for computer 4002, may include, but are not limited to, quantum computing, optical computing, mechanical computing (e.g., using nanotechnology), and so forth.

System bus 4008 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 4002 typically includes a variety of processor-accessible media. Such media may be any available media that is accessible by computer 4002 or another (e.g., electronic) device, and it includes both volatile and non-volatile media, removable and non-removable media, and storage and transmission media.

System memory 4006 includes processor-accessible storage media in the form of volatile memory, such as random access memory (RAM) 4040, and/or non-volatile memory, such as read only memory (ROM) 4012. A basic input/output system (BIOS) 4014, containing the basic routines that help to transfer information between elements within computer 4002, such as during start-up, is typically stored in ROM 4012. RAM 4010 typically contains data and/or program modules/instructions that are immediately accessible to and/or being presently operated on by processing unit 4004.

Computer 4002 may also include other removable/non-removable and/or volatile/non-volatile storage media. By way of example, FIG. 40 illustrates a hard disk drive or disk drive array 4016 for reading from and writing to a (typically) non-removable, non-volatile magnetic media (not separately shown); a magnetic disk drive 4018 for reading from and writing to a (typically) removable, non-volatile magnetic disk 4020 (e.g., a "floppy disk"); and an optical disk drive 4022 for reading from and/or writing to a (typically) removable, non-volatile optical disk 4024 such as a CD, DVD, or other optical media. Hard disk drive 4016, magnetic disk drive 4018, and optical disk drive 4022 are each connected to system bus 4008 by one or more storage media interfaces 4026. Alternatively, hard disk drive 4016, magnetic disk drive 4018, and optical disk drive 4022 may be connected to system bus 4008 by one or more other separate or combined interfaces (not shown).

The disk drives and their associated processor-accessible media provide non-volatile storage of processor-executable instructions, such as data structures, program modules, and other data for computer 4002. Although exemplary computer 4002 illustrates a hard disk 4016, a removable magnetic disk 4020, and a removable optical disk 4024, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the exemplary operating environment 4000.

Any number of program modules (or other units or sets of instructions/code) may be stored on hard disk 4016, magnetic disk 4020, optical disk 4024, ROM 4012, and/or RAM 4040, including by way of general example, an operating system 4028, one or more application programs 4030, other program modules 4032, and program data 4034.

A user may enter commands and/or information into computer 4002 via input devices such as a keyboard 4036 and a pointing device 4038 (e.g., a "mouse"). Other input devices 4040 (not shown specifically) may include a microphone, joystick, game pad, satellite dish, serial port, scanner, and/or the like. These and other input devices are connected to processing unit 4004 via input/output interfaces 4042 that are coupled to system bus 4008. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 4044 or other type of display device may also be connected to system bus 4008 via an interface, such as a video adapter 4046. Video adapter 4046 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 4044, other output peripheral devices may include components such as speakers (not shown) and a printer 4048, which may be connected to computer 4002 via input/output interfaces 4042.

Computer 4002 may operate in a networked environment using logical connections to one or more remote computers, such as a remote computing device 4050. By way of example, remote computing device 4050 may be a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 4050 is illustrated as a portable computer that may include many or all of the elements and features described herein with respect to computer 4002.

Logical connections between computer 4002 and remote computer 4050 are depicted as a local area network (LAN) 4052 and a general wide area network (WAN) 4054. Such networking environments are commonplace in offices, enterprise-wide computer networks, intranets, the Internet, fixed and mobile telephone networks, ad-hoc and infrastructure wireless networks, other wireless networks, gaming networks, some combination thereof, and so forth. Such networks and communications connections are examples of transmission media.

When implemented in a LAN networking environment, computer 4002 is usually connected to LAN 4052 via a network interface or adapter 4056. When implemented in a WAN networking environment, computer 4002 typically includes a modem 4058 or other means for establishing communications over WAN 4054. Modem 4058, which may be internal or external to computer 4002, may be connected to system bus 4008 via input/output interfaces 4042 or any other appropriate mechanism(s). It is to be appreciated that the illustrated network connections are exemplary and that other means of establishing communication link(s) between computers 4002 and 4050 may be employed.

Furthermore, other hardware that is specifically designed for servers may be employed. For example, SSL acceleration cards can be used to offload SSL computations. Additionally, especially in a network load balancing operating environment, TCP offload hardware and/or packet classifiers on network interfaces or adapters 4056 (e.g., on network interface cards) may be installed and used at server devices.

In a networked environment, such as that illustrated with operating environment 4000, program modules or other instructions that are depicted relative to computer 4002, or portions thereof, may be fully or partially stored in a remote media storage device. By way of example, remote application programs 4060 reside on a memory component of remote computer 4050 but may be usable or otherwise accessible via computer 4002. Also, for purposes of illustration, application programs 4030 and other processor-executable instructions such as operating system 4028 are illustrated herein as discrete blocks, but it is recognized that such programs, components, and other instructions reside at various times in different storage components of computing device 4002 (and/or remote computing device 4050) and are executed by processor(s) 4004 of computer 4002 (and/or those of remote computing device 4050).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. One or more computer-readable storage media storing computer-executable instructions that, when executed, configure one or more processors to perform actions comprising:
   determining host status information for a plurality of hosts, each host comprising a plurality of applications, wherein the host status information comprises a health and load table including a plurality of entries, each entry of the plurality of entries associated with an application of the plurality of applications, each entry of the plurality of entries comprising:
      an application identifier for a particular application of the plurality of applications;
      information characterizing at least one status of the particular application; and
      at least one load balancing directive regarding the particular application;
   implementing a message protocol between at least one host and one or more load balancing units, the message protocol usable for communicating host status information between the at least one host and the one or more load balancing units when the host status information is updated;
   communicating the host status information from the at least one host to the one or more load balancing units, wherein the one or more load balancing units each comprise a consolidated health and load cache that stores application— specific health and load information for the plurality of applications that are executing on the plurality of hosts;
   receiving the host status information from the at least one host; and
   making load balancing decisions responsive to the received host status information.

2. The one or more computer-readable storage media as recited in claim 1, comprising the computer-executable instructions that, when executed, configure the one or more processors to perform further actions comprising:
   receiving a request for a new connection from a client; and
   wherein the action of making comprises an action of:
   selecting a destination target for the new connection responsive to the received host status information.

3. The one or more computer-readable storage media as recited in claim 1, wherein the action of receiving comprises at least one action of:
   receiving the host status information directly from one or more hosts of the plurality of hosts; and
   receiving the host status information indirectly from one or more hosts of the plurality of hosts.

4. The one or more computer-readable storage media as recited in claim 1, wherein at least a portion of the computer-executable instructions comprise software that is adapted to be executed on the at least one host.

5. The one or more computer-readable storage media as recited in claim 1, wherein at least a portion of the computer-executable instructions comprise software that is adapted to be executed on the one or more load balancing units.

6. The one or more computer-readable storage media as recited in claim 1, comprising the computer-executable instructions that, when executed, enable the one or more processors to implement the message protocol that includes at least one message, the at least one message comprising a heartbeat message indicating to the one or more load balancing units that the at least one host is functioning.

7. The one or more computer-readable storage media as recited in claim 6, wherein a format of the heartbeat message comprises an identifier for the at least one host, error checking data for health and/or load information, and a domain name system (DNS) name.

8. The one or more computer-readable storage media as recited in claim 6, wherein a format of the heartbeat message permits inclusion of a chunk number/generation identifier (ID) pair.

9. The one or more computer-readable storage media as recited in claim 1, comprising the computer-executable instructions that, when executed, enable the one or more processors to implement the message protocol that includes at least one message, the at least one message comprising a goodbye message indicating to the one or more load balancing units that the at least one host is planning to shutdown.

10. The one or more computer-readable storage media as recited in claim 9, wherein a format of the goodbye message comprises an identifier for the at least one host.

11. The one or more computer-readable storage media as recited in claim 1, comprising the computer-executable instructions that, when executed, enable the one or more processors to implement the message protocol that includes at least one message, the at least one message comprising a row change message indicating to the one or more load balancing units that health and/or load information for an application of the at least one host has changed.

12. The one or more computer-readable storage media as recited in claim 11, wherein a format of the row change message comprises an identifier for the at least one host, an identifier for the application, an operation to reflect the change, and data for the operation.

13. The one or more computer-readable storage media as recited in claim 1, comprising the computer-executable instructions that, when executed, enable the one or more processors to implement the message protocol that includes at least one message, the at least one message comprising a get table snapshot message that is sent from the one or more load balancing units to the at least one host, the get table snapshot message requesting a snapshot of current health and/or load information of the at least one host.

14. The one or more computer-readable storage media as recited in claim 13, wherein a format of the get table snapshot message comprises an identification of a requesting load balancing unit of the one or more load balancing units.

15. The one or more computer-readable storage media as recited in claim 1, comprising the computer-executable instructions that, when executed, enable the one or more processors to implement the message protocol that includes at least one message, the at least one message comprising a send table snapshot message that is sent from the at least one host to a requesting load balancing unit of the one or more load balancing units, the send table snapshot message providing a snapshot of current health and/or load information of the at least one host.

16. The one or more computer-readable storage media as recited in claim 15, wherein a format of the send table snapshot message comprises the snapshot of the current health and/or load information of the at least one host.

17. The one or more computer-readable storage media as recited in claim 1, comprising the computer-executable instructions that, when executed, enable the one or more processors to implement the message protocol that includes at least one message, the at least one message comprising a postulate table state message that is sent from the at least one host to the one or more load balancing units, the postulate table state message including a load balancing state directive indicating a current load balancing state directive that is expected by the at least one host to be existing at the one or more load balancing units.

18. The one or more computer-readable storage media as recited in claim 17, wherein a format of the postulate table state message comprises an identifier for the at least one host and the current load balancing state directive.

19. The one or more computer-readable storage media as recited in claim 17, comprising the computer-executable instructions that, when executed, enable the one or more processors to implement the message protocol that includes another message, the another message comprising a postulate wrong message that is sent from a load balancing unit of the one or more load balancing units to the at least one host, which previously sent the postulate table state message; the postulate wrong message indicating that the load balancing unit has an actual load balancing state directive that differs from a postulated load balancing state directive that is included in the postulate table state message.

20. The one or more computer-readable storage media as recited in claim 1, comprising computer-executable instructions that, when executed, configure the one or more processors to, perform further actions comprising:
analyzing health and load information for a plurality of application endpoints; and
ascertaining a token allotment for the plurality of application endpoints responsive to the analyzing.

21. The one or more computer-readable storage media as recited in claim 20, comprising the computer-executable instructions that, when executed, configure the one or more processors to perform further actions comprising:
receiving a target application endpoint allotment request that identifies the plurality of application endpoints; and
sending a target application endpoint allotment response that includes the token allotment.

22. The one or more computer-readable storage media as recited in claim 20, comprising the computer-executable instructions that, when executed, configure the one or more processors to perform further actions comprising:
receiving a target application endpoint allotment request that includes one or more of a virtual internet protocol (IP) address and port, a protocol, and information that is specific to the protocol; and
sending a target application endpoint allotment response that includes a physical IP address and port.

23. The one or more computer-readable storage media as recited in claim 20, wherein the action of analyzing comprises an action of:
analyzing application-endpoint-specific health and load information for the plurality of application endpoints.

24. The one or more computer-readable storage media as recited in claim 20, wherein the action of ascertaining comprises an action of:

ascertaining the token allotment for the plurality of application endpoints based on relative available capacities between or among the plurality of application endpoints.

25. The one or more computer-readable storage media as recited in claim 20, wherein the token allotment comprises a first number of tokens corresponding to a first application endpoint of the plurality of application endpoints and a second number of tokens corresponding to a second application endpoint of the plurality of application endpoints.

26. The one or computer-readable storage media as recited in claim 20, wherein the token allotment comprises:

a first number of tokens corresponding to a first application endpoint of the plurality of application endpoints;

a second number of tokens corresponding to a second application endpoint of the plurality of application endpoints; and a time limit, wherein an expiration of the time limit renders unusable any remaining tokens of the first number of tokens and the second number of tokens.

27. The one or more computer-readable storage media as recited in claim 20, comprising the computer-executable instructions that, when executed, configure the one or more processors to perform a further action comprising:

using the token allotment to classify incoming connection requests.

28. The one or more computer-readable storage media as recited in claim 1, comprising computer-executable instructions that, when executed, configure the one or more processors to perform further actions comprising:

determining health and load information on a per application basis; and selecting an application from among a plurality of applications responsive to the health and load information.

29. The one or more computer-readable storage media as recited in claim 28, wherein the action of determining health and load information on a per application basis comprises an action of:

determining when applications of the plurality of applications start and stop.

30. The one or more computer-readable storage media as recited in claim 28, wherein the action of determining health and load information on a per application basis comprises an action of:

determining when an application of the plurality of applications is healthy and when the application is failing or failed.

31. The one or more computer-readable storage media as recited in claim 28, comprising the computer-executable instructions that, when executed configure the one or more processors to perform a further action comprising:

receiving external input regarding determination of the health and load information on a per application basis;

wherein the action of determining health and load information on a per application basis comprises an action of:

determining the health and load information on a per application basis in accordance with the external input.

32. The one or more computer-readable storage media as recited in claim 28, comprising the computer-executable instructions that, when executed, configure the one or more processors to perform further actions comprising:

caching the received host status information;

receiving a packet requesting a connection initiation; and consulting the health and load cache for the connection initiation;

wherein the action of selecting comprises an action of:

selecting the application from among the plurality of applications responsive to the consulting.

33. The one or more computer-readable storage media as recited in claim 32, wherein the connection initiation pertains to a particular application type.

34. The one or more computer-readable storage media as recited in claim 28, wherein the action of selecting comprises an action of:

selecting an application endpoint from among a plurality of application endpoints responsive to the health and load information.

35. The one or more computer-readable storage media as recited in claim 28, wherein the action of selecting comprises an action of:

selecting, responsive to the health and load information, an application endpoint from among a plurality of application endpoints that are distributed among the plurality of hosts.

36. The one or more computer-readable storage media as recited in claim 28, wherein at least a portion of the computer-executable instructions are adapted to run on a single computing device.

37. The one or more computer-readable storage media as recited in claim 28, wherein at least a portion of the computer-executable instructions are adapted to run on a plurality of computing devices.

38. The one or more computer-readable storage media as recited in claim 28, wherein the action of selecting comprises an action of:

selecting, responsive to the health and load information, an allotment of application endpoints from among a plurality of application endpoints with regard to relative available capacities between or among the plurality of application endpoints.

39. The one or more computer-readable storage media as recited in claim 38, wherein the action of selecting comprises a further action of:

selecting the allotment of application endpoints using a token allotment scheme.

40. The one or more computer-readable storage media as recited in claim 38, wherein the action of selecting comprises a further action of:

selecting the allotment of application endpoints using a percentage allotment scheme.

41. The one or more computer-readable storage media as recited in claim 38, wherein the plurality of application endpoints correspond to applications of a single application type.

42. The one or more computer-readable storage media as recited in claim 28, wherein the action of selecting comprises an action of:

selecting the application from among the plurality of applications responsive to the health and load information in order to balance a network load caused by incoming packets.

43. The one or more computer-readable storage media as recited in claim 28, wherein the action of selecting comprises an action of:

selecting the application from among the plurality of applications responsive to the health and load information in order to balance a network load caused by incoming connection requests.

44. A system comprising:

at least one processor; and one or more computer-readable storage media, coupled to the at least one processor, the one or more computer-readable storage media storing computer-executable instructions that are capable of being executed by the at least one processor, the computer-executable instructions, when executed, configuring the system to perform actions comprising:

determining host status information for a plurality of hosts, each host comprising a plurality of applications, wherein the host status information comprises a health and load table including a plurality of entries, each entry of the plurality of entries associated with an application of the plurality of applications, each entry of the plurality of entries comprising:

an application identifier for a particular application of the plurality of applications;

information characterizing at least one status of the particular application; and at least one load balancing directive regarding the particular application;

implementing a message protocol between at least one host and one or more load balancing units, the message protocol usable for communicating host status information between the at least one host and the one or more load balancing units when the host status information is updated;

communicating the host status information from the at least one host to the one or more load balancing units, wherein the one or more load balancing units each comprise a consolidated health and load cache that stores application-specific health and load information for the plurality of applications that are executing on the plurality of hosts;

receiving the host status information from the at least one host; and making load balancing decisions responsive to the received host status information.

45. The system as recited in claim 44, wherein the action of receiving comprises an action of:

receiving the host status information from the at least one host via at least one proxy.

46. The system as recited in claim 44, wherein the action of receiving comprises an action of:

receiving the at least one load balancing directive from the plurality of hosts via at least one proxy that is invoking one or more application programming interfaces (APIs) to push the at least one load balancing directive.

47. The system as recited in claim 44, wherein the system comprises at least one of a single device and a plurality of devices.

48. A computer-implemented method for network load balancing, the method comprising:

determining host status information for a plurality of hosts, each host comprising a plurality of applications, wherein the host status information comprises a health and load table including a plurality of entries, each entry of the plurality of entries associated with an application of the plurality of applications, each entry of the plurality of entries comprising:

an application identifier for a particular application of the plurality of applications;

information characterizing at least one status of the particular application; and at least one load balancing directive regarding the particular application;

implementing a message protocol between at least one host and one or more load balancing units, the message protocol usable for communicating host status information between the at least one host and the one or more load balancing units when the host status information is updated;

communicating the host status information from the at least one host to at least one device comprising load balancing infrastructure, wherein the load balancing infrastructure comprises a consolidated health and load cache that stores application-specific health and load information for the plurality of applications that are executing on the plurality of hosts;

receiving the host status information from the at least one host at the at least one device; and making load balancing decisions with the load balancing infrastructure responsive to the received host status information.

49. A system for network load balancing with host status information, the system comprising:

one or more processors;

a memory, operatively coupled to the one or more processors, the memory storing:

means for determining host status information for a plurality of hosts, each host comprising a plurality of applications, wherein the host status information comprises a health and load table including a plurality of entries, each entry of the plurality of entries associated with an application of the plurality of applications, each entry of the plurality of entries comprising:

an application identifier for a particular application of the plurality of applications;

information characterizing at least one status of the particular application; and at least one load balancing directive regarding the particular application;

means for implementing a message protocol between at least one host and one or more load balancing units, the message protocol usable for communicating host status information between the at least one host and the one or more load balancing units when the host status information is updated;

means for communicating the host status information from the at least one host to the one or more load balancing units, wherein the one or more load balancing units each comprise a consolidated health and load cache that stores application-specific health and load information for the plurality of applications that are executing on the plurality of hosts;

means for receiving the host status information from the at least one host; and means for making load balancing decisions responsive to the host status information.

50. The system as recited in claim 49, wherein the arrangement comprises at least one system.

51. The system as recited in claim 49, wherein the arrangement comprises one or more processor-accessible media.

* * * * *